US012634187B2

(12) United States Patent
Yan et al.

(10) Patent No.: US 12,634,187 B2
(45) Date of Patent: May 19, 2026

(54) TRANSMITTING DEVICE, RECEIVING DEVICE, AND MODULATION METHOD

(71) Applicant: NTT DOCOMO, INC., Tokyo (JP)

(72) Inventors: Xiaorui Yan, Beijing (CN); Neng Ye, Beijing (CN); Xiangming Li, Beijing (CN); Wenjia Liu, Beijing (CN); Xiaolin Hou, Beijing (CN); Lan Chen, Beijing (CN); Yoshihisa Kishiyama, Tokyo (JP); Takahiro Asai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/719,660

(22) PCT Filed: Jan. 7, 2022

(86) PCT No.: PCT/CN2022/070806
§ 371 (c)(1),
(2) Date: Jun. 13, 2024

(87) PCT Pub. No.: WO2023/130377
PCT Pub. Date: Jul. 13, 2023

(65) Prior Publication Data
US 2025/0047547 A1      Feb. 6, 2025

(51) Int. Cl.
*H04L 27/36*          (2006.01)
(52) U.S. Cl.
CPC .................................... *H04L 27/36* (2013.01)
(58) Field of Classification Search
CPC .... H04L 27/366; H04L 27/227; H04L 27/389
See application file for complete search history.

(56) References Cited

U.S. PATENT DOCUMENTS

| | | | | |
|---|---|---|---|---|
| 9,806,932 | B2 | 10/2017 | Zhang et al. | |
| 2010/0014611 | A1* | 1/2010 | Kwak | H04L 27/3405 375/302 |
| 2023/0327935 | A1* | 10/2023 | Jahan | H04L 27/34 375/295 |

FOREIGN PATENT DOCUMENTS

| | | |
|---|---|---|
| CN | 103493453 A | 1/2014 |
| CN | 108632009 A | 10/2018 |
| CN | 108809598 A | 11/2018 |
| CN | 109067695 A | 12/2018 |

(Continued)

OTHER PUBLICATIONS

Ugolini et al., Spiral Constellations for Phase Noise Channels, IEEE Transactions on Communications, vol. 67, No. 11, pp. 7799-7810, Nov. 2019 (Year: 2019).*

(Continued)

*Primary Examiner* — Freshteh N Aghdam
(74) *Attorney, Agent, or Firm* — Osha Bergman Watanabe & Burton LLP

(57) ABSTRACT

The present disclosure provides a transmitting device, a receiving device and a modulation method. The transmitting device includes: a receiving unit configured to obtain a bit sequence to be transmitted; a control unit configured to perform pseudo-N-order first type of modulation on the bit sequence to be transmitted, according to information about phase noise, wherein $2^N$ first symbols of the pseudo-N-order first type of modulation correspond to a part of $2^M$ second symbols of M-order second type of modulation, where M and N are positive integers.

9 Claims, 31 Drawing Sheets

(56) References Cited

FOREIGN PATENT DOCUMENTS

| CN | 109905342 | A | 6/2019 |
| KR | 102081648 | B1 | 2/2020 |

OTHER PUBLICATIONS

A. Ugolini et al.; "Spiral Constellations for Phase Noise Channels,";
IEEE Transactions on Communications, vol. 67, No. 11, pp. 7799-
7810, Nov. 2019, doi: 10.1109/TCOMM.2019.2937293 (13 pages).
Ericsson: "On DL PTRS design"; 3GPP TSG-RAN WG1 #90,
R1-1714314; Prague, Czechia, Aug. 21-25, 2017 (20 pages).
Office Action issued in U.S. Appl. No. 18/720,335; Dated Nov. 18,
2025 (18 pages).

* cited by examiner

| $\frac{1}{\sqrt{160}}(1+1i)$ | $\frac{1}{\sqrt{160}}(3+1i)$ |
|---|---|
| $\frac{1}{\sqrt{160}}(1-1i)$ | $\frac{1}{\sqrt{160}}(3-1i)$ |
| $\frac{1}{\sqrt{160}}(1+3i)$ | $\frac{1}{\sqrt{160}}(3+3i)$ |
| $\frac{1}{\sqrt{160}}(1-3i)$ | $\frac{1}{\sqrt{160}}(3-3i)$ |
| $\frac{1}{\sqrt{160}}(-1+1i)$ | $\frac{1}{\sqrt{160}}(-3+1i)$ |
| $\frac{1}{\sqrt{160}}(-1-1i)$ | $\frac{1}{\sqrt{160}}(-3-1i)$ |
| $\frac{1}{\sqrt{160}}(-1+3i)$ | $\frac{1}{\sqrt{160}}(-3+3i)$ |
| $\frac{1}{\sqrt{160}}(-1-3i)$ | $\frac{1}{\sqrt{160}}(-3-3i)$ |

| | |
|---|---|
| $\frac{1}{\sqrt{259.8248}}(-3.1280-1.9928i)$ | $\frac{1}{\sqrt{259.8248}}(-14.8320 + 4.2501i)$ |
| $\frac{1}{\sqrt{259.8248}}(3.8317 - 3.9257i)$ | $\frac{1}{\sqrt{259.8248}}(-7.2813 - 15.1749i)$ |
| $\frac{1}{\sqrt{259.8248}}(5.1921 + 4.7272i)$ | $\frac{1}{\sqrt{259.8248}}(14.9746 - 10.4174i)$ |
| $\frac{1}{\sqrt{259.8248}}(-4.8601 + 6.9314i)$ | $\frac{1}{\sqrt{259.8248}}(13.5511 + 14.2435i)$ |
| $\frac{1}{\sqrt{259.8248}}(-8.9082 - 4.2495i)$ | $\frac{1}{\sqrt{259.8248}}(-13.0110 + 16.5924i)$ |
| $\frac{1}{\sqrt{259.8248}}(2.9318 - 10.8706i)$ | $\frac{1}{\sqrt{259.8248}}(-19.4676 - 11.3164i)$ |
| $\frac{1}{\sqrt{259.8248}}(12.6059 + 0.9924i)$ | $\frac{1}{\sqrt{259.8248}}(9.2050 - 22.1173i)$ |
| $\frac{1}{\sqrt{259.8248}}(1.4471 + 13.9591i)$ | $\frac{1}{\sqrt{259.8248}}(24.4944 + 6.7245i)$ |

Fig.2B

| index | bit ( * ) | symbol |
|-------|-----------|--------|
| 1 | 0000 | $\frac{1}{\sqrt{667.5}}(-7-3i)$ |
| 2 | 0001 | $\frac{1}{\sqrt{667.5}}(5-9i)$ |
| 3 | 0011 | $\frac{1}{\sqrt{667.5}}(13+3i)$ |
| 4 | 0010 | $\frac{1}{\sqrt{667.5}}(1+15i)$ |
| 5 | 0110 | $\frac{1}{\sqrt{667.5}}(-15+9i)$ |
| 6 | 0111 | $\frac{1}{\sqrt{667.5}}(-15-13i)$ |
| 7 | 0101 | $\frac{1}{\sqrt{667.5}}(3-21i)$ |
| 8 | 0100 | $\frac{1}{\sqrt{667.5}}(21-9i)$ |
| 9 | 1100 | $\frac{1}{\sqrt{667.5}}(21+15i)$ |
| 10 | 1101 | $\frac{1}{\sqrt{667.5}}(-3+27i)$ |
| 11 | 1111 | $\frac{1}{\sqrt{667.5}}(-27+13i)$ |
| 12 | 1110 | $\frac{1}{\sqrt{667.5}}(-25-19i)$ |
| 13 | 1010 | $\frac{1}{\sqrt{667.5}}(7-31i)$ |
| 14 | 1011 | $\frac{1}{\sqrt{667.5}}(31-17i)$ |
| 15 | 1001 | $\frac{1}{\sqrt{667.5}}(31+21i)$ |
| 16 | 1000 | $\frac{1}{\sqrt{667.5}}(-23+31i)$ |

*16 spiral_1024QAM ( fs=0.00794,α=0.91,β=0.09 )

Fig.5A-1

| index | bit ( * ) | bit (1024QAM) | symbol |
|-------|-----------|---------------|--------|
| 1 | 0000 | 0110010010 | $\frac{1}{\sqrt{667.5}}(-7-3i)$ |
| 2 | 0001 | 1001010101 | $\frac{1}{\sqrt{667.5}}(5-9i)$ |
| 3 | 0011 | 1011001111 | $\frac{1}{\sqrt{667.5}}(13+3i)$ |
| 4 | 0010 | 1000001001 | $\frac{1}{\sqrt{667.5}}(1+15i)$ |
| 5 | 0110 | 0100001100 | $\frac{1}{\sqrt{667.5}}(-15+9i)$ |
| 6 | 0111 | 0100010111 | $\frac{1}{\sqrt{667.5}}(-15-13i)$ |
| 7 | 0101 | 1000111011 | $\frac{1}{\sqrt{667.5}}(3-21i)$ |
| 8 | 0100 | 1101010101 | $\frac{1}{\sqrt{667.5}}(21-9i)$ |
| 9 | 1100 | 1101001001 | $\frac{1}{\sqrt{667.5}}(21+15i)$ |
| 10 | 1101 | 0111000011 | $\frac{1}{\sqrt{667.5}}(-3+27i)$ |
| 11 | 1111 | 0001001010 | $\frac{1}{\sqrt{667.5}}(-27+13i)$ |
| 12 | 1110 | 0001111010 | $\frac{1}{\sqrt{667.5}}(-25-19i)$ |
| 13 | 1010 | 1010000000 | $\frac{1}{\sqrt{667.5}}(7-31i)$ |
| 14 | 1011 | 1111111001 | $\frac{1}{\sqrt{667.5}}(31-17i)$ |
| 15 | 1001 | 1111100110 | $\frac{1}{\sqrt{667.5}}(31+21i)$ |
| 16 | 1000 | 0010000001 | $\frac{1}{\sqrt{667.5}}(-23+31i)$ |

*16 spiral_1024QAM ( fs=0.00794,α=0.91,β=0.09 )

Fig.5A-2

| index | bit (*) | bit (1024QAM) | symbol |
|-------|---------|---------------|--------|
| 1 | 0000 | 0110110010 | $\frac{1}{\sqrt{681.5}}(-5-3i)$ |
| 2 | 0001 | 1001010100 | $\frac{1}{\sqrt{681.5}}(5-7i)$ |
| 3 | 0011 | 1010001101 | $\frac{1}{\sqrt{681.5}}(9+7i)$ |
| 4 | 0010 | 0101101011 | $\frac{1}{\sqrt{681.5}}(-9+11i)$ |
| 5 | 0110 | 0100010100 | $\frac{1}{\sqrt{681.5}}(-15-7i)$ |
| 6 | 0111 | 1001011001 | $\frac{1}{\sqrt{681.5}}(5-17i)$ |
| 7 | 0101 | 1101010000 | $\frac{1}{\sqrt{681.5}}(21+1i)$ |
| 8 | 0100 | 1000000101 | $\frac{1}{\sqrt{681.5}}(1+23i)$ |
| 9 | 1100 | 0010001100 | $\frac{1}{\sqrt{681.5}}(-23+9i)$ |
| 10 | 1101 | 0101011101 | $\frac{1}{\sqrt{681.5}}(-11-25i)$ |
| 11 | 1111 | 1101111010 | $\frac{1}{\sqrt{681.5}}(23-19i)$ |
| 12 | 1110 | 1100100100 | $\frac{1}{\sqrt{681.5}}(19+25i)$ |
| 13 | 1010 | 0010100011 | $\frac{1}{\sqrt{681.5}}(-21+27i)$ |
| 14 | 1011 | 0000011010 | $\frac{1}{\sqrt{681.5}}(-31-19i)$ |
| 15 | 1001 | 1110000000 | $\frac{1}{\sqrt{681.5}}(23-31i)$ |
| 16 | 1000 | 1111100011 | $\frac{1}{\sqrt{681.5}}(31+27i)$ |

*16 spiral_1024QAM ( fs=0.01441,α=0.97,β=0.03 )

Fig.5B

| index | bit ( * ) | bit (1024QAM) | symbol |
|:---:|:---:|:---:|:---:|
| 1 | 0000 | 0110110010 | $\frac{1}{\sqrt{678}}(-5-3i)$ |
| 2 | 0001 | 1001110011 | $\frac{1}{\sqrt{678}}(7-5i)$ |
| 3 | 0011 | 1001101100 | $\frac{1}{\sqrt{678}}(7+9i)$ |
| 4 | 0010 | 0101101101 | $\frac{1}{\sqrt{678}}(-9+7i)$ |
| 5 | 0110 | 0101110110 | $\frac{1}{\sqrt{678}}(-9-11i)$ |
| 6 | 0111 | 1011010110 | $\frac{1}{\sqrt{678}}(13-11i)$ |
| 7 | 0101 | 1011101001 | $\frac{1}{\sqrt{678}}(15+15i)$ |
| 8 | 0100 | 0100001001 | $\frac{1}{\sqrt{678}}(-15+15i)$ |
| 9 | 1100 | 0011011001 | $\frac{1}{\sqrt{678}}(-19-17i)$ |
| 10 | 1101 | 1100111011 | $\frac{1}{\sqrt{678}}(19-21i)$ |
| 11 | 1111 | 1101000111 | $\frac{1}{\sqrt{678}}(21+19i)$ |
| 12 | 1110 | 0010100101 | $\frac{1}{\sqrt{678}}(-21+23i)$ |
| 13 | 1010 | 0001111101 | $\frac{1}{\sqrt{678}}(-25-25i)$ |
| 14 | 1011 | 1110111101 | $\frac{1}{\sqrt{678}}(27-25i)$ |
| 15 | 1001 | 1110100010 | $\frac{1}{\sqrt{678}}(27+29i)$ |
| 16 | 1000 | 0000000011 | $\frac{1}{\sqrt{678}}(-31+27i)$ |

*16 spiral_1024QAM ( fs=0.0175,α=0.25,β=0.75 )

Fig. 5C

| index | bit (*) | bit (1024QAM) | symbol | index | bit (*) | bit (1024QAM) | symbol |
|---|---|---|---|---|---|---|---|
| 1 | 000000 | 0111010001 | $\frac{1}{\sqrt{663.875}}(-3-1i)$ | 33 | 110000 | 0010010100 | $\frac{1}{\sqrt{663.875}}(-23-7i)$ |
| 2 | 000001 | 1000010010 | $\frac{1}{\sqrt{663.875}}(1-3i)$ | 34 | 110001 | 0100111011 | $\frac{1}{\sqrt{663.875}}(-13-21i)$ |
| 3 | 000011 | 1001010000 | $\frac{1}{\sqrt{663.875}}(5+1i)$ | 35 | 110011 | 1000111101 | $\frac{1}{\sqrt{663.875}}(3-25i)$ |
| 4 | 000010 | 1000101110 | $\frac{1}{\sqrt{663.875}}(3+5i)$ | 36 | 110010 | 1100111001 | $\frac{1}{\sqrt{663.875}}(19-17i)$ |
| 5 | 000110 | 0111001110 | $\frac{1}{\sqrt{663.875}}(-3+5i)$ | 37 | 110110 | 1110110010 | $\frac{1}{\sqrt{663.875}}(27-3i)$ |
| 6 | 000111 | 0110010000 | $\frac{1}{\sqrt{663.875}}(-7+1i)$ | 38 | 110111 | 1101101001 | $\frac{1}{\sqrt{663.875}}(23+15i)$ |
| 7 | 000101 | 0110010011 | $\frac{1}{\sqrt{663.875}}(-7-5i)$ | 39 | 110101 | 1001100011 | $\frac{1}{\sqrt{663.875}}(7+27i)$ |
| 8 | 000100 | 0111110101 | $\frac{1}{\sqrt{663.875}}(-1-9i)$ | 40 | 110100 | 0100100100 | $\frac{1}{\sqrt{663.875}}(-13+25i)$ |
| 9 | 001100 | 1001110100 | $\frac{1}{\sqrt{663.875}}(7-7i)$ | 41 | 111100 | 0001101010 | $\frac{1}{\sqrt{663.875}}(-25+13i)$ |
| 10 | 001101 | 1010110001 | $\frac{1}{\sqrt{663.875}}(11-1i)$ | 42 | 111101 | 0000110100 | $\frac{1}{\sqrt{663.875}}(-29-7i)$ |
| 11 | 001111 | 1010001101 | $\frac{1}{\sqrt{663.875}}(9+7i)$ | 43 | 111111 | 0011011100 | $\frac{1}{\sqrt{663.875}}(-19-23i)$ |
| 12 | 001110 | 1000001011 | $\frac{1}{\sqrt{663.875}}(1+11i)$ | 44 | 111110 | 1000100000 | $\frac{1}{\sqrt{663.875}}(1-31i)$ |
| 13 | 001010 | 0110001011 | $\frac{1}{\sqrt{663.875}}(-7+11i)$ | 45 | 111010 | 1101011100 | $\frac{1}{\sqrt{663.875}}(21-23i)$ |
| 14 | 001011 | 0100101111 | $\frac{1}{\sqrt{663.875}}(-13+3i)$ | 46 | 111011 | 1111110011 | $\frac{1}{\sqrt{663.875}}(31-5i)$ |
| 15 | 001001 | 0100110011 | $\frac{1}{\sqrt{663.875}}(-13-5i)$ | 47 | 111001 | 1110101000 | $\frac{1}{\sqrt{663.875}}(27+17i)$ |
| 16 | 001000 | 0110110111 | $\frac{1}{\sqrt{663.875}}(-5-13i)$ | 48 | 111000 | 1010000001 | $\frac{1}{\sqrt{663.875}}(9+31i)$ |
| 17 | 010000 | 1000111000 | $\frac{1}{\sqrt{663.875}}(3-15i)$ | 49 | 100000 | 0100100001 | $\frac{1}{\sqrt{663.875}}(-13+31i)$ |
| 18 | 010001 | 1011010101 | $\frac{1}{\sqrt{663.875}}(13-9i)$ | 50 | 100001 | 0000001001 | $\frac{1}{\sqrt{663.875}}(-31+15i)$ |
| 19 | 010011 | 1011110000 | $\frac{1}{\sqrt{663.875}}(15+1i)$ | 51 | 100011 | 0000010111 | $\frac{1}{\sqrt{663.875}}(-31-13i)$ |
| 20 | 010010 | 1010101010 | $\frac{1}{\sqrt{663.875}}(11+13i)$ | 52 | 100010 | 0011011111 | $\frac{1}{\sqrt{663.875}}(-19-29i)$ |
| 21 | 010110 | 1000001000 | $\frac{1}{\sqrt{663.875}}(1+17i)$ | 53 | 100110 | 1011100000 | $\frac{1}{\sqrt{663.875}}(13-31i)$ |
| 22 | 010111 | 0101101001 | $\frac{1}{\sqrt{663.875}}(-9+15i)$ | 54 | 100111 | 1110111101 | $\frac{1}{\sqrt{663.875}}(27-25i)$ |
| 23 | 010101 | 0011101110 | $\frac{1}{\sqrt{663.875}}(-17+5i)$ | 55 | 100101 | 1111111000 | $\frac{1}{\sqrt{663.875}}(31-15i)$ |
| 24 | 010100 | 0011110100 | $\frac{1}{\sqrt{663.875}}(-17-7i)$ | 56 | 100100 | 1111100110 | $\frac{1}{\sqrt{663.875}}(31+21i)$ |
| 25 | 011100 | 0101111001 | $\frac{1}{\sqrt{663.875}}(-9-17i)$ | 57 | 101100 | 1100100001 | $\frac{1}{\sqrt{663.875}}(19+31i)$ |
| 26 | 011101 | 1001011010 | $\frac{1}{\sqrt{663.875}}(5-19i)$ | 58 | 101101 | 0010000001 | $\frac{1}{\sqrt{663.875}}(-23+31i)$ |
| 27 | 011111 | 1011110111 | $\frac{1}{\sqrt{663.875}}(15-13i)$ | 59 | 101111 | 0000000101 | $\frac{1}{\sqrt{663.875}}(-31+23i)$ |
| 28 | 011110 | 1101010000 | $\frac{1}{\sqrt{663.875}}(21+1i)$ | 60 | 101110 | 0000011100 | $\frac{1}{\sqrt{663.875}}(-31-23i)$ |
| 29 | 011010 | 1100001010 | $\frac{1}{\sqrt{663.875}}(17+13i)$ | 61 | 101010 | 0010000000 | $\frac{1}{\sqrt{663.875}}(-25-31i)$ |
| 30 | 011011 | 1001000110 | $\frac{1}{\sqrt{663.875}}(5+21i)$ | 62 | 101011 | 1110100000 | $\frac{1}{\sqrt{663.875}}(25-31i)$ |
| 31 | 011001 | 0101100110 | $\frac{1}{\sqrt{663.875}}(-9+21i)$ | 63 | 101001 | 1111111110 | $\frac{1}{\sqrt{663.875}}(31-27i)$ |
| 32 | 011000 | 0010101100 | $\frac{1}{\sqrt{663.875}}(-21+9i)$ | 64 | 101000 | 1111100011 | $\frac{1}{\sqrt{663.875}}(31+27i)$ |

\* 64 spiral_1024QAM ( fs=0.00352, $\alpha$=0.88, $\beta$=0.12 )

Fig.5D

| index | bit (*) | bit (1024QAM) | symbol | index | bit (*) | bit (1024QAM) | symbol |
|---|---|---|---|---|---|---|---|
| 1 | 000000 | 0111010001 | $\frac{1}{\sqrt{677.25}}(-3-1i)$ | 33 | 110000 | 1101001011 | $\frac{1}{\sqrt{677.25}}(19-13i)$ |
| 2 | 000001 | 1000010010 | $\frac{1}{\sqrt{677.25}}(1-3i)$ | 34 | 110001 | 1000000100 | $\frac{1}{\sqrt{677.25}}(21+11i)$ |
| 3 | 000011 | 1000110000 | $\frac{1}{\sqrt{677.25}}(3+1i)$ | 35 | 110011 | 0011001000 | $\frac{1}{\sqrt{677.25}}(1+25i)$ |
| 4 | 000010 | 1000001110 | $\frac{1}{\sqrt{677.25}}(1+5i)$ | 36 | 110010 | 0001110100 | $\frac{1}{\sqrt{677.25}}(-19+17i)$ |
| 5 | 000110 | 0110101111 | $\frac{1}{\sqrt{677.25}}(-5+3i)$ | 37 | 110110 | 0111111110 | $\frac{1}{\sqrt{677.25}}(-25-7i)$ |
| 6 | 000111 | 0110110010 | $\frac{1}{\sqrt{677.25}}(-5-3i)$ | 38 | 110111 | 1101011001 | $\frac{1}{\sqrt{677.25}}(-1-27i)$ |
| 7 | 000101 | 0111110100 | $\frac{1}{\sqrt{677.25}}(-1-7i)$ | 39 | 110101 | 1110001010 | $\frac{1}{\sqrt{677.25}}(21-17i)$ |
| 8 | 000100 | 1001110010 | $\frac{1}{\sqrt{677.25}}(7-3i)$ | 40 | 110100 | 1000100010 | $\frac{1}{\sqrt{677.25}}(25+13i)$ |
| 9 | 001100 | 1001101111 | $\frac{1}{\sqrt{677.25}}(7+3i)$ | 41 | 111100 | 0001101000 | $\frac{1}{\sqrt{677.25}}(3+29i)$ |
| 10 | 001101 | 1000001100 | $\frac{1}{\sqrt{677.25}}(1+9i)$ | 42 | 111101 | 0001010111 | $\frac{1}{\sqrt{677.25}}(-25+15i)$ |
| 11 | 001111 | 0110001101 | $\frac{1}{\sqrt{677.25}}(-7+7i)$ | 43 | 111111 | 0101011111 | $\frac{1}{\sqrt{677.25}}(-27-13i)$ |
| 12 | 001110 | 0101110010 | $\frac{1}{\sqrt{677.25}}(-9-3i)$ | 44 | 111110 | 1110011010 | $\frac{1}{\sqrt{677.25}}(-9-29i)$ |
| 13 | 001010 | 0110110101 | $\frac{1}{\sqrt{677.25}}(-5-9i)$ | 45 | 111010 | 1111001010 | $\frac{1}{\sqrt{677.25}}(25-19i)$ |
| 14 | 001011 | 1001110101 | $\frac{1}{\sqrt{677.25}}(7-9i)$ | 46 | 111011 | 1010000001 | $\frac{1}{\sqrt{677.25}}(29-13i)$ |
| 15 | 001001 | 1010110000 | $\frac{1}{\sqrt{677.25}}(11+1i)$ | 47 | 111001 | 0001000111 | $\frac{1}{\sqrt{677.25}}(9+3i)$ |
| 16 | 001000 | 1001101011 | $\frac{1}{\sqrt{677.25}}(7+11i)$ | 48 | 111000 | 0000010111 | $\frac{1}{\sqrt{677.25}}(-27+19i)$ |
| 17 | 010000 | 0110001011 | $\frac{1}{\sqrt{677.25}}(-7+11i)$ | 49 | 100000 | 0100100000 | $\frac{1}{\sqrt{677.25}}(-31-13i)$ |
| 18 | 010001 | 0100101111 | $\frac{1}{\sqrt{677.25}}(-13+3i)$ | 50 | 100001 | 1110111100 | $\frac{1}{\sqrt{677.25}}(-15-31i)$ |
| 19 | 010011 | 0101110110 | $\frac{1}{\sqrt{677.25}}(-9-11i)$ | 51 | 100011 | 1111101000 | $\frac{1}{\sqrt{677.25}}(27-23i)$ |
| 20 | 010010 | 1000111000 | $\frac{1}{\sqrt{677.25}}(3-15i)$ | 52 | 100010 | 1100100001 | $\frac{1}{\sqrt{677.25}}(31+17i)$ |
| 21 | 010110 | 1011110011 | $\frac{1}{\sqrt{677.25}}(15-5i)$ | 53 | 100110 | 1011100000 | $\frac{1}{\sqrt{677.25}}(19+31i)$ |
| 22 | 010111 | 1011001011 | $\frac{1}{\sqrt{677.25}}(13+31i)$ | 54 | 100111 | 0000100101 | $\frac{1}{\sqrt{677.25}}(-29+23i)$ |
| 23 | 010101 | 0111001000 | $\frac{1}{\sqrt{677.25}}(-3+17i)$ | 55 | 100101 | 0000001011 | $\frac{1}{\sqrt{677.25}}(-31-21i)$ |
| 24 | 010100 | 0100010110 | $\frac{1}{\sqrt{677.25}}(-17+5i)$ | 56 | 100100 | 0010100000 | $\frac{1}{\sqrt{677.25}}(-23-31i)$ |
| 25 | 011100 | 1000011010 | $\frac{1}{\sqrt{677.25}}(-15-13i)$ | 57 | 101100 | 1111111100 | $\frac{1}{\sqrt{677.25}}(31-23i)$ |
| 26 | 011101 | 1100010101 | $\frac{1}{\sqrt{677.25}}(1-19i)$ | 58 | 101101 | 1111100100 | $\frac{1}{\sqrt{677.25}}(31+25i)$ |
| 27 | 011111 | 1100001011 | $\frac{1}{\sqrt{677.25}}(17-9i)$ | 59 | 101111 | 1110000001 | $\frac{1}{\sqrt{677.25}}(25+31i)$ |
| 28 | 011110 | 0111100110 | $\frac{1}{\sqrt{677.25}}(17+11i)$ | 60 | 101110 | 0000000011 | $\frac{1}{\sqrt{677.25}}(-31+27i)$ |
| 29 | 011010 | 0011101010 | $\frac{1}{\sqrt{677.25}}(-1+21i)$ | 61 | 101010 | 0000011110 | $\frac{1}{\sqrt{677.25}}(-31-27i)$ |
| 30 | 011011 | 0011010110 | $\frac{1}{\sqrt{677.25}}(-17+13i)$ | 62 | 101011 | 0001000000 | $\frac{1}{\sqrt{677.25}}(-29-31i)$ |
| 31 | 011001 | 0111111100 | $\frac{1}{\sqrt{677.25}}(-19-1i)$ | 63 | 101001 | 1011111111 | $\frac{1}{\sqrt{677.25}}(31-29i)$ |
| 32 | 011000 | 1100110111 | $\frac{1}{\sqrt{677.25}}(-1-23i)$ | 64 | 101000 | 1111100001 | $\frac{1}{\sqrt{677.25}}(31-31i)$ |

\* 64 spiral_1024QAM ( fs=0.00728, α=0.98, β=0.02 )

Fig.5E

| index | bit (*) | bit (1024QAM) | symbol | index | bit (*) | bit (1024QAM) | symbol |
|---|---|---|---|---|---|---|---|
| 1 | 000000 | 0111010001 | $\frac{1}{\sqrt{672.75}}(-3-1i)$ | 33 | 110000 | 1101110010 | $\frac{1}{\sqrt{672.75}}(23-3i)$ |
| 2 | 000001 | 1000110010 | $\frac{1}{\sqrt{672.75}}(3-3i)$ | 34 | 110001 | 1010100110 | $\frac{1}{\sqrt{672.75}}(11+21i)$ |
| 3 | 000011 | 1000110000 | $\frac{1}{\sqrt{672.75}}(3+1i)$ | 35 | 110011 | 0011101000 | $\frac{1}{\sqrt{672.75}}(-17+17i)$ |
| 4 | 000010 | 0111101110 | $\frac{1}{\sqrt{672.75}}(-1+5i)$ | 36 | 110010 | 0010110111 | $\frac{1}{\sqrt{672.75}}(-21-13i)$ |
| 5 | 000110 | 0110110000 | $\frac{1}{\sqrt{672.75}}(-5+1i)$ | 37 | 110110 | 1001111101 | $\frac{1}{\sqrt{672.75}}(7-25i)$ |
| 6 | 000111 | 0111010011 | $\frac{1}{\sqrt{672.75}}(-3-5i)$ | 38 | 110111 | 1110110001 | $\frac{1}{\sqrt{672.75}}(27-1i)$ |
| 7 | 000101 | 1001010011 | $\frac{1}{\sqrt{672.75}}(5-5i)$ | 39 | 110101 | 1010100100 | $\frac{1}{\sqrt{672.75}}(11+25i)$ |
| 8 | 000100 | 1001101111 | $\frac{1}{\sqrt{672.75}}(7+3i)$ | 40 | 110100 | 0010100111 | $\frac{1}{\sqrt{672.75}}(-21+19i)$ |
| 9 | 001100 | 0111101101 | $\frac{1}{\sqrt{672.75}}(-1+7i)$ | 41 | 111100 | 0010011001 | $\frac{1}{\sqrt{672.75}}(-23-17i)$ |
| 10 | 001101 | 0110001111 | $\frac{1}{\sqrt{672.75}}(-7+3i)$ | 42 | 111101 | 1010111110 | $\frac{1}{\sqrt{672.75}}(11-27i)$ |
| 11 | 001111 | 0110110100 | $\frac{1}{\sqrt{672.75}}(-5-7i)$ | 43 | 111111 | 1111010000 | $\frac{1}{\sqrt{672.75}}(29+1i)$ |
| 12 | 001110 | 1001010101 | $\frac{1}{\sqrt{672.75}}(5-9i)$ | 44 | 111110 | 1010000010 | $\frac{1}{\sqrt{672.75}}(9+29i)$ |
| 13 | 001010 | 1010010000 | $\frac{1}{\sqrt{672.75}}(9+1i)$ | 45 | 111010 | 0001001001 | $\frac{1}{\sqrt{672.75}}(-27+15i)$ |
| 14 | 001011 | 1000010011 | $\frac{1}{\sqrt{672.75}}(3+11i)$ | 46 | 111011 | 0001111011 | $\frac{1}{\sqrt{672.75}}(-25-21i)$ |
| 15 | 001001 | 0101101101 | $\frac{1}{\sqrt{672.75}}(-9+7i)$ | 47 | 111001 | 1011111111 | $\frac{1}{\sqrt{672.75}}(15-29i)$ |
| 16 | 001000 | 0101110100 | $\frac{1}{\sqrt{672.75}}(-9-7i)$ | 48 | 111000 | 1111101100 | $\frac{1}{\sqrt{672.75}}(31+9i)$ |
| 17 | 010000 | 1000110111 | $\frac{1}{\sqrt{672.75}}(3-13i)$ | 49 | 100000 | 1010100001 | $\frac{1}{\sqrt{672.75}}(11+31i)$ |
| 18 | 010001 | 1011010001 | $\frac{1}{\sqrt{672.75}}(13-1i)$ | 50 | 100001 | 0000001001 | $\frac{1}{\sqrt{672.75}}(-31+15i)$ |
| 19 | 010011 | 1001001010 | $\frac{1}{\sqrt{672.75}}(5+13i)$ | 51 | 100011 | 0010011110 | $\frac{1}{\sqrt{672.75}}(-23-27i)$ |
| 20 | 010010 | 0101001100 | $\frac{1}{\sqrt{672.75}}(-11+9i)$ | 52 | 100010 | 1101000000 | $\frac{1}{\sqrt{672.75}}(19-31i)$ |
| 21 | 010110 | 0100110100 | $\frac{1}{\sqrt{672.75}}(-13-7i)$ | 53 | 100110 | 1111100111 | $\frac{1}{\sqrt{672.75}}(31+19i)$ |
| 22 | 010111 | 1000111000 | $\frac{1}{\sqrt{672.75}}(3-15i)$ | 54 | 100111 | 1100100001 | $\frac{1}{\sqrt{672.75}}(19-31i)$ |
| 23 | 010101 | 1100010010 | $\frac{1}{\sqrt{672.75}}(17-3i)$ | 55 | 100101 | 0000000110 | $\frac{1}{\sqrt{672.75}}(-31+21i)$ |
| 24 | 010100 | 1010001001 | $\frac{1}{\sqrt{672.75}}(9+15i)$ | 56 | 100100 | 0010100000 | $\frac{1}{\sqrt{672.75}}(-23-31i)$ |
| 25 | 011100 | 0100101010 | $\frac{1}{\sqrt{672.75}}(-13+13i)$ | 57 | 101100 | 1110111011 | $\frac{1}{\sqrt{672.75}}(27-29i)$ |
| 26 | 011101 | 0011110100 | $\frac{1}{\sqrt{672.75}}(-17-7i)$ | 58 | 101101 | 1111100100 | $\frac{1}{\sqrt{672.75}}(31+25i)$ |
| 27 | 011111 | 1000111010 | $\frac{1}{\sqrt{672.75}}(3-19i)$ | 59 | 101111 | 0001100001 | $\frac{1}{\sqrt{672.75}}(-25+31i)$ |
| 28 | 011110 | 1100110011 | $\frac{1}{\sqrt{672.75}}(19-5i)$ | 60 | 101110 | 0000000011 | $\frac{1}{\sqrt{672.75}}(-31+27i)$ |
| 29 | 011010 | 1010101000 | $\frac{1}{\sqrt{672.75}}(11-17i)$ | 61 | 101010 | 0001100000 | $\frac{1}{\sqrt{672.75}}(-27-31i)$ |
| 30 | 011011 | 0100001001 | $\frac{1}{\sqrt{672.75}}(-15+15i)$ | 62 | 101011 | 1111111111 | $\frac{1}{\sqrt{672.75}}(31-29i)$ |
| 31 | 011001 | 0011010110 | $\frac{1}{\sqrt{672.75}}(-19-11i)$ | 63 | 101001 | 1111100001 | $\frac{1}{\sqrt{672.75}}(31-31i)$ |
| 32 | 011000 | 1000111100 | $\frac{1}{\sqrt{672.75}}(3-23i)$ | 64 | 101000 | 0000000001 | $\frac{1}{\sqrt{672.75}}(-31+31i)$ |

\* 64 spiral_1024QAM ( fs=0.01065,α=0.92,β=0.08 )

Fig.5F

| MCS index $I_{MCS}$ | modulation order $Q_m$ | target code rate Rx[1024] | spectral efficiency | MCS index $I_{MCS}$ | modulation order $Q_m$ | target code rate Rx[1024] | spectral efficiency |
|---|---|---|---|---|---|---|---|
| 0 | 2 | 120 | 0.2344 | 16 | 16 spiral_1024QAM | 658 | 2.5703 |
| 1 | 2 | 157 | 0.3066 | 17 | 6 | 438 | 2.5664 |
| 2 | 2 | 193 | 0.3770 | 18 | 6 | 466 | 2.7305 |
| 3 | 2 | 251 | 0.4902 | 19 | 6 | 517 | 3.0293 |
| 4 | 2 | 308 | 0.6016 | 20 | 6 | 567 | 3.3223 |
| 5 | 2 | 379 | 0.7402 | 21 | 6 | 616 | 3.6094 |
| 6 | 2 | 449 | 0.8770 | 22 | 6 | 666 | 3.9023 |
| 7 | 2 | 526 | 1.0273 | 23 | 64 spiral_1024QAM | 719 | 4.2129 |
| 8 | 2 | 602 | 1.1758 | 24 | 64 spiral_1024QAM | 772 | 4.5234 |
| 9 | 2 | 679 | 1.3262 | 25 | 64 spiral_1024QAM | 822 | 4.8164 |
| 10 | 4 | 340 | 1.3281 | 26 | 64 spiral_1024QAM | 873 | 5.1152 |
| 11 | 4 | 378 | 1.4766 | 27 | 64 spiral_1024QAM | 910 | 5.3320 |
| 12 | 4 | 434 | 1.6953 | 28 | 64 spiral_1024QAM | 948 | 5.5547 |
| 13 | 4 | 490 | 1.9141 | 29 | 2 | reserved | |
| 14 | 16 spiral_1024QAM | 553 | 2.1602 | 30 | 4 | reserved | |
| 15 | 16 spiral_1024QAM | 616 | 2.4063 | 31 | 6 | reserved | |

Fig.8A

| MCS index $I_{MCS}$ | modulation order $Q_m$ | target code rate Rx[1024] | spectral efficiency | MCS index $I_{MCS}$ | modulation order $Q_m$ | target code rate Rx[1024] | spectral efficiency |
|---|---|---|---|---|---|---|---|
| 0 | 2 | 120 | 0.2344 | 16 | 64 spiral_1024QAM | 719 | 4.2129 |
| 1 | 2 | 193 | 0.3770 | 17 | 64 spiral_1024QAM | 772 | 4.5234 |
| 2 | 2 | 308 | 0.6016 | 18 | 64 spiral_1024QAM | 822 | 4.8164 |
| 3 | 2 | 449 | 0.8770 | 19 | 64 spiral_1024QAM | 873 | 5.1152 |
| 4 | 2 | 602 | 1.1758 | 20 | 8 | 682.5 | 5.3320 |
| 5 | 4 | 378 | 1.4766 | 21 | 8 | 711 | 5.5547 |
| 6 | 4 | 434 | 1.6953 | 22 | 8 | 754 | 5.8906 |
| 7 | 4 | 490 | 1.9141 | 23 | 256 spiral_1024QAM | 797 | 6.2266 |
| 8 | 16 spiral_1024QAM | 553 | 2.1602 | 24 | 256 spiral_1024QAM | 841 | 6.5703 |
| 9 | 16 spiral_1024QAM | 616 | 2.4063 | 25 | 256 spiral_1024QAM | 885 | 6.9141 |
| 10 | 16 spiral_1024QAM | 658 | 2.5703 | 26 | 256 spiral_1024QAM | 916.5 | 7.1602 |
| 11 | 6 | 466 | 2.7305 | 27 | 256 spiral_1024QAM | 948 | 7.4063 |
| 12 | 6 | 517 | 3.0293 | 28 | 2 | reserved | |
| 13 | 6 | 567 | 3.3223 | 29 | 2 | reserved | |
| 14 | 6 | 616 | 3.6094 | 30 | 4 | reserved | |
| 15 | 6 | 666 | 3.9023 | 31 | 6 | reserved | |

Fig.8B

| MCS index $I_{MCS}$ | modulation order $Q_m$ | target code rate Rx[1024] | spectral efficiency | MCS index $I_{MCS}$ | modulation order $Q_m$ | target code rate Rx[1024] | spectral efficiency |
|---|---|---|---|---|---|---|---|
| 0 | 2 | 30 | 0.0586 | 16 | 4 | 378 | 1.4766 |
| 1 | 2 | 40 | 0.0781 | 17 | 4 | 434 | 1.6953 |
| 2 | 2 | 50 | 0.0977 | 18 | 16 spiral_1024QAM | 490 | 1.9141 |
| 3 | 2 | 64 | 0.1250 | 19 | 16 spiral_1024QAM | 553 | 2.1602 |
| 4 | 2 | 78 | 0.1523 | 20 | 16 spiral_1024QAM | 616 | 2.4063 |
| 5 | 2 | 99 | 0.1934 | 21 | 6 | 438 | 2.5664 |
| 6 | 2 | 120 | 0.2344 | 22 | 6 | 466 | 2.7305 |
| 7 | 2 | 157 | 0.3066 | 23 | 6 | 517 | 3.0293 |
| 8 | 2 | 193 | 0.3770 | 24 | 6 | 567 | 3.3223 |
| 9 | 2 | 251 | 0.4902 | 25 | 6 | 616 | 3.6094 |
| 10 | 2 | 308 | 0.6016 | 26 | 64 spiral_1024QAM | 666 | 3.9023 |
| 11 | 2 | 379 | 0.7402 | 27 | 64 spiral_1024QAM | 719 | 4.2129 |
| 12 | 2 | 449 | 0.8770 | 28 | 64 spiral_1024QAM | 772 | 4.5234 |
| 13 | 2 | 526 | 1.0273 | 29 | 2 | reserved | |
| 14 | 2 | 602 | 1.1758 | 30 | 4 | reserved | |
| 15 | 4 | 340 | 1.3281 | 31 | 6 | reserved | |

Fig.8C

| MCS index $I_{MCS}$ | modulation order $Q_m$ | target code rate Rx[1024] | spectral efficiency | MCS index $I_{MCS}$ | modulation order $Q_m$ | target code rate Rx[1024] | spectral efficiency |
|---|---|---|---|---|---|---|---|
| 0 | q | 240/q | 0.2344 | 16 | 16 spiral_1024QAM | 658 | 2.5703 |
| 1 | q | 314/q | 0.3066 | 17 | 6 | 466 | 2.7305 |
| 2 | 2 | 193 | 0.3770 | 18 | 6 | 517 | 3.0293 |
| 3 | 2 | 251 | 0.4902 | 19 | 6 | 567 | 3.3223 |
| 4 | 2 | 308 | 0.6016 | 20 | 6 | 616 | 3.6094 |
| 5 | 2 | 379 | 0.7402 | 21 | 6 | 666 | 3.9023 |
| 6 | 2 | 449 | 0.8770 | 22 | 64 spiral_1024QAM | 719 | 4.2129 |
| 7 | 2 | 526 | 1.0273 | 23 | 64 spiral_1024QAM | 772 | 4.5234 |
| 8 | 2 | 602 | 1.1758 | 24 | 64 spiral_1024QAM | 822 | 4.8164 |
| 9 | 2 | 679 | 1.3262 | 25 | 64 spiral_1024QAM | 873 | 5.1152 |
| 10 | 4 | 340 | 1.3281 | 26 | 64 spiral_1024QAM | 910 | 5.3320 |
| 11 | 4 | 378 | 1.4766 | 27 | 64 spiral_1024QAM | 948 | 5.5547 |
| 12 | 4 | 434 | 1.6953 | 28 | q | reserved | |
| 13 | 4 | 490 | 1.9141 | 29 | 2 | reserved | |
| 14 | 16 spiral_1024QAM | 553 | 2.1602 | 30 | 4 | reserved | |
| 15 | 16 spiral_1024QAM | 616 | 2.4063 | 31 | 6 | reserved | |

Fig.8D

| MCS index $I_{MCS}$ | modulation order $Q_m$ | target code rate $R \times [1024]$ | spectral efficiency | MCS index $I_{MCS}$ | modulation order $Q_m$ | target code rate $R \times [1024]$ | spectral efficiency |
|---|---|---|---|---|---|---|---|
| 0 | q | 60/q | 0.0586 | 16 | 4 | 378 | 1.4766 |
| 1 | q | 80/q | 0.0781 | 17 | 4 | 434 | 1.6953 |
| 2 | q | 100/q | 0.0977 | 18 | 4 | 490 | 1.9141 |
| 3 | q | 128/q | 0.1250 | 19 | 4 | 553 | 2.1602 |
| 4 | q | 156/q | 0.1523 | 20 | 4 | 616 | 2.4063 |
| 5 | q | 198/q | 0.1934 | 21 | 16 spiral_1024QAM | 658 | 2.5703 |
| 6 | 2 | 120 | 0.2344 | 22 | 16 spiral_1024QAM | 699 | 2.7305 |
| 7 | 2 | 157 | 0.3066 | 23 | 16 spiral_1024QAM | 772 | 3.0156 |
| 8 | 2 | 193 | 0.3770 | 24 | 6 | 567 | 3.3223 |
| 9 | 2 | 251 | 0.4902 | 25 | 64 spiral_1024QAM | 616 | 3.6094 |
| 10 | 2 | 308 | 0.6016 | 26 | 64 spiral_1024QAM | 666 | 3.9023 |
| 11 | 2 | 379 | 0.7402 | 27 | 64 spiral_1024QAM | 772 | 4.5234 |
| 12 | 2 | 449 | 0.8770 | 28 | q | reserved | |
| 13 | 2 | 526 | 1.0273 | 29 | 2 | reserved | |
| 14 | 2 | 602 | 1.1758 | 30 | 4 | reserved | |
| 15 | 2 | 679 | 1.3262 | 31 | 6 | reserved | |

Fig.8E

| MCS index $I_{MCS}$ | modulation order $Q_m$ | target code rate Rx[1024] | spectral efficiency | MCS index $I_{MCS}$ | modulation order $Q_m$ | target code rate Rx[1024] | spectral efficiency |
|---|---|---|---|---|---|---|---|
| 0 | 2 | 120 | 0.2344 | 19 | 6 | 517 | 3.0293 |
| 1 | 2 | 157 | 0.3066 | 45 | 64 spiral_1024QAM(high PN) | 517 | 3.0293 |
| 2 | 2 | 193 | 0.3770 | 20 | 6 | 567 | 3.3223 |
| 3 | 2 | 251 | 0.4902 | 46 | 64 spiral_1024QAM(low PN) | 567 | 3.3223 |
| 4 | 2 | 308 | 0.6016 | 47 | 64 spiral_1024QAM(high PN) | 567 | 3.3223 |
| 5 | 2 | 379 | 0.7402 | 21 | 6 | 616 | 3.6094 |
| 6 | 2 | 449 | 0.8770 | 48 | 64 spiral_1024QAM(low PN) | 616 | 3.6094 |
| 7 | 2 | 526 | 1.0273 | 49 | 64 spiral_1024QAM(high PN) | 616 | 3.6094 |
| 8 | 2 | 602 | 1.1758 | 22 | 6 | 666 | 3.9023 |
| 9 | 2 | 679 | 1.3262 | 50 | 64 spiral_1024QAM(low PN) | 666 | 3.9023 |
| 10 | 4 | 340 | 1.3281 | 23 | 6 | 719 | 4.2129 |
| 32 | 16 spiral_1024QAM(low PN) | 340 | 1.3281 | 51 | 64 spiral_1024QAM(high PN) | 719 | 4.2129 |
| 11 | 4 | 378 | 1.4766 | 24 | 6 | 772 | 4.5234 |
| 33 | 16 spiral_1024QAM(high PN) | 378 | 1.4766 | 52 | 64 spiral_1024QAM(low PN) | 772 | 4.5234 |
| 12 | 4 | 434 | 1.6953 | 53 | 64 spiral_1024QAM(high PN) | 772 | 4.5234 |
| 34 | 16 spiral_1024QAM(low PN) | 434 | 1.6953 | 25 | 6 | 822 | 4.8164 |
| 35 | 16 spiral_1024QAM(high PN) | 434 | 1.6953 | 54 | 64 spiral_1024QAM(low PN) | 822 | 4.8164 |
| 13 | 4 | 490 | 1.9141 | 55 | 64 spiral_1024QAM(high PN) | 822 | 4.8164 |
| 36 | 16 spiral_1024QAM(low PN) | 490 | 1.9141 | 26 | 6 | 873 | 5.1152 |
| 37 | 16 spiral_1024QAM(high PN) | 490 | 1.9141 | 56 | 64 spiral_1024QAM(low PN) | 873 | 5.1152 |
| 14 | 4 | 553 | 2.1602 | 57 | 64 spiral_1024QAM(high PN) | 873 | 5.1152 |
| 38 | 16 spiral_1024QAM(low PN) | 553 | 2.1602 | 27 | 6 | 910 | 5.3320 |
| 39 | 16 spiral_1024QAM(high PN) | 553 | 2.1602 | 58 | 64 spiral 1024QAM(low PN) | 910 | 5.3320 |
| 15 | 4 | 616 | 2.4063 | 28 | 6 | 948 | 5.5547 |
| 40 | 16 spiral_1024QAM(low PN) | 616 | 2.4063 | 59 | 64 spiral_1024QAM(high PN) | 948 | 5.5547 |
| 41 | 16 spiral_1024QAM(high PN) | 616 | 2.4063 | 29 | 2 | reserved | |
| 16 | 4 | 658 | 2.5703 | 30 | 4 | reserved | |
| 42 | 16 spiral_1024QAM(low PN) | 658 | 2.5703 | 60 | 16 spiral_1024QAM(low PN) | reserved | |
| 17 | 6 | 438 | 2.5664 | 61 | 16 spiral_1024QAM(high PN) | reserved | |
| 43 | 64 spiral_1024QAM(high PN) | 438 | 2.5664 | 31 | 6 | reserved | |
| 18 | 6 | 466 | 2.7305 | 62 | 64 spiral_1024QAM(low PN) | reserved | |
| 44 | 64 spiral_1024QAM(low PN) | 466 | 2.7305 | 63 | 64 spiral_1024QAM(high PN) | reserved | |

Fig. 9A

| MCS index $I_{MCS}$ | modulation order $Q_m$ | target code rate $R \times [1024]$ | spectral efficiency | MCS index $I_{MCS}$ | modulation order $Q_m$ | target code rate $R \times [1024]$ | spectral efficiency |
|---|---|---|---|---|---|---|---|
| 0 | 2 | 120 | 0.2344 | 18 | 6 | 822 | 4.8164 |
| 1 | 2 | 193 | 0.3770 | 46 | 64 spiral_1024QAM(low PN) | 822 | 4.8164 |
| 2 | 2 | 308 | 0.6016 | 19 | 6 | 873 | 5.1152 |
| 3 | 2 | 449 | 0.8770 | 47 | 64 spiral_1024QAM(high PN) | 873 | 5.1152 |
| 4 | 2 | 602 | 1.1758 | 20 | 8 | 682.5 | 5.3320 |
| 5 | 4 | 378 | 1.4766 | 48 | 256 spiral_1024QAM(low PN) | 682.5 | 5.3320 |
| 32 | 16 spiral_1024QAM(low PN) | 378 | 1.4766 | 49 | 256 spiral_1024QAM(high PN) | 682.5 | 5.3320 |
| 6 | 4 | 434 | 1.6953 | 21 | 8 | 711 | 5.5547 |
| 33 | 16 spiral_1024QAM(high PN) | 434 | 1.6953 | 50 | 256 spiral_1024QAM(low PN) | 711 | 5.5547 |
| 7 | 4 | 490 | 1.9141 | 22 | 8 | 754 | 5.8906 |
| 34 | 16 spiral_1024QAM(low PN) | 490 | 1.9141 | 51 | 256 spiral_1024QAM(high PN) | 754 | 5.8906 |
| 8 | 4 | 553 | 2.1602 | 23 | 8 | 797 | 6.2266 |
| 35 | 16 spiral_1024QAM(high PN) | 553 | 2.1602 | 52 | 256 spiral_1024QAM(low PN) | 797 | 6.2266 |
| 9 | 4 | 616 | 2.4063 | 24 | 8 | 841 | 6.5703 |
| 36 | 16 spiral_1024QAM(low PN) | 616 | 2.4063 | 53 | 256 spiral_1024QAM(high PN) | 841 | 6.5703 |
| 10 | 4 | 658 | 2.5703 | 25 | 8 | 885 | 6.9141 |
| 37 | 16 spiral_1024QAM(high PN) | 658 | 2.5703 | 54 | 256 spiral_1024QAM(low PN) | 885 | 6.9141 |
| 11 | 6 | 466 | 2.7305 | 26 | 8 | 916.5 | 7.1602 |
| 38 | 64 spiral_1024QAM(low PN) | 466 | 2.7305 | 55 | 256 spiral_1024QAM(high PN) | 916.5 | 7.1602 |
| 39 | 64 spiral_1024QAM(high PN) | 466 | 2.7305 | 27 | 8 | 948 | 7.4063 |
| 12 | 6 | 517 | 3.0293 | 56 | 256 spiral_1024QAM(low PN) | 948 | 7.4063 |
| 40 | 64 spiral_1024QAM(low PN) | 517 | 3.0293 | 57 | 256 spiral_1024QAM(high PN) | 948 | 7.4063 |
| 13 | 6 | 567 | 3.3223 | 28 | 2 | reserved | |
| 41 | 64 spiral_1024QAM(high PN) | 567 | 3.3223 | 29 | 4 | reserved | |
| 14 | 6 | 616 | 3.6094 | 58 | 16 spiral_1024QAM(low PN) | reserved | |
| 42 | 64 spiral_1024QAM(low PN) | 616 | 3.6094 | 59 | 16 spiral_1024QAM(high PN) | reserved | |
| 15 | 6 | 666 | 3.9023 | 30 | 6 | reserved | |
| 43 | 64 spiral_1024QAM(high PN) | 666 | 3.9023 | 60 | 64 spiral_1024QAM(low PN) | reserved | |
| 16 | 6 | 719 | 4.2129 | 61 | 64 spiral_1024QAM(high PN) | reserved | |
| 44 | 64 spiral_1024QAM(low PN) | 719 | 4.2129 | 31 | 8 | reserved | |
| 17 | 6 | 772 | 4.5234 | 62 | 256 spiral_1024QAM(low PN) | reserved | |
| 45 | 64 spiral_1024QAM(high PN) | 772 | 4.5234 | 63 | 256 spiral_1024QAM(high PN) | reserved | |

Fig. 9B

| MCS index $I_{MCS}$ | modulation order $Q_m$ | target code rate $R \times [1024]$ | spectral efficiency | MCS index $I_{MCS}$ | modulation order $Q_m$ | target code rate $R \times [1024]$ | spectral efficiency |
|---|---|---|---|---|---|---|---|
| 0 | 2 | 30 | 0.0586 | 43 | 16 spiral_1024QAM(high PN) | 616 | 2.4063 |
| 1 | 2 | 40 | 0.0781 | 21 | 6 | 438 | 2.5664 |
| 2 | 2 | 50 | 0.0977 | 44 | 64 spiral_1024QAM(low PN) | 438 | 2.5664 |
| 3 | 2 | 64 | 0.1250 | 45 | 64 spiral_1024QAM(high PN) | 438 | 2.5664 |
| 4 | 2 | 78 | 0.1523 | 22 | 6 | 466 | 2.7305 |
| 5 | 2 | 99 | 0.1934 | 46 | 64 spiral_1024QAM(low PN) | 466 | 2.7305 |
| 6 | 2 | 120 | 0.2344 | 47 | 64 spiral_1024QAM(high PN) | 466 | 2.7305 |
| 7 | 2 | 157 | 0.3066 | 23 | 6 | 517 | 3.0293 |
| 8 | 2 | 193 | 0.3770 | 48 | 64 spiral_1024QAM(low PN) | 517 | 3.0293 |
| 9 | 2 | 251 | 0.4902 | 49 | 64 spiral_1024QAM(high PN) | 517 | 3.0293 |
| 10 | 2 | 308 | 0.6016 | 24 | 6 | 567 | 3.3223 |
| 11 | 2 | 379 | 0.7402 | 50 | 64 spiral_1024QAM(low PN) | 567 | 3.3223 |
| 12 | 2 | 449 | 0.8770 | 51 | 64 spiral_1024QAM(high PN) | 567 | 3.3223 |
| 13 | 2 | 526 | 1.0273 | 25 | 6 | 616 | 3.6094 |
| 14 | 2 | 602 | 1.1758 | 52 | 64 spiral_1024QAM(low PN) | 616 | 3.6094 |
| 15 | 4 | 340 | 1.3281 | 53 | 64 spiral_1024QAM(high PN) | 616 | 3.6094 |
| 32 | 16 spiral_1024QAM(low PN) | 340 | 1.3281 | 26 | 6 | 666 | 3.9023 |
| 33 | 16 spiral_1024QAM(high PN) | 340 | 1.3281 | 54 | 64 spiral_1024QAM(low PN) | 666 | 3.9023 |
| 16 | 4 | 378 | 1.4766 | 55 | 64 spiral_1024QAM(high PN) | 666 | 3.9023 |
| 34 | 16 spiral_1024QAM(low PN) | 378 | 1.4766 | 27 | 6 | 719 | 4.2129 |
| 35 | 16 spiral_1024QAM(high PN) | 378 | 1.4766 | 56 | 64 spiral_1024QAM(low PN) | 719 | 4.2129 |
| 17 | 4 | 434 | 1.6953 | 57 | 64 spiral_1024QAM(high PN) | 719 | 4.2129 |
| 36 | 16 spiral_1024QAM(low PN) | 434 | 1.6953 | 28 | 6 | 772 | 4.5234 |
| 37 | 16 spiral_1024QAM(high PN) | 434 | 1.6953 | 58 | 64 spiral_1024QAM(low PN) | 772 | 4.5234 |
| 18 | 4 | 490 | 1.9141 | 59 | 64 spiral_1024QAM(high PN) | 772 | 4.5234 |
| 38 | 16 spiral_1024QAM(low PN) | 490 | 1.9141 | 29 | 2 | reserved | |
| 39 | 16 spiral_1024QAM(high PN) | 490 | 1.9141 | 30 | 4 | reserved | |
| 19 | 4 | 553 | 2.1602 | 60 | 16 spiral_1024QAM(low PN) | reserved | |
| 40 | 16 spiral_1024QAM(low PN) | 553 | 2.1602 | 61 | 16 spiral_1024QAM(high PN) | reserved | |
| 41 | 16 spiral_1024QAM(high PN) | 553 | 2.1602 | 31 | 6 | reserved | |
| 20 | 4 | 616 | 2.4063 | 62 | 64 spiral_1024QAM(low PN) | reserved | |
| 42 | 16 spiral_1024QAM(low PN) | 616 | 2.4063 | 63 | 64 spiral_1024QAM(high PN) | reserved | |

Fig. 9C

| MCS index $I_{MCS}$ | modulation order $Q_m$ | target code rate $R\times[1024]$ | spectral efficiency | MCS index $I_{MCS}$ | modulation order $Q_m$ | target code rate $R\times[1024]$ | spectral efficiency |
|---|---|---|---|---|---|---|---|
| 0 | q | 240/q | 0.2344 | 19 | 6 | 567 | 3.3223 |
| 1 | q | 314/q | 0.3066 | 45 | 64 spiral_1024QAM(high PN) | 567 | 3.3223 |
| 2 | 2 | 193 | 0.3770 | 20 | 6 | 616 | 3.6094 |
| 3 | 2 | 251 | 0.4902 | 46 | 64 spiral_1024QAM(low PN) | 616 | 3.6094 |
| 4 | 2 | 308 | 0.6016 | 47 | 64 spiral_1024QAM(high PN) | 616 | 3.6094 |
| 5 | 2 | 379 | 0.7402 | 21 | 6 | 666 | 3.9023 |
| 6 | 2 | 449 | 0.8770 | 48 | 64 spiral_1024QAM(low PN) | 666 | 3.9023 |
| 7 | 2 | 526 | 1.0273 | 49 | 64 spiral_1024QAM(high PN) | 666 | 3.9023 |
| 8 | 2 | 602 | 1.1758 | 22 | 6 | 719 | 4.2129 |
| 9 | 2 | 679 | 1.3262 | 50 | 64 spiral_1024QAM(low PN) | 719 | 4.2129 |
| 10 | 4 | 340 | 1.3281 | 51 | 64 spiral_1024QAM(high PN) | 719 | 4.2129 |
| 32 | 16 spiral_1024QAM(low PN) | 340 | 1.3281 | 23 | 6 | 772 | 4.5234 |
| 11 | 4 | 378 | 1.4766 | 52 | 64 spiral_1024QAM(low PN) | 772 | 4.5234 |
| 33 | 16 spiral_1024QAM(high PN) | 378 | 1.4766 | 53 | 64 spiral_1024QAM(high PN) | 772 | 4.5234 |
| 12 | 4 | 434 | 1.6953 | 24 | 6 | 822 | 4.8164 |
| 34 | 16 spiral_1024QAM(low PN) | 434 | 1.6953 | 54 | 64 spiral_1024QAM(low PN) | 822 | 4.8164 |
| 35 | 16 spiral_1024QAM(high PN) | 434 | 1.6953 | 25 | 6 | 873 | 5.1152 |
| 13 | 4 | 490 | 1.9141 | 55 | 64 spiral_1024QAM(high PN) | 873 | 5.1152 |
| 36 | 16 spiral_1024QAM(low PN) | 490 | 1.9141 | 26 | 6 | 910 | 5.3320 |
| 37 | 16 spiral_1024QAM(high PN) | 490 | 1.9141 | 56 | 64 spiral_1024QAM(low PN) | 910 | 5.3320 |
| 14 | 4 | 553 | 2.1602 | 57 | 64 spiral_1024QAM(high PN) | 910 | 5.3320 |
| 38 | 16 spiral_1024QAM(low PN) | 553 | 2.1602 | 27 | 6 | 948 | 5.5547 |
| 39 | 16 spiral_1024QAM(high PN) | 553 | 2.1602 | 58 | 64 spiral_1024QAM(low PN) | 948 | 5.5547 |
| 15 | 4 | 616 | 2.4063 | 59 | 64 spiral_1024QAM(high PN) | 948 | 5.5547 |
| 40 | 16 spiral_1024QAM(low PN) | 616 | 2.4063 | 28 | q | reserved | |
| 41 | 16 spiral_1024QAM(high PN) | 616 | 2.4063 | 29 | 2 | reserved | |
| 16 | 4 | 658 | 2.5703 | 30 | 4 | reserved | |
| 42 | 16 spiral_1024QAM(low PN) | 658 | 2.5703 | 60 | 16 spiral_1024QAM(low PN) | reserved | |
| 17 | 6 | 466 | 2.7305 | 61 | 16 spiral_1024QAM(high PN) | reserved | |
| 43 | 64 spiral_1024QAM(high PN) | 466 | 2.7305 | 31 | 6 | reserved | |
| 18 | 6 | 517 | 3.0293 | 62 | 64 spiral_1024QAM(low PN) | reserved | |
| 44 | 64 spiral_1024QAM(low PN) | 517 | 3.0293 | 63 | 64 spiral_1024QAM(high PN) | reserved | |

Fig. 9D

| MCS index $I_{mcs}$ | modulation order $Q_m$ | target code rate Rx[1024] | spectral efficiency | MCS index $I_{mcs}$ | modulation order $Q_m$ | target code rate Rx[1024] | spectral efficiency |
|---|---|---|---|---|---|---|---|
| 0 | q | 60/q | 0.0586 | 21 | 4 | 658 | 2.5703 |
| 1 | q | 80/q | 0.0781 | 43 | 16 spiral_1024QAM(low PN) | 658 | 2.5703 |
| 2 | q | 100/q | 0.0977 | 44 | 16 spiral_1024QAM(medium PN) | 658 | 2.5703 |
| 3 | q | 128/q | 0.1250 | 45 | 16 spiral_1024QAM(high PN) | 658 | 2.5703 |
| 4 | q | 156/q | 0.1523 | 22 | 4 | 699 | 2.7305 |
| 5 | q | 198/q | 0.1934 | 46 | 16 spiral_1024QAM(low PN) | 699 | 2.7305 |
| 6 | 2 | 120 | 0.2344 | 47 | 16 spiral_1024QAM(high PN) | 699 | 2.7305 |
| 7 | 2 | 157 | 0.3066 | 23 | 4 | 772 | 3.0156 |
| 8 | 2 | 193 | 0.3770 | 48 | 16 spiral_1024QAM(low PN) | 772 | 3.0156 |
| 9 | 2 | 251 | 0.4902 | 49 | 16 spiral_1024QAM(high PN) | 772 | 3.0156 |
| 10 | 2 | 308 | 0.6016 | 24 | 6 | 567 | 3.3223 |
| 11 | 2 | 379 | 0.7402 | 50 | 64 spiral_1024QAM(low PN) | 567 | 3.3223 |
| 12 | 2 | 449 | 0.8770 | 51 | 64 spiral_1024QAM(high PN) | 567 | 3.3223 |
| 13 | 2 | 526 | 1.0273 | 25 | 6 | 616 | 3.6094 |
| 14 | 2 | 602 | 1.1758 | 52 | 64 spiral_1024QAM(low PN) | 616 | 3.6094 |
| 15 | 2 | 679 | 1.3262 | 53 | 64 spiral_1024QAM(medium PN) | 616 | 3.6094 |
| 16 | 4 | 378 | 1.4766 | 54 | 64 spiral_1024QAM(high PN) | 616 | 3.6094 |
| 32 | 16 spiral_1024QAM(low PN) | 378 | 1.4766 | 26 | 6 | 666 | 3.9023 |
| 33 | 16 spiral_1024QAM(high PN) | 378 | 1.4766 | 55 | 64 spiral_1024QAM(low PN) | 666 | 3.9023 |
| 17 | 4 | 434 | 1.6953 | 56 | 64 spiral_1024QAM(high PN) | 666 | 3.9023 |
| 34 | 16 spiral_1024QAM(low PN) | 434 | 1.6953 | 27 | 6 | 772 | 4.5234 |
| 35 | 16 spiral_1024QAM(medium PN) | 434 | 1.6953 | 57 | 64 spiral_1024QAM(low PN) | 772 | 4.5234 |
| 36 | 16 spiral_1024QAM(high PN) | 434 | 1.6953 | 58 | 64 spiral_1024QAM(medium PN) | 772 | 4.5234 |
| 18 | 4 | 490 | 1.9141 | 59 | 64 spiral_1024QAM(high PN) | 772 | 4.5234 |
| 37 | 16 spiral_1024QAM(low PN) | 490 | 1.9141 | 28 | q | reserved | |
| 38 | 16 spiral_1024QAM(high PN) | 490 | 1.9141 | 29 | 2 | reserved | |
| 19 | 4 | 553 | 2.1602 | 30 | 4 | reserved | |
| 39 | 16 spiral_1024QAM(low PN) | 553 | 2.1602 | 60 | 16 spiral_1024QAM(low PN) | reserved | |
| 40 | 16 spiral_1024QAM(high PN) | 553 | 2.1602 | 61 | 16 spiral_1024QAM(high PN) | reserved | |
| 20 | 4 | 616 | 2.4063 | 31 | 6 | reserved | |
| 41 | 16 spiral_1024QAM(low PN) | 616 | 2.4063 | 62 | 64 spiral_1024QAM(low PN) | reserved | |
| 42 | 16 spiral_1024QAM(high PN) | 616 | 2.4063 | 63 | 64 spiral_1024QAM(high PN) | reserved | |

Fig. 9E

| MCS index $I_{MCS}$ | modulation order $Q_m$ | target code rate Rx[1024] | spectral efficiency |
|---|---|---|---|
| 0 | 16 spiral_1024QAM | 340 | 1.3281 |
| 1 | 16 spiral_1024QAM | 434 | 1.6953 |
| 2 | 16 spiral_1024QAM | 490 | 1.9141 |
| 3 | 16 spiral_1024QAM | 553 | 2.1602 |
| 4 | 16 spiral_1024QAM | 616 | 2.4063 |
| 5 | 16 spiral_1024QAM | 658 | 2.5703 |
| 6 | 64 spiral_1024QAM | 466 | 2.7305 |
| 7 | 64 spiral_1024QAM | 567 | 3.3223 |
| 8 | 64 spiral_1024QAM | 616 | 3.6094 |
| 9 | 64 spiral_1024QAM | 666 | 3.9023 |
| 10 | 64 spiral_1024QAM | 719 | 4.2129 |
| 11 | 64 spiral_1024QAM | 772 | 4.5234 |
| 12 | 64 spiral_1024QAM | 822 | 4.8164 |
| 13 | 64 spiral_1024QAM | 873 | 5.1152 |
| 14 | 64 spiral_1024QAM | 910 | 5.3320 |
| 15 | 64 spiral_1024QAM | 948 | 5.5547 |

Fig. 10A

| MCS index $I_{MCS}$ | modulation order $Q_m$ | target code rate Rx[1024] | spectral efficiency | MCS index $I_{MCS}$ | modulation order $Q_m$ | target code rate Rx[1024] | spectral efficiency |
|---|---|---|---|---|---|---|---|
| 0 | 1 ( pi/2-BPSK ) | 240 | 0.2344 | 16 | 64 spiral_1024QAM | 719 | 4.2129 |
| 1 | 1 ( pi/2-BPSK ) | 314 | 0.3066 | 17 | 64 spiral_1024QAM | 772 | 4.5234 |
| 2 | 2 | 602 | 1.1758 | 18 | 64 spiral_1024QAM | 822 | 4.8164 |
| 3 | 2 | 679 | 1.3262 | 19 | 64 spiral_1024QAM | 873 | 5.1152 |
| 4 | 16 spiral_1024QAM | 340 | 1.3281 | 20 | 256 spiral_1024QAM | 682.5 | 5.3320 |
| 5 | 16 spiral_1024QAM | 378 | 1.4766 | 21 | 256 spiral_1024QAM | 711 | 5.5547 |
| 6 | 16 spiral_1024QAM | 434 | 1.6953 | 22 | 256 spiral_1024QAM | 754 | 5.8906 |
| 7 | 16 spiral_1024QAM | 490 | 1.9141 | 23 | 256 spiral_1024QAM | 797 | 6.2266 |
| 8 | 16 spiral_1024QAM | 553 | 2.1602 | 24 | 256 spiral_1024QAM | 841 | 6.5703 |
| 9 | 16 spiral_1024QAM | 616 | 2.4063 | 25 | 256 spiral_1024QAM | 885 | 6.9141 |
| 10 | 16 spiral_1024QAM | 658 | 2.5703 | 26 | 256 spiral_1024QAM | 916.5 | 7.1602 |
| 11 | 64 spiral_1024QAM | 466 | 2.7305 | 27 | 256 spiral_1024QAM | 948 | 7.4063 |
| 12 | 64 spiral_1024QAM | 517 | 3.0293 | 28 | 1/2 | reserved | |
| 13 | 64 spiral_1024QAM | 567 | 3.3223 | 29 | 16 spiral_1024QAM | reserved | |
| 14 | 64 spiral_1024QAM | 616 | 3.6094 | 30 | 64 spiral_1024QAM | reserved | |
| 15 | 64 spiral_1024QAM | 666 | 3.9023 | 31 | 256 spiral_1024QAM | reserved | |

Fig. 10B

| MCS index $I_{MCS}$ | modulation order $Q_m$ | target code rate Rx[1024] | spectral efficiency | MCS index $I_{MCS}$ | modulation order $Q_m$ | target code rate Rx[1024] | spectral efficiency |
|---|---|---|---|---|---|---|---|
| 0 | 1 | 240 | 0.2344 | 32 | 64 spiral_1024QAM | 438 | 2.5664 |
| 1 | 1 | 314 | 0.3066 | 33 | 64 spiral_1024QAM | 466 | 2.7305 |
| 2 | 1 (pi/2-BPSK) | 240 | 0.2344 | 34 | 64 spiral_1024QAM | 517 | 3.0293 |
| 3 | 1 (pi/2-BPSK) | 314 | 0.3066 | 35 | 64 spiral_1024QAM | 553 | 3.2402 |
| 4 | 1 (pi/4-BPSK) | 240 | 0.2344 | 36 | 64 spiral_1024QAM | 567 | 3.3223 |
| 5 | 1 (pi/4-BPSK) | 314 | 0.3066 | 37 | 64 spiral_1024QAM | 616 | 3.6094 |
| 6 | 2 | 308 | 0.6016 | 38 | 64 spiral_1024QAM | 658 | 3.8555 |
| 7 | 2 | 379 | 0.7402 | 39 | 64 spiral_1024QAM | 666 | 3.9023 |
| 8 | 2 | 449 | 0.8770 | 40 | 64 spiral_1024QAM | 719 | 4.2129 |
| 9 | 2 | 526 | 1.0273 | 41 | 64 spiral_1024QAM | 754 | 4.4180 |
| 10 | 2 | 602 | 1.1758 | 42 | 64 spiral_1024QAM | 772 | 4.5234 |
| 11 | 2 | 679 | 1.3262 | 43 | 64 spiral_1024QAM | 822 | 4.8164 |
| 12 | 2 (pi/4-QPSK) | 308 | 0.6016 | 44 | 64 spiral_1024QAM | 841 | 4.9277 |
| 13 | 2 (pi/4-QPSK) | 379 | 0.7402 | 45 | 64 spiral_1024QAM | 873 | 5.1152 |
| 14 | 2 (pi/4-QPSK) | 449 | 0.8770 | 46 | 64 spiral_1024QAM | 910 | 5.3320 |
| 15 | 2 (pi/4-QPSK) | 526 | 1.0273 | 47 | 64 spiral_1024QAM | 948 | 5.5547 |
| 16 | 2 (pi/4-QPSK) | 602 | 1.1758 | 48 | 256 spiral_1024QAM | 517 | 4.0391 |
| 17 | 2 (pi/4-QPSK) | 679 | 1.3262 | 49 | 256 spiral_1024QAM | 567 | 4.4297 |
| 18 | 16 spiral_1024QAM | 340 | 1.3281 | 50 | 256 spiral_1024QAM | 616 | 4.8125 |
| 19 | 16 spiral_1024QAM | 378 | 1.4766 | 51 | 256 spiral_1024QAM | 658 | 5.1406 |
| 20 | 16 spiral_1024QAM | 434 | 1.6953 | 52 | 256 spiral_1024QAM | 682.5 | 5.3320 |
| 21 | 16 spiral_1024QAM | 490 | 1.9141 | 53 | 256 spiral_1024QAM | 711 | 5.5547 |
| 22 | 16 spiral_1024QAM | 553 | 2.1602 | 54 | 256 spiral_1024QAM | 754 | 5.8906 |
| 23 | 16 spiral_1024QAM | 616 | 2.4063 | 55 | 256 spiral_1024QAM | 797 | 6.2266 |
| 24 | 16 spiral_1024QAM | 658 | 2.5703 | 56 | 256 spiral_1024QAM | 841 | 6.5703 |
| 25 | 16 spiral_1024QAM | 699 | 2.7305 | 57 | 256 spiral_1024QAM | 885 | 6.9141 |
| 26 | 16 spiral_1024QAM | 719 | 2.8086 | 58 | 256 spiral_1024QAM | 916.5 | 7.1602 |
| 27 | 16 spiral_1024QAM | 772 | 3.0156 | 59 | 256 spiral_1024QAM | 948 | 7.4063 |
| 28 | 16 spiral_1024QAM | 822 | 3.2109 | 60 | 1/2 | reserved | |
| 29 | 16 spiral_1024QAM | 873 | 3.4102 | 61 | 16 spiral_1024QAM | reserved | |
| 30 | 16 spiral_1024QAM | 910 | 3.5547 | 62 | 64 spiral_1024QAM | reserved | |
| 31 | 16 spiral_1024QAM | 948 | 3.7031 | 63 | 256 spiral_1024QAM | reserved | |

Fig. 10C information about
MCS index information about
modulation parameter

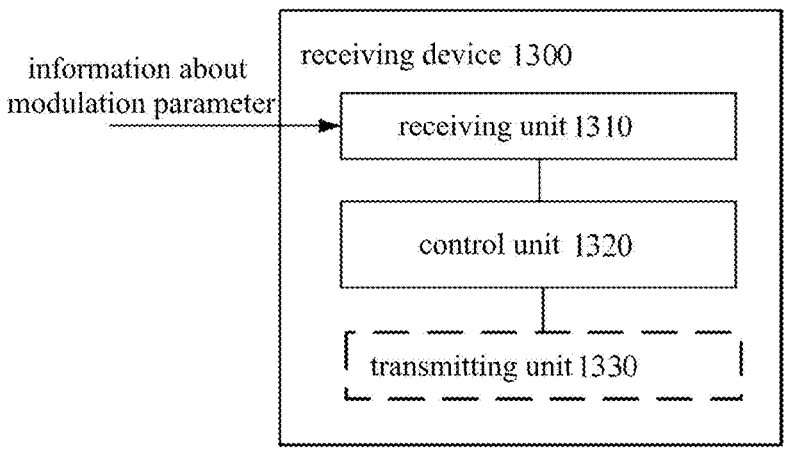

information about modulation parameter receiving device 1300 receiving unit 1310 control unit 1320 transmitting unit 1330

Fig.13

| index | N1 | | N2 | | N3 | |
|---|---|---|---|---|---|---|
| | PN11 | PN12 | PN21 | PN22 | PN31 | PN32 |
| 0 | {fs11, $\alpha$11, $\beta$11, M11} | {fs12, $\alpha$12, $\beta$12, M12} | {fs21, $\alpha$21, $\beta$21, M21} | {fs22, $\alpha$22, $\beta$22, M22} | {fs31, $\alpha$31, $\beta$31, M31} | {fs32, $\alpha$32, $\beta$32, M32} |
| 1 | {fs13, $\alpha$13, $\beta$13, M13} | {fs14, $\alpha$14, $\beta$14, M14} | {fs23, $\alpha$23, $\beta$23, M23} | {fs24, $\alpha$24, $\beta$24, M24} | {fs33, $\alpha$33, $\beta$33, M33} | {fs34, $\alpha$34, $\beta$34, M34} |
| 2 | ...... | ...... | ...... | ...... | ...... | ...... |

Fig.14A

| index | N1 | N2 | N3 |
|---|---|---|---|
| 0 | {fs11, $\alpha$11, $\beta$11, M11} | {fs21, $\alpha$21, $\beta$21, M21} | {fs31, $\alpha$31, $\beta$31, M31} |
| 1 | {fs12, $\alpha$12, $\beta$12, M12} | {fs22, $\alpha$22, $\beta$22, M22} | {fs32, $\alpha$32, $\beta$32, M32} |
| 2 | {fs13, $\alpha$13, $\beta$13, M13} | {fs23, $\alpha$23, $\beta$23, M23} | {fs33, $\alpha$33, $\beta$33, M33} |
| 3 | ... | ... | ... |

Fig.14B

1500                    S1501 obtaining a bit sequence to be transmitted

S1502 performing pseudo-N-order first type
of modulation on the bit sequence
to be transmitted, according to
information about phase noise

1600                    S1601 obtaining a symbol after
pseudo-N-order first type of modulation

S1602 demodulating the symbol
according to information about phase
noise to obtain a bit sequence <u>1700</u>

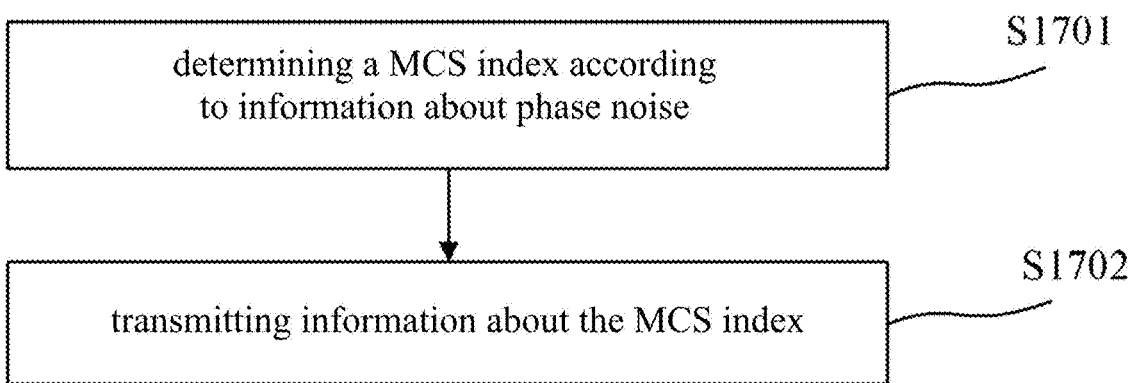

S1701 determining a MCS index according to information about phase noise

S1702 transmitting information about the MCS index

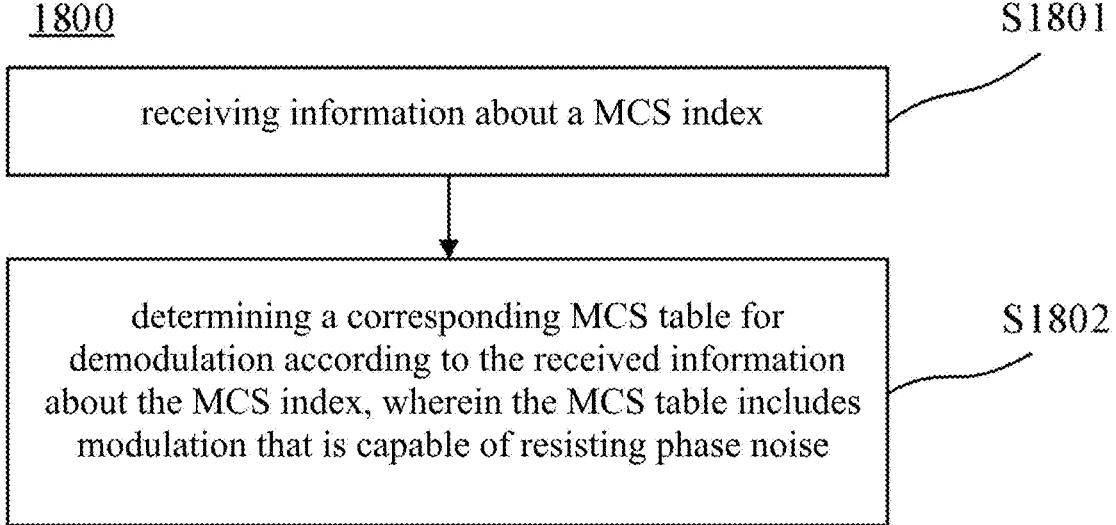

receiving information about a MCS index

S1802 determining a corresponding MCS table for demodulation according to the received information about the MCS index, wherein the MCS table includes modulation that is capable of resisting phase noise

TRANSMITTING DEVICE, RECEIVING DEVICE, AND MODULATION METHOD

TECHNICAL FIELD

The present disclosure relates to a field of wireless communication, and more particularly, to a modulation method and a corresponding transmitting device and a corresponding receiving device.

BACKGROUND

In order to ensure high data rate, in the 6G communication system, it is required to make full use of all available communication frequency spectrums, such as centimeter wave (Sub-6 GHz), millimeter wave (millimeter wave), terahertz (THz), an optical communication frequency band and so on. However, working in high frequency band will bring a series of non-ideal behaviors to hardware devices. For example, phase noise generated by a radio frequency oscillator. This makes mathematical modeling difficult and seriously affects the power efficiency and transmission performance of the system.

QAM, which is widely used in the 3rd Generation Mobile Communication Partnership Project (3GPP) standard, has been used in various broadband wireless communication systems such as LTE, HSPA, 802.11n and 5G. In QAM, all vector endpoints are redistributed reasonably by combining amplitude and phase parameters and making full use of a whole signal plane. Thus, without reducing a minimum Euclidean distance for a location of an end point, the number of end points of a signal vector is increased and the interference resisting ability and spectrum utilization rate of a system are improved. However, QAM has poor robustness of resisting the phase noise (anti-phase noise), which leads to the significant negative impact of the phase noise generated by the radio frequency oscillator on system transmission.

According to the source of the phase noise, the phase noise can be generally divided into system phase noise and non-system phase noise. The system phase noise may include, for example, phase noise related to a frequency processing device, while the non-system phase noise may include, for example, phase noise related to a working environment, channel conditions, movement situation, etc. In order to reduce the influence of the phase noise, some phase noise resisting techniques are usually selected to be adopted in a modulation process at a transmitting end or in detection, estimation and demodulation processes at a receiving end. The existing schemes of resisting the phase noise mainly include: resisting the phase noise based on neural networks, modifying or optimizing a modulation module at the transmitting end, suppressing and compensating the phase noise by a carrier recovery module at the receiving end, and estimating and compensating interference of the phase noise by soft demodulation at the receiving end.

At present, constellation modulation with Spiral structure (hereinafter also called "spiral modulation" or "spiral constellation modulation") is considered to have remarkable performance of resisting the phase noise. However, although the spiral modulation can effectively resist the phase noise, the current spiral modulation has not been adopted by standards such as 5G. Moreover, the spiral modulation is not compatible with modulation schemes with high spectral efficiency, such as QAM. This leads to that electronic device may need different transceiver structures for different modulation methods, which makes the hardware design complicated.

SUMMARY

According to an aspect of the present disclosure, there is provided a transmitting device including: a receiving unit configured to obtain a bit sequence to be transmitted; a control unit configured to perform pseudo-N-order first type of modulation on the bit sequence to be transmitted, according to information about phase noise, wherein $2^{\wedge}N$ first symbols of the pseudo-N-order first type of modulation correspond to a part of $2^{\wedge}M$ second symbols of M-order second type of modulation, where M and N are positive integers.

According to another aspect of the present disclosure, the control unit of the transmitting device performs the pseudo-N-order first type of modulation on the bit sequence to be transmitted according to a bit-to-symbol mapping table.

According to another aspect of the present disclosure, according to the pseudo-N-order first type of modulation, bit-to-symbol mapping is performed in units of N first bits; according to the M-order second type of modulation, the bit-to-symbol mapping is performed in units of M second bits, wherein M is greater than N, and is a positive integer.

According to another aspect of the present disclosure, the pseudo-N-order first type of modulation is pseudo-N-order spiral modulation.

According to another aspect of the present disclosure, the $2^{\wedge}N$ first symbols of the pseudo-N-order first type of modulation are determined based on the $2^{\wedge}M$ second symbols, according to at least one of an amplitude weighting parameter and a phase weighting parameter.

According to another aspect of the present disclosure, symbols in N-order first type of modulation corresponding to the pseudo-N-order first type of modulation are determined according to a spiral factor, and the spiral factor is determined according to symbol number of an outermost layer of a spiral.

According to yet another aspect of the present disclosure, there is provided a receiving device including: a receiving unit configured to obtain a symbol after pseudo-N-order first type of modulation; and a control unit configured to demodulate the symbol according to information about phase noise to obtain a received bit sequence, wherein N is a positive integer.

According to another aspect of the present disclosure, the control unit of the receiving device demodulates the symbol according to a bit-to-symbol mapping table.

According to yet another aspect of the present disclosure, there is provided a modulation method comprising: obtaining a bit sequence to be transmitted; performing pseudo-N-order first type of modulation on the bit sequence to be transmitted, according to information about phase noise, wherein $2^{\wedge}N$ first symbols of the pseudo-N-order first type of modulation correspond to a part of $2^{\wedge}M$ second symbols of M-order second type of modulation, where M and N are positive integers.

According to another aspect of the present disclosure, the performing of the pseudo-N-order first type of modulation on the bit sequence to be transmitted is based on a bit-to-symbol mapping table.

According to yet another aspect of the present disclosure, there is provided a transmitting device comprising: a control unit configured to determine a modulation and coding strategy (MCS) index according to information about phase noise; and a transmitting unit configured to transmit information about the MCS index.

According to another aspect of the present disclosure, the control unit of the transmitting device determines one MCS table among a plurality of MCS tables according to the information about the phase noise, and determines the MCS index from the determined MCS table.

According to another aspect of the present disclosure, the control unit of the transmitting device determines the MCS index from the determined MCS table according to the information about the phase noise.

According to another aspect of the present disclosure, the determined MCS table includes modulation capable of resisting the phase noise.

According to another aspect of the present disclosure, the determined MCS table further includes a second type of modulation different from the modulation capable of resisting the phase noise.

According to another aspect of the present disclosure, the modulation capable of resisting the phase noise is pseudo spiral modulation based on the second type of modulation.

According to another aspect of the present disclosure, the transmitting unit of the transmitting device is further configured to transmit information about a MCS table identifier, the MCS table identifier indicating whether the determined MCS table includes modulation capable of resisting phase noise.

According to another aspect of the present disclosure, the transmitting device further includes a receiving unit configured to receive information about a MCS table identifier, and the control unit of the transmitting device is further configured to determine the MCS table according to the received information about the MCS table identifier, and determine the MCS index from the determined MCS table.

According to another aspect of the present disclosure, the transmitting unit of the transmitting device is further configured to transmit information about a demodulation mode identifier, wherein the demodulation mode identifier indicates that bit-to-symbol mapping tables used by the receiving device and the transmitting device are same or different.

According to yet another aspect of the present disclosure, there is provided a receiving device including: a receiving unit configured to receive information about a modulation and coding strategy (MCS) index; and a control unit configured to determine a corresponding MCS table for demodulation according to the received information about the MCS index, wherein the MCS table includes modulation capable of resisting phase noise.

According to another aspect of the present disclosure, there is provided a receiving device. The receiving device includes: a receiving unit configured to receive information about a modulation parameter indicating a spiral factor; a control unit configured to determine pseudo-N-order first type of modulation according to the modulation parameter, wherein $2^N$ first symbols of the pseudo-N-order first type of modulation correspond to a part of $2^M$ second symbols of M-order second type of modulation, and M and N are positive integers.

Alternatively, according to an aspect of the present disclosure, the modulation parameter further indicates at least one of an amplitude weighting parameter and a phase weighting parameter.

Alternatively, according to an aspect of the present disclosure, the modulation parameter further indicates at least one of M and N.

Alternatively, according to an aspect of the present disclosure, the information about the modulation parameter directly comprises information about the spiral factor, the control unit determines the pseudo-N-order first type of modulation according to the information about the spiral factor. Alternatively, the information about the modulation parameter includes information about an index of a modulation parameter table, the control unit determines the spiral factor in the modulation parameter table according to the information about the index of the modulation parameter table, and determines the pseudo-N-order first type of modulation according to the determined spiral factor.

Alternatively, according to an aspect of the present disclosure, the receiving device further includes: a transmitting unit configured to transmit information about a modulation mode supported by the receiving device to a transmitting device.

Alternatively, according to an aspect of the present disclosure, the information about the modulation mode supported by the receiving device indicates at least one of a M-order second type of modulation mode and the pseudo-N-order first type of modulation supported by the receiving device.

According to another aspect of the present disclosure, there is provided a transmitting device. The transmitting device includes: a control unit configured to determine information about a modulation parameter indicating a spiral factor according to information about phase noise; and a transmitting unit configured to transmit the determined information about the modulation parameter.

Alternatively, according to an aspect of the present disclosure, the transmitting device further includes: a receiving unit configured to receive information about a modulation mode supported by a receiving device, wherein the control unit is further configured to determine whether to use the pseudo-N-order first type of modulation according to the information about the modulation mode supported by the receiving device.

According to yet another aspect of the present disclosure, there is provided a receiving method, including: receiving information about a modulation parameter indicating a spiral factor; determining pseudo-N-order first type of modulation according to the modulation parameter, wherein $2^N$ first symbols of the pseudo-N-order first type of modulation correspond to a part of $2^M$ second symbols of M-order second type of modulation, and M and N are positive integers.

BRIEF DESCRIPTION OF DRAWINGS

The above and other objects, features and advantages of the present disclosure will become more obvious by describing embodiments of the present disclosure in more detail in conjunction with accompanying drawings. The accompanying drawings are provided to provide a further understanding of the embodiments of the present disclosure, constitute a part of the specification, serve to explain the present disclosure together with the embodiments of the present disclosure, and do not constitute a limitation of the present disclosure. In the drawings, like reference numerals usually represent like components or steps.

FIG. 2B shows values of symbols after 16 spiral modulation bit-to-symbol mapping.

5

6

Figure 3:
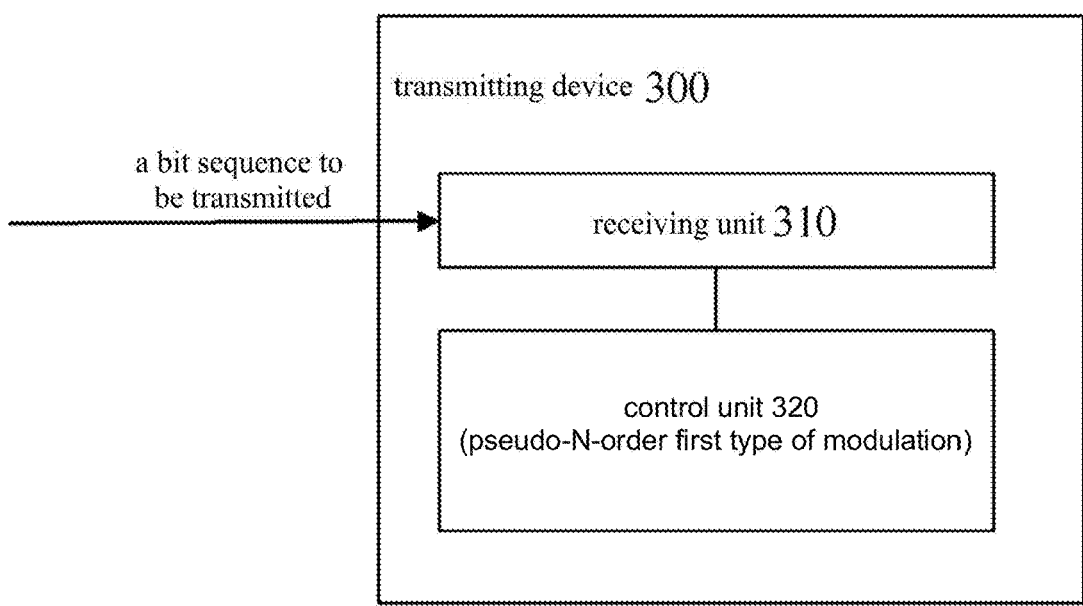

FIG. 3 shows a schematic block diagram of a transmitting device according to an embodiment of the present disclosure.

Figure 4A:
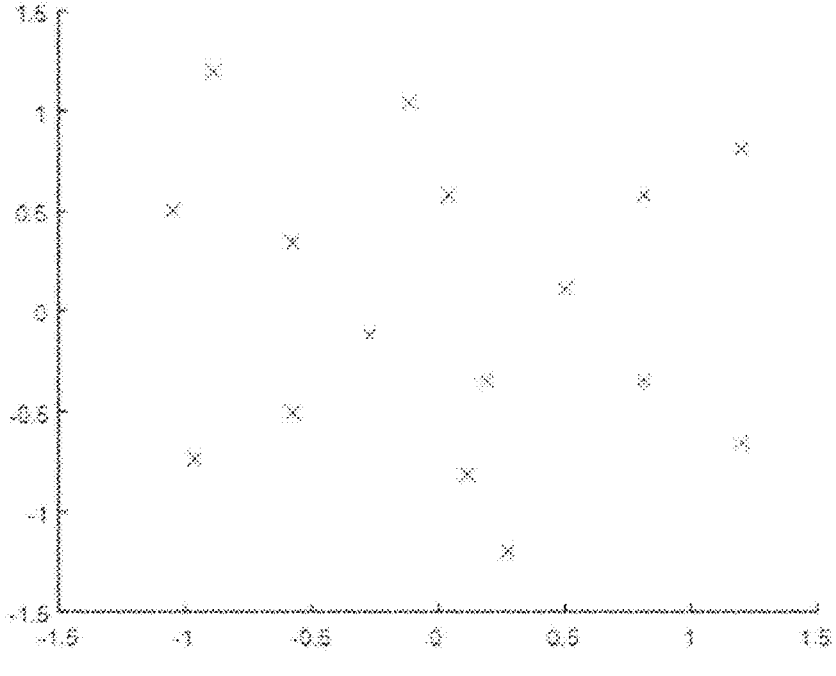

FIG. 4A shows a constellation map of pseudo-16 spiral modulation based on 1024QAM for a phase variance of 0.04 according to an embodiment of the present disclosure.

Figure 4B:
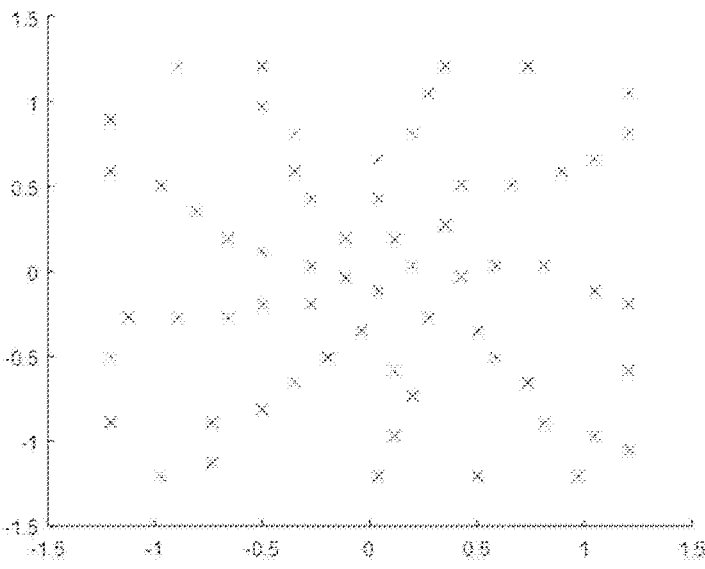

FIG. 4B shows a constellation map of pseudo-64 spiral modulation based on 1024QAM for a phase variance of 0.01 according to an embodiment of the present disclosure.

Figure 4C:
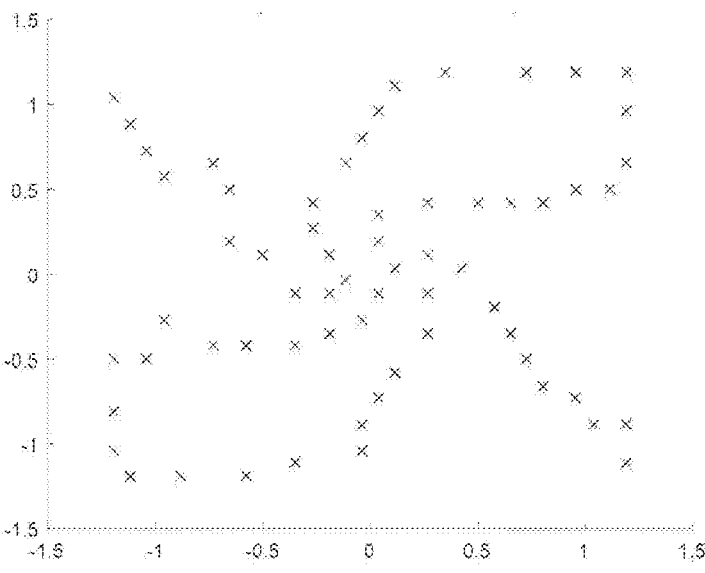

FIG. 4C shows a constellation map of pseudo-64 spiral modulation based on 1024QAM for a phase variance of 0.04 according to an embodiment of the present disclosure.

Figures 1, 2A:
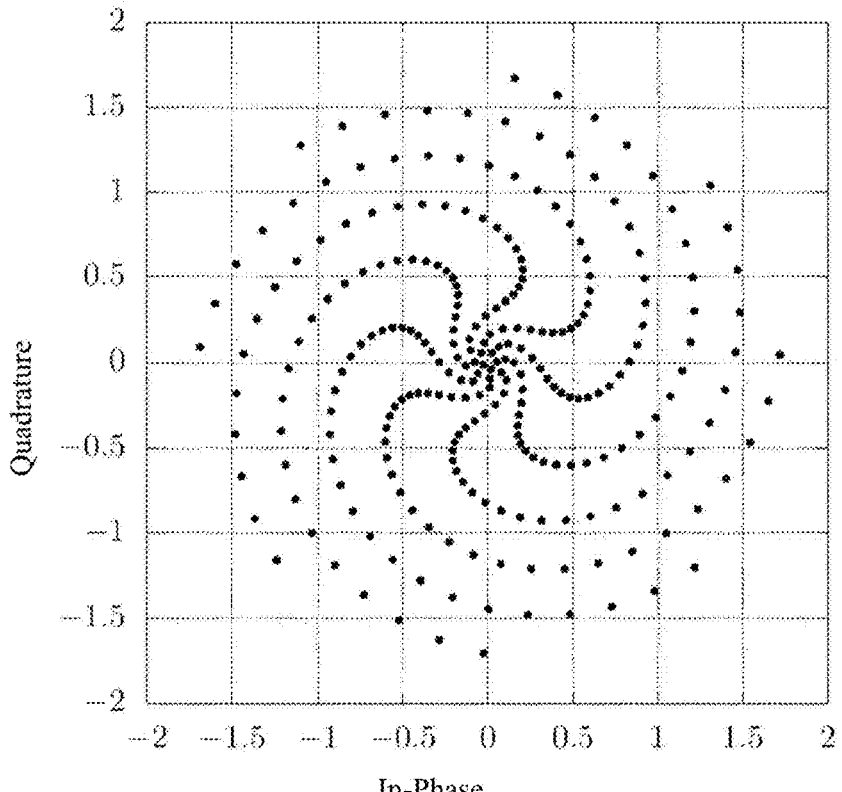
FIG. 1 shows a schematic diagram of a constellation map of spiral modulation when there is phase noise.
FIG. 2A shows values of symbols after 16QAM bit-to-symbol mapping.

FIGS. 5A-1 and 5A-2 show bit-to-symbol mapping tables of the pseudo-16 spiral modulation of FIG. 4A.

FIGS. 5B to 5F illustrate examples of a bit-to-symbol mapping table of pseudo-N-order spiral modulation for different phase noises according to embodiments of the present disclosure.

Figure 6:
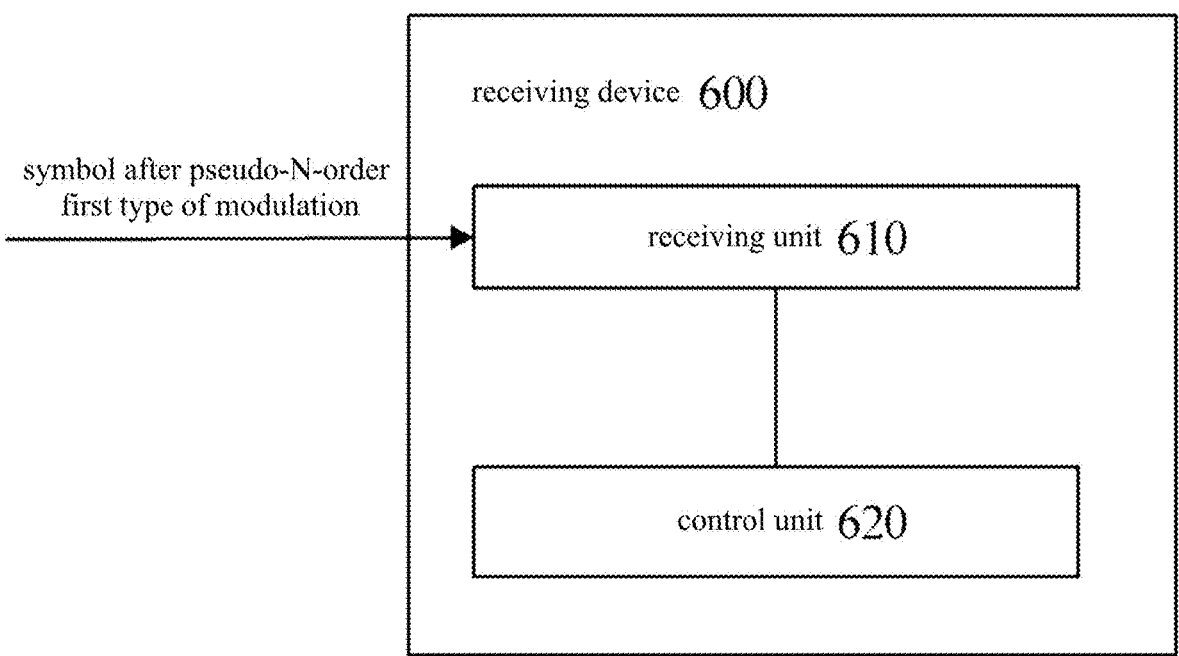

FIG. 6 shows a schematic block diagram of a receiving device corresponding to the transmitting device of FIG. 3 according to an embodiment of the present disclosure.

Figure 7:
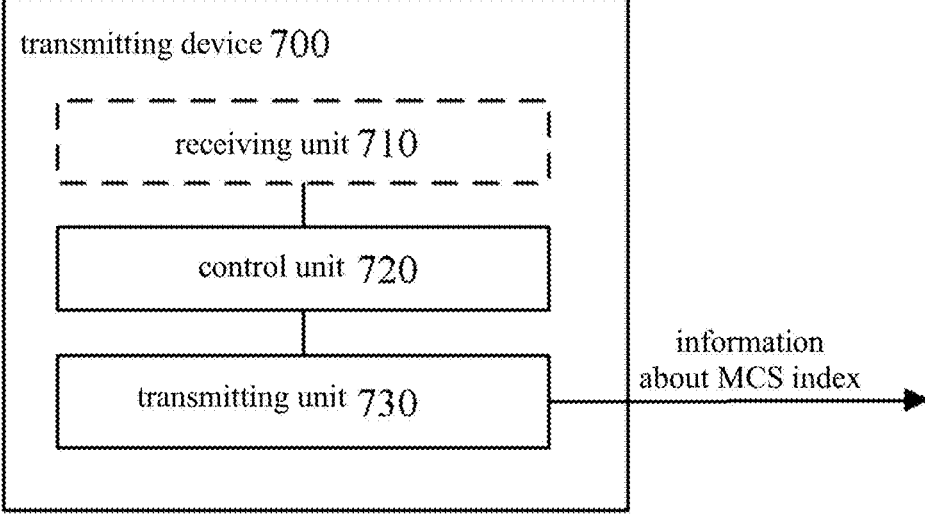

FIG. 7 shows a schematic block diagram of a transmitting device according to an embodiment of the present disclosure.

FIGS. 8A-8E illustrate examples of a new MCS table according to an embodiment of the present disclosure.

FIGS. 9A-9E illustrate examples of a new MCS table according to another embodiment of the present disclosure.

FIGS. 10A-10C illustrate examples of a new MCS table according to another embodiment of the present disclosure.

Figure 11:
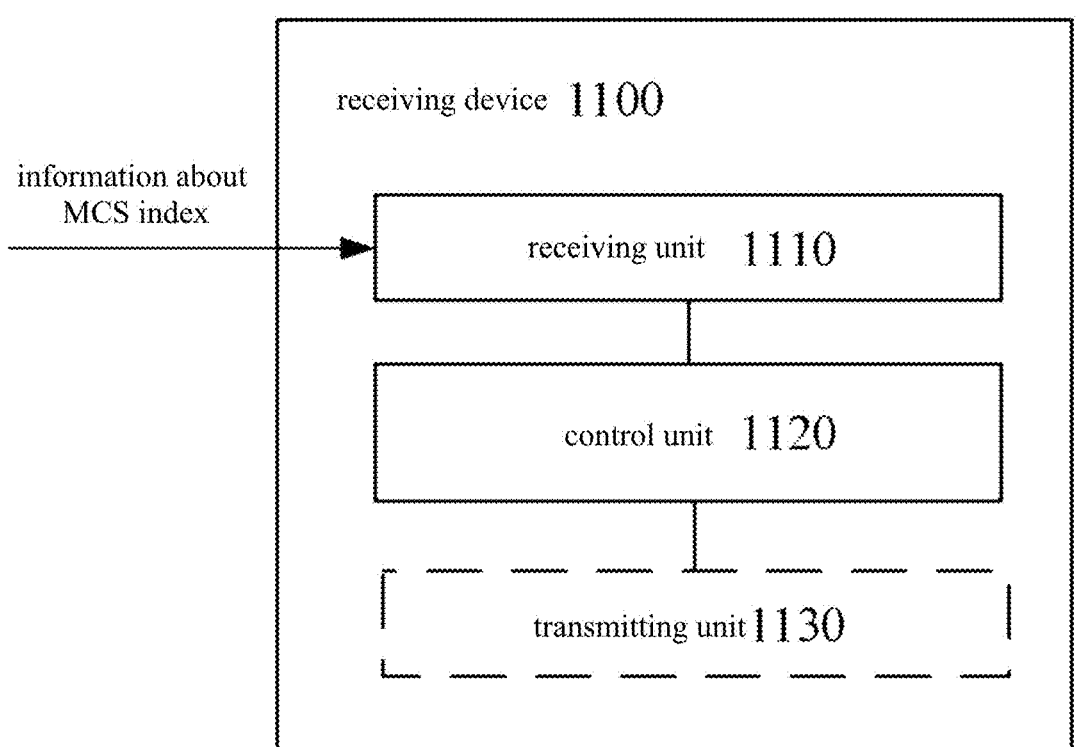

FIG. 11 is a schematic block diagram showing a receiving device corresponding to the transmitting device of FIG. 7 according to an embodiment of the present disclosure.

Figure 12:
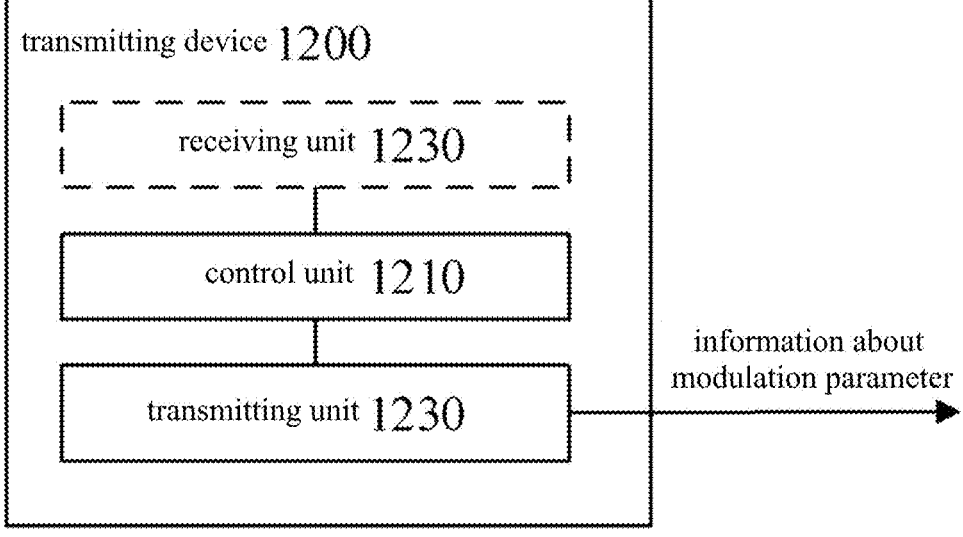

FIG. 12 shows a schematic block diagram of a transmitting device according to an embodiment of the present disclosure.

FIG. 13 shows a schematic block diagram of a receiving device corresponding to the transmitting device of FIG. 12 according to an embodiment of the present disclosure.

FIG. 14A shows a schematic diagram of a preset modulation parameter table according to an embodiment of the present disclosure.

FIG. 14B shows a schematic diagram of a preset modulation parameter table according to another embodiment of the present disclosure.

Figure 15:
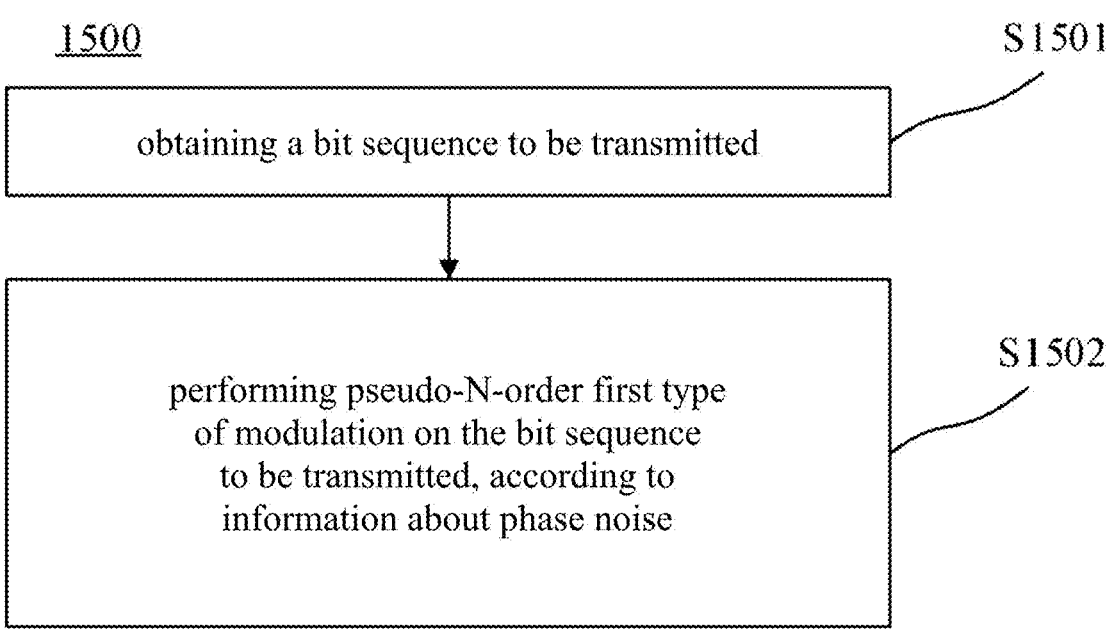

FIG. 15 illustrates a modulation method corresponding to the transmitting device of FIG. 3 according to an embodiment of the present disclosure.

Figure 16:
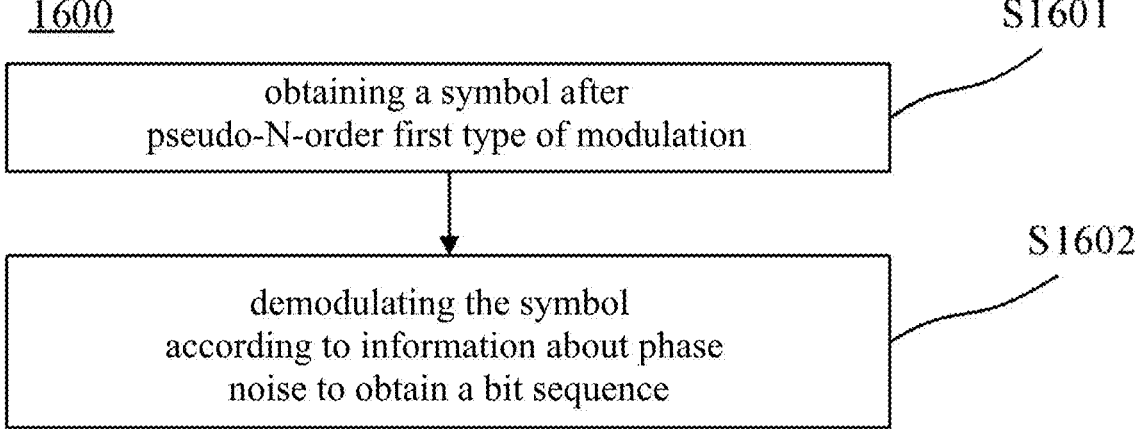

FIG. 16 shows a demodulation method corresponding to the receiving device of FIG. 6 according to an embodiment of the present disclosure.

FIG. 17 illustrates a transmitting method corresponding to the transmitting device of FIG. 7 according to an embodiment of the present disclosure.

FIG. 18 illustrates a receiving method corresponding to the receiving device of FIG. 11 according to an embodiment of the present disclosure.

Figure 19:
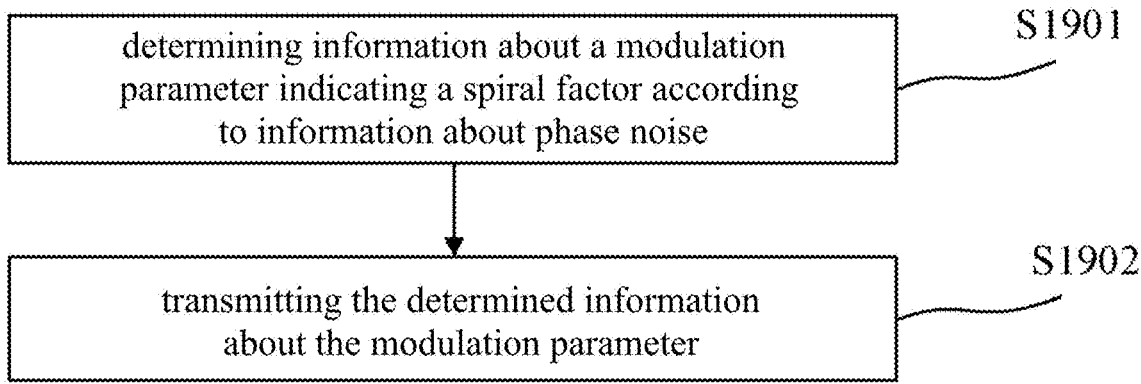

FIG. 19 shows a transmitting method corresponding to the transmitting device of FIG. 12 according to an embodiment of the present disclosure.

Figure 20:
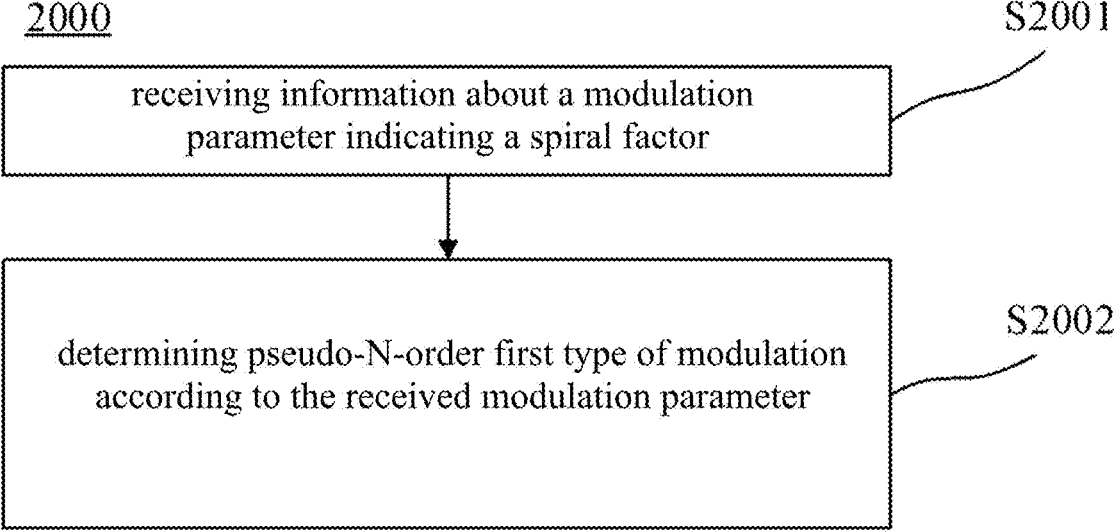

FIG. 20 illustrates a receiving method corresponding to the receiving device of FIG. 13 according to an embodiment of the present disclosure.

Figure 21:
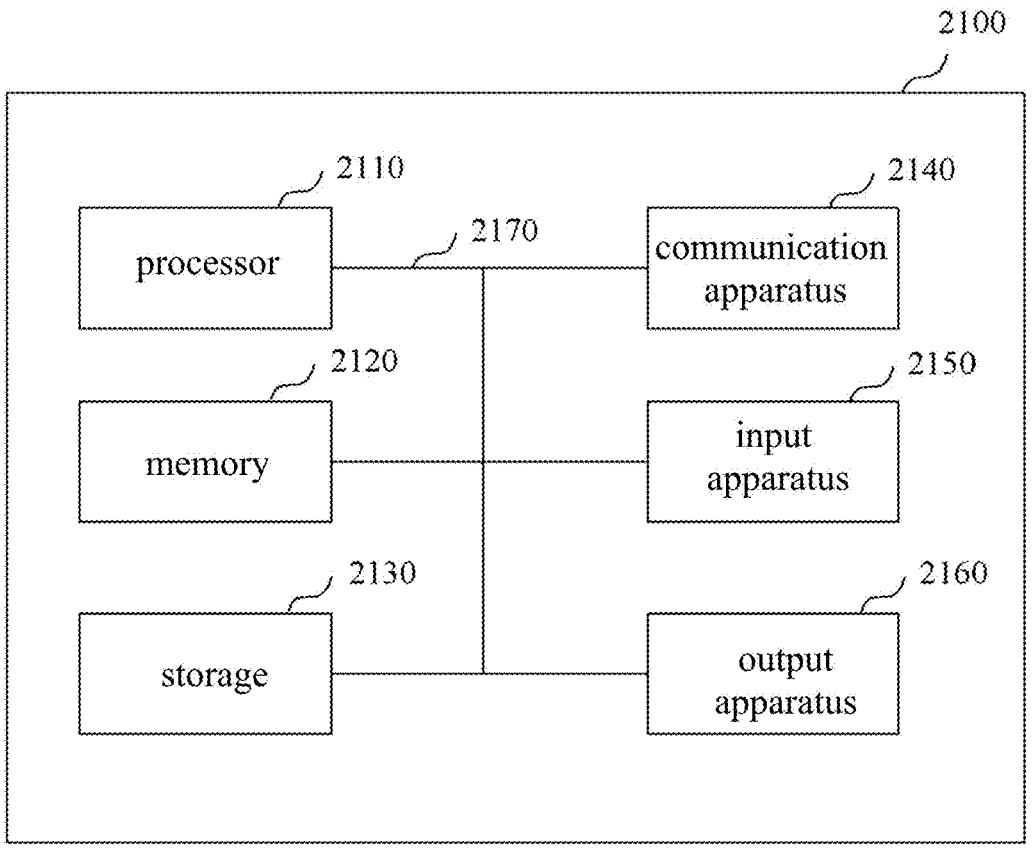

FIG. 21 shows a schematic diagram of a hardware structure of a device concerned according to embodiments of the present disclosure.

DETAILED DESCRIPTION

In order to make the objects, technical solutions and advantages of the present disclosure more obvious, exemplary embodiments according to the present disclosure will be described in detail below with reference to the accompanying drawings. Like reference numerals refer to like elements throughout the drawings. It should be appreciated that the embodiments described herein are merely illustrative and should not be construed as limiting the scope of the present disclosure.

In an embodiment according to the present disclosure, the transmitting device may be a base station or a terminal in a communication system, etc. Accordingly, the receiving device can be a base station or a terminal in a communication system relative to the transmitting device. The base station described here may provide communication coverage for a specific geographical area, which can be called a cell, a Node B, a gNB, a 5G Node B, an access point and/or a transmitting and receiving point, etc. The terminal described here may include various types of terminal, such as a User Equipment (UE), a mobile terminal (or called a mobile station) or a fixed terminal, however, for convenience, the terminal and the UE are sometimes used interchangeably hereinafter. For example, when the transmitting device is a base station, the receiving device may be a UE, a mobile terminal (or a mobile station) or a fixed terminal. Conversely, when the transmitting device is a terminal, the receiving device may be a base station. Furthermore, in an embodiment of the present disclosure, each of the transmitting device and the receiving device may include a transmitting unit, a control unit, and a receiving unit. However, it should be understood that the transmitting device and the receiving device may also include other units.

QAM, which is widely used in the 3rd Generation Mobile Communication Partnership Project (3GPP) standard, has been used in various broadband wireless communication systems such as LTE, HSPA, 802.11n and 5G. In QAM, all vector endpoints are redistributed reasonably by combining amplitude and phase parameters and making full use of a whole signal plane. Thus, without reducing the minimum Euclidean distance for a location of an end point, the number of end points of a signal vector is increased and the interference resisting ability and spectrum utilization rate of a system are improved. However, QAM has poor robustness of resisting the phase noise, which leads to the significant negative impact of the phase noise generated by the radio frequency oscillator on system transmission.

In order to reduce the influence of the phase noise, some phase noise resisting techniques are usually selected to be adopted in a modulation process at a transmitting end or in detection, estimation and demodulation processes at a receiving end. At present, spiral modulation is considered to have remarkable performance of resisting the phase noise. FIG. 1 schematically shows a constellation map of the spiral modulation. When there is the phase noise, because the phase noise has a great influence on constellation points with large amplitude on the outside, as shown in FIG. 1, the density of constellation points near a constellation origin point on which the spiral modulation is performed is high, while the density of constellation points at the outside is low. Therefore, the spiral modulation can effectively resist the phase noise.

However, although the spiral modulation can effectively resist the phase noise, the current spiral constellation modulation has not been adopted by standards such as 5G. Moreover, the spiral modulation is different from constellation modulation schemes for high spectral efficiency such as QAM. This leads to that electronic device may need different transceiver structures for different modulation methods, which makes the hardware design complicated.

FIG. 2A shows values of symbols after 16QAM bit-to-symbol mapping. FIG. 2B shows values of symbols after 16 spiral modulation bit-to-symbol mapping. As shown in the tables in FIGS. 2A and 2B, the values of the symbols after 16QAM bit-to-symbol mapping are different from those of the symbols after 16 spiral modulation bit-to-symbol mapping, in other words, the symbols obtained by the QAM and the spiral modulation with the same modulation order are different. For example, the value of the symbol after the modulation bit-to-symbol mapping can be divided into three parts, including a power normalization factor, a real part (I) and an imaginary part (Q). Take $1/\sqrt{160}$: (3+1i) in FIG. 2A as an example, where $1/\sqrt{160}$ is the power normalization factor, 3 is the real part and 1 is the imaginary part. Referring to FIG. 2A and FIG. 2B, it is obvious that the values of the real part and imaginary part of the symbol after 16QAM bit-to-symbol mapping are integers. For example, in the aforementioned example of FIG. 2A, the value of the real part is 3 and the value of the imaginary part is 1, both of which are integers; However, the value of the real part or the imaginary part of the symbol after the 16 spiral modulation bit-to-symbol mapping is not an integer. For example, taking $1/\sqrt{259.8248}$ (5.1921+4.7272i) in FIG. 2B as an example, the value of the real part thereof is 5.1921 and the value of the imaginary part is 4.7272, which obviously are both not integers. Therefore, the 16QAM shown in FIG. 2A is not compatible with the 16 spiral modulation shown in FIG. 2B.

It can be seen from the above that although the spiral modulation can effectively resist the phase noise, it is not compatible with modulation schemes for high spectral efficiency, such as QAM, which are widely adopted by standards. Therefore, it is desirable to provide modulation methods and corresponding electronic devices that meet different requirements at the same time and are compatible with the modulation modes in the existing communication standards.

Hereinafter, a transmitting device according to some embodiments of the present disclosure will be described with reference to FIG. 3. FIG. 3 is a schematic block diagram illustrating a transmitting device 300 according to an embodiment of the present disclosure. As shown in FIG. 3, a transmitting device 300 according to an embodiment of the present disclosure may include a receiving unit 310 and a control unit 320. In addition to the receiving unit 310 and the control unit 320, the transmitting device 300 may also include other components, however, since these components have nothing to do with the contents of the embodiment of the present disclosure, their illustrations and descriptions are omitted here.

As shown in FIG. 3, the receiving unit 310 of the transmitting device 300 may obtain a bit sequence to be transmitted. Then, the control unit 320 may perform pseudo-N-order first type of modulation on the bit sequence to be transmitted according to the information about phase noise.

For example, the transmitting device 300 is a base station, and the receiving unit 310 may obtain the bit sequence to be transmitted. In addition, the control unit 320 may perform pseudo-N-order first type of modulation on the bit sequence to be transmitted according to the information about the phase noise to obtain the first symbol to be transmitted to a UE connected to the base station.

According to some embodiments of the present disclosure, the information about the phase noise may include information about the phase noise itself, information about magnitude of variance of the phase noise, or any other information that can characterize the phase noise. Based on different information of the phase noise, the pseudo-N-order first type of modulation performed by the control unit 320 on the bit sequence to be transmitted may be different. In addition, even if the modulation order of the performed pseudo first type of modulation is the same, the symbols obtained by the control unit 320 after performing the pseudo N-order first type of modulation on the bit sequence to be transmitted based on different phase noise information may be different. This is further described below with reference to FIGS. 4A-4C.

In an embodiment of the present disclosure, $2^N$ first symbols of the pseudo-N-order first type of modulation correspond to a part of $2^M$ second symbols of M-order second type of modulation, where M and N are positive integers. For example, in some embodiments of the present disclosure, symbols that can be obtained using the N-order first type of modulation may be simulated by using a part of $2^M$ second symbols that can be obtained using the M-order second type of modulation. According to the embodiment of the present disclosure, this N-order first type of modulation performed through the method of the simulating may be called the pseudo N-order first type of modulation, N-order first type of modulation based on the M-order second type of modulation, $2^N$ first type of modulation _$2^M$ second type of modulation, or N-order first type of modulation-M-order second type of modulation.

The first type of modulation and the second type of modulation may be different modulation modes. In some embodiments of the present disclosure, the first type of modulation may be a modulation mode not used in existing standards such as 3GPP and 802.11n, and the second type of modulation may be a modulation mode used in existing standards such as 3GPP and 802.11n. Therefore, according to the scheme in the embodiment of the present disclosure, it is possible to provide a modulation method and corresponding electronic device that meet different requirements at the same time and are compatible with the modulation mode in the existing communication standard.

In addition, the first type of modulation can be a modulation mode with performance of resisting phase noise (hereinafter, it can also be simply referred to as "phase noise"), and the second type of modulation is a modulation mode with high spectral efficiency. For example, the first type of modulation may be the spiral modulation, and the second type of modulation may be the QAM, in which case it may be called pseudo-spiral modulation or QAM-based spiral modulation. For example, when the N-order first type of modulation is 16 spiral modulation and the M-order second type of modulation is 1024QAM, in this case, it may be called pseudo 16-spiral modulation or 16 spiral modulation based on 1024QAM, or it may be simply called, for example, 16 spiral modulation _1024QAM or 16 spiral-1024QAM.

In the embodiment of the present disclosure, the symbols that can be obtained by using the N-order spiral modulation may be simulated by using a part of the $2^M$ second symbols that can be obtained by using the M-order QAM. Such pseudo-N-order spiral modulation not only maintains the phase noise resisting performance of the spiral modulation, but also maintains the high spectral efficiency of the QAM, and the pseudo-N-order spiral modulation is also compatible with the existing 5G standard.

The determination of a constellation map of the N-order spiral modulation corresponding to the pseudo-N-order spiral modulation in the embodiment of the present disclosure will be described in detail in combination with Formula (1) to Formula (3).

According to at least one embodiment of the present disclosure, the constellation map of the N-order spiral modulation corresponding to the pseudo N-order spiral modulation may be designed according to, for example, Archimedean spiral line formula (i.e. $x=te^r$). Specifically, the constellation map of N-order spiral modulation may be determined according to the number $M_{out}$ of symbols on the outermost layer of the spiral and the spiral factor $f_s$. For example, the spiral factor $f_s$ may be determined at first according to the number $M_{out}$ of symbols on the outermost layer of the spiral, and then the constellation map of the N-order spiral modulation is determined according to the determined spiral factor $f_s$. In some embodiments of the present disclosure, the value of the spiral factor $f_s$ may be first determined according to the number $M_{out}$ of the symbols on the outermost layer of the spiral by the following formula (1):

$$f_s = \frac{1}{(2M_{out} + 1)^2} \quad (1)$$

Based on the spiral factor $f_s$ determined by the above formula (1), the constellation map of the N-order spiral modulation may then be determined. For example, based on the determined spiral factor $f_s$, a parameter $t_n$ that may be used in the Archimedean spiral line formula may be obtained by the following formula (2):

$$t_n^2 = \frac{(4\pi n)^2 f_s}{2} + \sqrt{\frac{(4\pi n)^4 f_s^2}{4} + (4\pi n)^2} \quad (2)$$

Based on the obtained parameter ty, the shape of the constellation map of the spiral may be further determined by the following formula (3) according to the Archimedean spiral line formula:

$$c_n = t_n e^{jt_n} \quad n = 1, \dots, 2^N \quad (3)$$

Where n is an index of a spiral constellation point; $t_1 < t_2 < \dots < t_{2^N}$, N is the order of a spiral constellation; $c_n$ represents N-order spiral constellation points placed along the Archimedean spiral line. The order N of the spiral constellation may be predetermined, replaceable or determined according to the channel environment. Then, the constellation map of the N-order spiral modulation is obtained by normalizing an average power as 1.

In some embodiments, according to the information about the phase noise, the N-order spiral constellation points may be determined by the above formulas (1)-(3). For example, for a specific phase noise, a set of values of candidate spiral factors $f_s$ may be obtained based on a set of the number $M_{out}$ of symbols on the outermost layer of the spiral. Then, a corresponding set of $c_n$ is obtained based on the set of the values of candidate spiral factors $f_s$ and the above formulas (2) and (3), Then $c_n$ with the best performance in the current situation is found out from the set of $c_n$, that is, the constellation map of the best N-order spiral modulation for resisting the current phase noise is obtained. In addition, according to an example of the present disclosure, the value of the spiral factor $f_s$ corresponding to the optimal N-order spiral modulation is the optimal value of spiral factor $f_s$. It should be understood that the optimal value of spiral factor is obtained by performing a fine search near the candidate spiral factors, which may be the same as or different from the values of $f_s$ in the candidate set.

For example, for specific information about the phase noise, the number $M_{out}$ of symbols on the outermost layer of the spiral$\in$ [8,15] and the candidate value of spiral factor $f_s$ obtained based on the above formula (1) may belong to a set [3.46 2.77 2.27 1.89 1.60 1.37 1.19 1.04]$\times10^{-3}$. Then, a fine search is carried out near these candidate values of spiral factor $f_s$, specifically, based on the above formulas (2) and (3), $c_n$ corresponding to each candidate spiral factor $f_s$ is determined, so as to obtain the set of $c_n$; Then, for each $c_n$ of the set of $c_n$, the phase noise resisting performance thereof under the current phase noise is determined to determine the $c_n$ with the best performance, that is, the constellation map of N-order spiral modulation with the best performance under the influence of the current phase noise. In addition, the value of spiral factor $f_s$ corresponding to the optimal constellation map of the N-order spiral modulation may be determined as the best value of spiral factor $f_s$ among the candidate values of spiral factor $f_s$ and its vicinity.

It should be understood that the method of generating the constellation map of the N-order spiral modulation described here is only as an example method. According to the embodiment of the present disclosure, the constellation map of the N-order spiral modulation generated by other methods may also be used.

Next, a part of constellation points in a constellation map of the existing M-order second type of modulation are used to simulate the constellation map of the determined N-order spiral modulation, where M is greater than N. According to an example of the present disclosure, the $2^N$ first symbols of the pseudo-N-order spiral modulation may be determined based on the $2^M$ second symbols of the M-order second type of modulation, according to at least one of an amplitude weighting parameter $\alpha$ and a phase weighting parameter $\beta$. That is, after obtaining the constellation map of the above-mentioned N-order spiral modulation, $2^N$ constellation points of the pseudo-N-order spiral modulation may be determined based on $2^M$ constellation points of the M-order second type of modulation according to at least one of the amplitude weighting parameter $\alpha$ and the phase weighting parameter $\beta$.

For example, taking the second type of modulation as the QAM as an example, in some embodiments, $2^N$ constellation points of the pseudo-N-order spiral modulation may be determined, according to at least one of amplitude weighting parameters $\alpha$ and phase weighting parameters $\beta$, based on $2^M$ constellation points of M-order QAM (i.e., N-order spiral modulation-M-order QAM). Specifically, firstly, each constellation point in the above-obtained constellation map of the N-order spiral modulation is compared with the M-order QAM constellation points by using an exhaustive search method, so as to select the constellation point with the smallest weighted distance of radial and normal distances from each constellation point of the N-order spiral modulation from the M-order QAM constellation points to construct constellation points of the pseudo-N-order spiral modulation, and the QAM constellation points are not selected repeatedly. That is, the sum $\alpha(\Delta\rho)^2 + \beta(\Delta\theta)^2$ of the weighted values of an amplitude difference value and a phase difference value of each selected constellation point is the smallest, where $\rho$ is the distance (i.e. amplitude) from the constellation point to the origin of a IQ coordinate system (i.e. a complex coordinate system for mapping symbols to constellation points), $\theta$ is the positive angle (i.e. phase) between the constellation point and a I-axis, and the values of the amplitude weighting parameter $\alpha$ and the phase weighting parameter $\beta$ are related to the magnitude of Gaussian noise and the phase noise respectively, and the values of $\alpha$ and $\beta$ should satisfy $\alpha+\beta=1$ and the search is performed in a given channel environment to make the performance of the determined pseudo-N-order spiral modulation best.

Through the method described above, the corresponding spiral constellation parameter $f_s$ and weighting coefficients $\alpha$ and $\beta$ of a point selection criteria may be determined for different phase noises. In other words, when the phase noise changes, the spiral constellation parameter $f_s$ and the weighting coefficients $\alpha$ and $\beta$ of the selection criteria also change, so that the pseudo-N-order spiral constellation determined according to the above method achieves better phase noise resisting performance. However, the above method to determine the pseudo-N-order spiral constellation based on parameters such as the weighting coefficients $\alpha$, $\beta$ and so on is relatively complicated. According to another embodiment of the present disclosure, the $2^N$ first symbols of pseudo-N-order spiral modulation may be determined based on $2^M$ second symbols according to a Euclidean distance criterion. For example, each constellation point in the above-obtained constellation map of the N-order spiral modulation is compared with the M-order QAM constellation points by using an exhaustive search method, so as to select the point with the smallest Euclidean distance from each constellation point of the above-obtained constellation map of N-order spiral modulation from the M-order QAM constellation points to construct constellation points of the pseudo-N-order spiral modulation, and the QAM constellation points are not selected repeatedly. Thus, $2^N$ constellation points of the pseudo-N-order spiral modulation based on the Euclidean distance criterion may be obtained. Compared with the method of determining the pseudo-N-order spiral constellation according to the parameters such as the weighting coefficients $\alpha$, $\beta$ and so on, the method of determining the pseudo-N-order spiral constellation according to the Euclidean distance criterion has lower complexity.

By the method as described above, the corresponding pseudo-N-order spiral modulation may be generated for different phase noises, based on the M-order second type of modulation (for example, the QAM), according to different spiral factors $f_s$ and weighting coefficients $\alpha$ and $\beta$ of a point selection criteria, so as to make it compatible while achieving phase noise resisting performance. Examples of the constellation map of the pseudo-N-order spiral modulation obtained by the above method will be described below with reference to FIGS. 4A-4C.

FIGS. 4A-4C illustrate constellation maps of the pseudo-spiral modulation based on a 1024QAM constellation map for specific phase noise according to an embodiment of the present disclosure.

FIG. 4A shows a constellation map of pseudo-16 spiral modulation based on 1024QAM for a phase noise variance of 0.04 according to an embodiment of the present disclosure. In the constellation map shown in FIG. 4A, the black "x" shows the constellation points obtained by bit-to-symbol mapping of the pseudo-16 spiral modulation for a phase noise variance of 0.04. These constellation points are obtained by selecting points which meet a predetermined condition, based on the above method from the constellation points obtained by bit-to-symbol mapping according to 1024QAM. Specifically, when the variance of the phase noise is 0.04, the optimal value of spiral factor $f_s$ may be determined to be 0.00794, and thus the constellation map of the 16-spiral modulation may be obtained. Then, based on the weighting coefficients $\alpha=0.91$ and $\beta=0.09$ of the point selection criteria and based on the weighted sum of the radial and normal components being the smallest, 16 constellation points of the pseudo-16 spiral modulation as shown in FIG. 4A are determined from the constellation points of 1024QAM, thereby obtaining the constellation map of the pseudo-16 spiral modulation.

FIG. 4B shows a constellation map of pseudo-64 spiral modulation based on 1024QAM for a phase noise variance of 0.01 according to an embodiment of the present disclosure. Similarly, the constellation points in this constellation map are determined from the constellation points of 1024QAM, in a case that the variance of the phase noise is 0.01, by determining the optimal value of spiral factor $f_s$ is 0.00352 and its corresponding constellation map of 64-spiral modulation, and then based on the weighting coefficients $\alpha=0.88$ and $\beta=0.12$ of the point selection criterion, and based on the weighted sum of radial and normal components being the smallest. FIG. 4C shows a constellation map of pseudo 64-spiral modulation based on 1024QAM when the variance of the phase noise is 0.04 according to an embodiment of the present disclosure, wherein the constellation points in this constellation map are determined from the constellation points of 1024QAM, in a case that the variance of phase noise is 0.04, by determining the optimal value of spiral factor $f_s$ is 0.00728 and its corresponding constellation map of 64-spiral modulation, and then based on $\alpha=0.98$ and $\beta=0.02$ and based on the weighted sum of radial and normal components being the smallest. The specific formation method of the constellation map of the pseudo-64 spiral modulation shown in FIGS. 4B and 4C is similar to the above description of the constellation map of the pseudo-16 spiral modulation shown in FIG. 4A, and will not be described here again.

Furthermore, referring to FIGS. 4B and 4C, it can be seen that the constellation map of the pseudo-64 spiral modulation for a phase noise variance of 0.01 (as shown in FIG. 4B) is different from that of the pseudo-64 spiral modulation for a phase noise variance of 0.04 (as shown in FIG. 4C). That is to say, the spiral modulations of the same modulation order for different phase noises are different. In addition, referring to FIGS. 4A and 4B, it can be seen that the spiral modulations with different modulation orders for different phase noises are obviously different.

In the examples described above in connection with FIGS. 3 and 4, through the pseudo-spiral modulation obtained by using a part of $2^M$ second symbols that can be obtained by the M-order second type of modulation (for example, QAM) to simulate symbols that can be obtained by N-order first type of modulation (i.e., spiral modulation), not only the compatibility is guaranteed, but also the ability of the spiral modulation to effectively resist the phase noise is maintained. In other words, the pseudo-spiral modulation according to the embodiment of the present disclosure achieves the advantage of resisting phase noise while ensuring compatibility.

Returning to FIG. 3, according to an example of the present disclosure, the control unit 320 of the transmitting device 300 may perform the pseudo-N-order first type of modulation on the bit sequence to be transmitted according to a bit-to-symbol mapping table. As mentioned above, the $2^N$ first symbols of the pseudo-N-order first type of modulation correspond to a part of the $2^M$ second symbols of the M-order second type of modulation, so the bit-to-symbol mapping table of the pseudo-N-order first type of modulation may be determined based on the bit-to-symbol mapping table of the M-order second type of modulation, and the determined bit-to-symbol mapping table of the pseudo-N-order first type of modulation may be stored in advance for the pseudo-N-order first type of modulation.

According to some embodiments of the present disclosure, when performing the pseudo-N-order first type of modulation, bit-to-symbol mapping may be performed in units of N first bits; However, when the bit-to-symbol mapping is performed based on the M-order second type of modulation, the bit-to-symbol mapping may be performed in units of M second bits, where N and M are positive integers and M is greater than N. Further, symbols obtained by performing the bit-to-symbol mapping of the pseudo-N-order first type of modulation in units of N first bits may be the same as symbols obtained by performing the bit-to-symbol mapping of the M-order second type of modulation in units of M second bits. By taking the constellation map of the pseudo-16 spiral modulation for a phase noise variance of 0.04 shown in FIG. 4A as an example and in combination with FIGS. 5A-1 and 5A-2, the bit-to-symbol mapping table of the pseudo-16 spiral modulation and its generation method will be described below in detail.

FIG. 5A-1 shows a bit-to-symbol mapping table of pseudo-16 spiral modulation for a phase noise variance of 0.04. FIG. 5A-2 further shows a corresponding relationship between the symbols in the bit-to-symbol mapping table of the pseudo-16 spiral modulation in FIG. 5A-1 and a part of the symbols in the bit-to-symbol mapping table of 1024QAM in the 5G NR standard of 3GPP. As described above in connection with FIG. 4A, the 16 constellation points in the above-described constellation map of the pseudo-16 spiral modulation for a phase noise variance of 0.04 are all selected from the constellation points of the constellation map of the 1024QAM, that is, the 16 constellation points in the constellation map of the pseudo-16 spiral modulation correspond to a part of the 1024 constellation points in the constellation map of the 1024QAM. Therefore, the bit-to-symbol mapping table of the pseudo-16 spiral modulation, that is, the bit-to-symbol mapping table shown in FIG. 5A-1, may be determined according to the bit-to-symbol mapping table of the 1024QAM, so that a corresponding bit-to-symbol mapping relationship of the pseudo-16 spiral modulation may be obtained. As shown in FIG. 5A-2, when performing the pseudo-16 spiral modulation, the bit-to-symbol mapping may be performed in units of four first bits; and when performing the 1024QAM, the bit-to-symbol mapping may be performed in units of 10 second bits. For example, when determining the bit-to-symbol mapping table of the pseudo-16 spiral modulation for a phase noise variance of 0.04, if a constellation point in the constellation map of the 1024QAM corresponding to a symbol $$\frac{1}{\sqrt{667.5}}(5-9i)$$

is selected as one of constellation points in the constellation map of the pseudo-16 spiral modulation, a symbol $$\frac{1}{\sqrt{667.5}}(5-9i)$$

obtained by mapping the bit 1001010101 using the bit-to-symbol mapping table of the 1024QAM will be included in the bit-to-symbol mapping table of the pseudo-16 spiral modulation, and when performing the pseudo-16 spiral modulation, the bit-to-symbol mapping may be performed in units of four bits. Based on a similar method, all 16 symbols in the bit-to-symbol mapping table of the pseudo-16 spiral modulation may be determined according to a part of symbols in the bit-to-symbol mapping table of the 1024QAM, and these symbols may be obtained by performing the bit-to-symbol mapping in units of 4 bits according to the pseudo-16 spiral modulation or by performing the bit-to-symbol mapping in units of 10 bits according to the pseudo-1024QAM modulation, as shown in FIG. 5A-2. For example, as shown in FIG. 5A-2, the symbol obtained by the bit-to-symbol mapping of the pseudo-16 spiral modulation with 0011 is the same as that obtained by the bit-to-symbol mapping of the 1024QAM with 101100111. However, it should be understood that because a power normalization factor in the 1024QAM is obtained for 1024 constellation points, while the power normalization factor of the pseudo-16 spiral modulation is obtained for 16 constellation points, in some cases, the power normalization factor of symbols obtained by the bit-to-symbol mapping of the pseudo-16 spiral modulation may be different from that of symbols obtained by the bit-to-symbol mapping of the 1024QAM, but there is a corresponding relationship between the values before power normalization, that is, the values of I (amplitude) and Q (phase) have a corresponding relationship. Therefore, the pseudo spiral modulation according to the embodiment of the present disclosure has the compatibility with the existing QAM while achieving resisting of the phase noise.

On the other hand, when all 16 symbols in the bit-to-symbol mapping table of the pseudo-16 spiral modulation are determined, the bit-to-symbol mapping table of the pseudo-16 spiral modulation may be generated based on a preset condition. For example, the bit-to-symbol mapping table of the pseudo-16 spiral modulation may be generated based on Gray mapping, that is, it is satisfied that two constellation points corresponding to two symbols obtained by mapping two bit sequences with a difference of 1 in the bit-to-symbol mapping table are adjacent on the spiral line in the constellation map of the pseudo spiral modulation (or the distance between two constellation points are the closest from the perspective of the phase noise), thus the bit-to-symbol mapping table of the pseudo-16 spiral modulation as shown in FIG. 5A-1 is determined. In addition, different from general values of symbols after the bit-to-symbol mapping of the 16 spiral modulation, the values of the real part and the imaginary part of the values of symbols after the bit-to-symbol mapping of the pseudo-16 spiral modulation shown in FIG. 5A-1 are integers (for example, the value of the real part of the symbol $$\frac{1}{\sqrt{667.5}}(1+15i)$$

is 1, and the value of the imaginary part is 15, both of which are integers). Therefore, it can also be seen that the pseudo spiral modulation obtained according to the embodiment of the present disclosure may be compatible with the modulation method (QAM) in the existing communication standards.

FIGS. 5B to 5F illustrate more examples of bit-to-symbol mapping tables of the pseudo-N-order spiral modulation for different noises according to embodiments of the present disclosure. Specifically, FIG. 5B shows a bit-to-symbol mapping table of the pseudo-16 spiral modulation for a phase noise variance of 0.06, wherein the symbols in the bit-to-symbol mapping table are determined from a part of symbols in the bit-to-symbol mapping table of the 1024QAM, according to the corresponding relationship between constellation points of the pseudo-16 spiral modulation determined by $f_s$=0.01441, $\alpha$=0.97 and $\beta$=0.03 and a part of constellation points of the 1024QAM. FIG. 5C shows a bit-to-symbol mapping table of the pseudo-16 spiral modulation for a phase noise variance of 0.08, wherein the symbols in the bit-to-symbol mapping table are determined from a part of symbols in the bit-to-symbol mapping table of the 1024QAM, according to the corresponding relationship between constellation points of the pseudo-16 spiral modulation determined by $f_s$=0.00175, $\alpha$=0.25 and $\beta$=0.75 and a part of constellation points of the 1024QAM. FIG. 5D shows a bit-to-symbol mapping table of the pseudo-64 spiral modulation for a phase noise variance of 0.01, wherein the symbols in the bit-to-symbol mapping table are determined from a part of symbols in the bit-to-symbol mapping table of the 1024QAM, according to the corresponding relationship between constellation points of the pseudo-64 spiral modulation determined by $f_s$=0.00352, $\alpha$=0.88 and $\beta$=0.12 and a part of constellation points of the 1024QAM. FIG. 5E shows a bit-to-symbol mapping table of the pseudo-64 spiral modulation for a phase noise variance of 0.04, wherein the symbols in the bit-to-symbol mapping table are determined from a part of symbols in the bit-to-symbol mapping table of the 1024QAM, according to the corresponding relationship between constellation points of the pseudo-64 spiral modulation determined by $f_s$=0.00728, $\alpha$=0.98 and $\beta$=0.02 and a part of constellation points of the 1024QAM. FIG. 5F shows a bit-to-symbol mapping table of the pseudo-64 spiral modulation for a phase noise variance of 0.08, wherein the symbols in the bit-to-symbol mapping table are determined from a part of symbols in the bit-to-symbol mapping table of the 1024QAM, according to the corresponding relationship between constellation points of the pseudo-64 spiral modulation determined by $f_s$=0.01065, $\alpha$=0.92 and $\beta$=0.08 and a part of constellation points of the 1024QAM. The formation of these bit-to-symbol mapping tables is similar to that described above with respect to FIGS. 5A-1 and 5A-2, and will not be repeated here.

Hereinafter, a receiving device according to some embodiments of the present disclosure will be described with reference to FIG. 6. FIG. 6 is a schematic block diagram illustrating a receiving device 600 according to an embodiment of the present disclosure. As shown in FIG. 3, a receiving device 600 according to an embodiment of the present disclosure may include a receiving unit 610 and a control unit 620.

As shown in FIG. 6, the receiving unit 610 of the receiving device 600 may obtain a symbol after pseudo-N-order first type of modulation. For example, when the receiving device 600 is a UE, the receiving unit 610 may obtain the symbol after the pseudo-N-order first type of modulation transmitted by the transmitting device 300 (e.g., a base station).

According to some embodiments of the present disclosure, as described above, $2^N$ first symbols of the pseudo-N-order first type of modulation here correspond to a part of $2^M$ second symbols of M-order second type of modulation, where M and N are positive integers and M is greater than N. For example, a symbol that can be obtained using the N-order first type of modulation may be simulated by using a part of $2^M$ second symbols that can be obtained using the M-order second type of modulation.

For example, the symbol that can be obtained by using the N-order first type of modulation may be simulated according to a part of $2^M$ second symbols that can be obtained by using the M-order second type of modulation in the manner shown in the above-mentioned formulas (1)-(3) and FIGS. 4A-4C, which will not be described in detail here.

After receiving the symbol after the pseudo-N-order first type of modulation, the control unit 620 of the receiving device 600 may demodulate the symbol according to information about phase noise to obtain a received bit sequence. As mentioned above, the information about the phase noise may include information about the phase noise itself, information about the variance of the phase noise, or any other information that can characterize the phase noise. The control unit 620 of the receiving device 600 may then demodulate the received symbol according to a bit-to-symbol mapping table.

For example, the control unit 620 may demodulate the symbol according to the bit-to-symbol mapping tables for different phase noises as described above, thereby obtaining the received bit sequence. In some embodiments, the bit-to-symbol mapping tables for different phase noises may be bit-to-symbol mapping tables of the pseudo-N-order first type of modulation determined based on the bit-to-symbol mapping table of the M-order second type of modulation, for example, the pseudo spiral bit-to-symbol mapping tables shown in FIGS. 5A-1, 5A-2 and 5B-5F. According to the bit-to-symbol mapping tables described above, the control unit 620 may demodulate according to the pseudo-N-order first type of modulation to obtain a bit sequence in units of N first bits, or demodulate according to the M-order second type of modulation to obtain a bit sequence in units of M second bits. For example, in some embodiments, if the receiving unit 620 of the receiving device 600 obtains a symbol after pseudo-16 spiral modulation, its control unit 620 may demodulate according to the pseudo-16 spiral modulation to obtain a bit sequence containing 4 bits. Alternatively, the demodulation may be performed according to 1024QAM to obtain a bit sequence containing 10 bits, and then according to corresponding relationship between 10 bits and 4 bits, that is, bit corresponding relationship between 1024QAM and 16 spiral as shown in FIG. 5A-2, the transmitted bit sequence in units of 4 bits may be obtained.

According to another embodiment of the present disclosure, a transmitting device may determine a modulation mode according to information about phase noise and transmit information about the determined modulation mode to a receiving device. Accordingly, the receiving device may determine the modulation mode according to the information about the modulation mode for demodulation.

For example, an entry about pseudo-N-order first type of modulation or a MCS table about the pseudo-N-order first type of modulation may be added to MCS tables used in various standards at present. A transmitting device may determine a modulation and coding strategy (MCS) index according to information about phase noise, and indicate a modulation mode by transmitting the information about the MCS index to a receiving device. Here, the information about the MCS index may include the information of the MCS index itself; and when there are multiple MCS tables, information about a specific MCS table and the MCS index may also be included. Therefore, a pseudo-N order first type of modulation mode may be determined by a method similar to the current MCS determination.

For another example, the transmitting device may directly transmit the information of modulation parameters to the receiving device according to the information about the phase noise to indicate a modulation mode. Therefore, it is not necessary to modify the existing MCS table, and the pseudo-N order first type of modulation mode may also be determined.

An example in which a transmitting device determines the MCS index according to the information about the phase noise will be described below with reference to FIG. 7. FIG. 7 is a schematic block diagram of a transmitting device 700 according to another example of the present disclosure.

As shown in FIG. 7, a transmitting device 700 according to another embodiment of the present disclosure may include a control unit 720 and a transmitting unit 730. In addition to the control unit 720 and the transmitting unit 730, the transmitting device 700 may also include other components, however, since these components have nothing to do with the contents of the embodiment of the present disclosure, their illustrations and descriptions are omitted here. In addition, similar to the transmitting device 300, the transmitting device 700 may be a base station or a terminal in a communication system.

As shown in FIG. 7, the control unit 720 of the transmitting device 700 may determine a modulation and coding strategy (MCS) index according to information about phase noise. For example, in some embodiments, the control unit 720 of the transmitting device 700 may determine a MCS table from a plurality of MCS tables according to the information about the phase noise and determine a MCS index from the determined MCS table. Then, the transmitting unit 730 of the transmitting device 700 may transmit the information about the MCS index.

The existing 5G NR standard contains five MCS tables that may be used for QAM with different requirements (for example, high spectral efficiency (SE), low peak-to-average ratio (PAPR), etc.), among which three MCS tables may be used for modulation and coding of physical downlink shared channel (PDSCH) transmission, while the other two MCS tables may be used for modulation and coding of physical uplink shared channel (PUSCH) transmission. However, these MCS tables all lack modulation modes of the resisting phase noise, in other words, the existing MCS tables are only suitable for the QAM and do not contain modulation capable of resisting the phase noise. In order to solve this problem, some embodiments of the present disclosure also provide MCS tables containing the above-mentioned pseudo spiral modulation modes for different phase noises.

For example, in some embodiments, some modulation modes in the current MCS table may be replaced by the pseudo spiral modulation modes to generate a new MCS table with the same number of MCS indexes as the existing 5G NR standard. FIGS. 8A-8E show new MCS tables according to an embodiment of the present disclosure, wherein the new MCS tables have the same number of MCS indexes as the existing NR standard (i.e., the number of MCS indexes is 5 bits).

Specifically, the N-order spiral modulation-M-order QAM modulation mode obtained based on the above method is used to replace some modulation modes in the existing 5G NR standard. For example, a 16 spiral-1024QAM modulation mode may be used to replace at least part of the modulation modes related to 16QAM in the existing 5G NR standard. Similarly, the 64 spiral-1024QAM modulation mode may be used to replace at least part of the modulation modes related to 64QAM in the existing 5G NR standard; The 256 spiral-1024QAM modulation mode may be used to replace at least part of the modulation modes related to 256QAM in the existing 5G NR standard.

For example, in the MCS table shown in FIG. 8A, the 16 spiral-1024QAM modulation mode and the 64 spiral-1024QAM modulation mode are used to replace a part of the modulation modes in an existing MCS index table 1 for PDSCH, so that the obtained new MCS table contains the pseudo-16 spiral modulation mode and the pseudo-64 spiral modulation mode, thus, the new MCS table may provide the modulation mode of resisting the phase noise, that is, the pseudo spiral modulation mode, and the total number of modulation modes contained in the new MCS table obtained thereby remains unchanged, so the overhead for MCS indication also remains unchanged. In addition, although the MCS index table in FIG. 8A uses the same 16 spiral-1024QAM or 64 spiral-1024QAM for different code rates, this disclosure is not limited to this, and in other embodiments, different 16 spiral-1024QAM or 64 spiral-1024QAM may be used for different code rates. For example, under the condition of different code rates, the number of symbols in the outermost layer at a spiral in the constellation map of the used pseudo spiral modulation may be different.

For example, in some embodiments, a pseudo spiral modulation mode may be added to the current MCS table to generate a new MCS table, and the modulation mode capable of resisting phase noise is increased in the generated new MCS table while all the existing modulation modes are remained. However, it should be understood that as the total number of modulation modes in the generated new MCS table increases, the overhead for MCS indication also increases accordingly. FIGS. 9A-9E show new MCS tables according to an embodiment of the present disclosure, wherein the new MCS tables have more MCS indexes than the existing NR standard (that is, the number of MCS indexes is greater than 5 bits).

Specifically, the N-order spiral modulation-M-order QAM modulation mode obtained based on the above method is added to the MCS table used in the existing 5G NR standard. For example, a 16 spiral-1024QAM modulation mode may be added, thereby increasing the number of MCS indexes related to 16QAM in the MCS table used in the existing 5G NR standard. Similarly, a 64 spiral-1024QAM modulation mode may be added, thereby increasing the number of MCS indexes related to 64QAM in the MCS table used in the existing 5G NR standard; a 256 spiral-1024QAM modulation mode may be added, thereby increasing the number of MCS indexes related to 256QAM in the MCS table used in the existing 5G NR standard.

For example, FIG. 9A shows that a 16 spiral-1024QAM modulation mode and a 64 spiral-1024QAM modulation mode are added to the existing MCS index table 1 for PDSCH, and a new MCS table with the number of MCS indexes being 6 bits is formed, so that the generated new MCS table not only contains the pseudo spiral modulation mode and thus the modulation of resisting phase noise is able to be performed, but also remains all the modulation modes in the existing table.

In addition, in some embodiments, a new MCS table may be generated only by using the pseudo spiral modulation mode, or the existing modulation mode of resisting the phase noise and the pseudo spiral modulation mode may be used together to generate the new MCS table. Existing modulation of resisting the phase noise may include, for example, binary phase shift keying (BPSK) modulation, quadrature phase shift keying (QPSK) modulation and so on. FIGS.

10A-10C show new MCS tables according to an embodiment of the present disclosure, wherein the new MCS tables only contain modulation modes capable of resisting the phase noise, including Spiral modulation, pseudo spiral modulation obtained according to an embodiment of the present disclosure, BPSK modulation, QPSK modulation, and the like.

For example, a new MCS table may be generated only by using pseudo spiral modulation modes with different modulation orders. As shown in the new MCS table in FIG. 10A, the MCS table only contains 16 spiral-1024QAM modulation modes and 64 spiral-1024QAM modulation modes. Because low-order modulation itself is insensitive to the phase noise, this disclosure only takes a MCS table including 16 spiral-1024QAM modulation mode and 64 spiral-1024QAM modulation mode as an example, but not takes it as a limitation. In other embodiments, the new MCS table may also include pseudo spiral modulation modes with other modulation orders, such as 256 spiral or pseudo spiral modulation modes.

For example, a new MCS table may be generated by adding a pseudo spiral modulation method, based on the existing modulation modes of modulation (e.g., BPSK modulation, QPSK modulation, etc.) of resisting the phase noise. The MCS tables shown in FIG. 10B and FIG. 10C include BPSK modulation, PI/2 BPSK modulation, PI/4 BPSK modulation, QPSK modulation, PI/4 QPSK modulation, and so on, in addition to pseudo spiral modulation with different modulation orders. Different from the MCS tables shown in FIGS. 8A-8E and 9A-9E, the obtained new MCS table thereby may provide a variety of modulation modes of resisting phase noise, not only the pseudo spiral modulation mode.

Furthermore, the MCS table formed according to the embodiment of the present disclosure, which only contains modulation modes capable of resisting the phase noise, may be used in combination with the MCS table in the existing 5G NR standard, and whether to use the new MCS table capable for modulation of resisting the phase noise or the existing MCS table with only QAM modulation may be indicated according to whether there is the phase noise through additional indication bits, thereby realizing flexible selection among multiple sets of MCS tables. Further examples of selecting the MCS table to be used from multiple sets of MCS tables (including new MCS tables and existing MCS tables) will be described in detail later.

Furthermore, according to some embodiments of the present disclosure, all the pseudo spiral modulation modes in the new MCS table shown above may be specific to the same phase noise. Additionally or alternatively, the pseudo spiral modulation modes in the new MCS table may also be specific to different phase noises. According to another example of the present disclosure, when a specific MCS table includes a pseudo spiral modulation modes for different phase noises, the control unit 720 of the transmitting device 700 shown in FIG. 7 may be further configured to determine a MCS index from the specific MCS table according to information about the phase noises (e.g., phase noise variance).

As shown in FIG. 9A, the MCS table in FIG. 9A contains not only pseud spiral modulation modes with different modulation orders, but also pseudo spiral modulation modes with the same modulation order for different phase noises. For example, the index number 32 of the MCS table in FIG. 9A corresponds to the pseudo-16 spiral modulation for low phase noise, and the index number 33 corresponds to the pseudo-16 spiral modulation for high phase noise. For another example, the index numbers 57, 58 and 59 of the MCS table in FIG. 9E respectively correspond to the pseudo-64 spiral modulation modes for low phase noise, medium phase noise and high phase noise. As shown above, when the pseudo spiral modulation modes in the new MCS table are specific to different phase noises, the control unit 720 of the transmitting device 700 shown in FIG. 7 needs to first determine a MCS table to be used according to the information about the phase noises, and then determine a MCS index and a corresponding modulation mode from the determined MCS table again according to the information about the phase noises.

According to another example of the present disclosure, the control unit 720 may also determine the MCS index using other channel measurement results in addition to information about phase noise.

In addition, according to another embodiment of the present disclosure, the new MCS table (for example, the MCS tables shown in FIGS. 8A-8E, 9A-9E and 10A-10C) described above, which contains modulation modes capable of resisting the phase noise, and the MCS table used in the existing standards may coexist in a communication system. According to an example of the present disclosure, whether to use the new MCS table containing modulation modes of resisting the phase noise or an existing MCS table containing only QAM modulation modes may be indicated according to whether there is the phase noise.

For example, the receiving device may feed back to the transmitting device whether information about a MCS table identifier is needed. When a feedback from the receiving device indicates that information about the MCS table identifier is needed, the transmitting device may transmit the information about the MCS table identifier to the receiving device according to the feedback from the receiving device. For another example, the transmitting device may determine whether to use a new MCS table containing a modulation mode capable of resisting the phase noise according to the information about phase noise, and when it is determined to use the new MCS table containing the modulation mode capable of resisting the phase noise, actively transmit information about the MCS table identifier to the receiving device.

For example, the transmitting device 700 shown in FIG. 7 may alternatively further include a receiving unit 710 (shown in a dashed box) configured to receive the information about the MCS table identifier, and the control unit 720 of the transmitting device 700 may further be configured to determine a MCS table according to the received information about the MCS table identifier and determine a MCS index from the determined MCS table.

In some embodiments, the information about the MCS table identifier may be, for example, $I_{flag}$ for indicating whether a MCS table containing a modulation mode of resisting the phase noise needs to be used. According to some embodiments of the present disclosure, the transmitting device first receives $I_{flag}$, then determines a MCS table to be used from a plurality of MCS tables according to the received $I_{flag}$, and determines a corresponding MCS index from the determined MCS table. For example, the plurality of MCS tables may include new MCS tables as shown in the above-mentioned FIG. 8A-8E or 9A-9E or 10A-10C and MCS tables in the existing 5G NR standard, and these MCS tables may be stored in at least one of the transmitting device and the receiving device in advance. Therefore, the transmitting device makes targeted selection according to the received information about $I_{flag}$ from a plurality of MCS tables, thereby improving the efficiency of the MCS tables determined by the transmitting device.

For example, in some embodiments, the receiving unit 710 of the transmitting device 700 shown in FIG. 7 receives $I_{flag}$ for indicating whether a MCS table including a modulation mode of resisting the phase noise is needed, wherein $I_{flag}=1$ indicates that the MCS table including the modulation mode of resisting the phase noise is needed, and $I_{flag}=0$ indicates that the MCS table including the modulation mode of resisting the phase noise is not needed. $I_{flag}$ may be transmitted through Radio Resource Control (RRC) signaling, medium access control-control element (MAC CE), Uplink Control Information, UCI) and other signaling. In other embodiments, the values of $I_{flag}$ may not be limited to 0 and 1, for example, $I_{flag} \in \{0, 1, 2, \dots\}$, where each value other than 0 corresponds to one of a plurality of MCS tables including modulation modes of resisting the phase noise (such as the MCS tables shown in FIGS. 8A-8E, 9A-9E and 10A-10C), for example, different values of $I_{flag}$ may correspond to different MCS tables including modulation modes of resisting the phase noise, such as MCS tables for different phase noises. After receiving the signaling $I_{flag}$, the control unit 720 of the transmitting device 700 then determines the MCS table to be used from a plurality of MCS tables according to the received $I_{flag}$. For example, when $I_{flag}=1$ is received, which indicates that a MCS table including modulation modes of resisting the phase noise is needed, the control unit 720 may select from a plurality of MCS tables, for example, one of MCS tables including the pseudo spiral modulation modes, for example, one of MCS tables as shown in FIGS. 8A-8E, 9A-9E and 10A-10C. When $I_{flag}=0$ is received, which indicates that a MCS table including the pseudo spiral modulation modes is not needed, the control unit 720 selects one MCS table that only includes QAM modulation mode in the existing 5G NR standard from a plurality of MCS tables. Based on the determined MCS table, the control unit 720 of the transmitting device 700 may further determine a corresponding MCS index from the determined MCS table according to, for example, other received information such as reference signal reception power (RSRP) and reference signal reception quality (RSRQ), and then determine the modulation order ($Q_m$) and the target code rate (R) to be used according to the determined MCS index, thereby performing modulation.

According to other embodiments of the present disclosure, the transmitting device may also determine the MCS table and MCS index by itself according to the information about the phase noise, and transmit the information about the MCS index. Therefore, the transmitting device informs the receiving device whether a modulation mode capable of resisting the phase noise is used, so that the receiving device makes targeted selection according to the received information about $I_{flag}$ from a plurality of MCS tables, which the efficiency of the MCS table being determined by the receiving device is improved.

For example, in some embodiments, the control unit 720 of the transmitting device 700 shown in FIG. 7 may determine whether a MCS table including modulation modes of resisting the phase noise is needed, according to the phase noise or variance of the phase noise. For example, if the phase noise (or the variance of the phase noise) is small, one of the MCS tables of QAM in the existing 5G NR standard may be selected and the MCS index may be determined; If the phase noise (and/or the variance of the phase noise) is large, one of MCS tables containing pseudo spiral modulation modes is selected and the MCS index is determined. For example, the corresponding MCS index may be determined from the determined MCS table according to other received information (such as reference signal reception power (RSRP), reference signal reception quality (RSRQ), etc.), and then the modulation order ($Q_m$) and the target code rate (R) to be used may be determined according to the determined MCS index, thereby performing modulation.

According to some embodiments of the present disclosure, the transmitting unit may further transmit information about a MCS table identifier to indicate the used MCS table. For example, the transmitting unit 730 of the transmitting device 700 of FIG. 7 may further be configured to transmit information about the determined MCS table identifier, which may indicate whether the MCS table includes modulation capable of resisting the phase noise.

For example, in some embodiments, after the transmitting device (e.g., the transmitting device 700 of FIG. 7) determines the MCS index, information about the determined MCS table identifier, for example, $I_{flag}$ for indicating whether a MCS table for resisting the phase noise is needed, may be generated. If the MCS index is determined from the MCS table in the existing 5G NR standard, $I_{flag}=0$ is generated; If the MCS index is determined from the MCS table containing the pseudo-spiral modulation mode, $I_{flag}=1$ is generated. It should be understood that in other embodiments, the values of the generated $I_{flag}$ may not be limited to 0 and 1, for example, $I_{flag} \in \{0, 1, 2, \dots\}$, where each value except 0 corresponds to one of MCS tables containing pseudo spiral modulation modes. Then, the transmitting unit 730 of the transmitting device 700 may transmit the information about $I_{flag}$ and the MCS index to other devices together or separately. For example, the information about $I_{flag}$ is transmitted to other devices through RRC, MAC CE, Downlink Control Information, DCI), etc.

For example, the transmitting device may indicate whether to select the MCS table for resisting phase noise based on an existing selection method for determining the MCS table in the 3GPP standard and the existing signaling. For example, for downlink transmission, the transmitting device 700 of FIG. 7 may multiplex the flow of 5.1.3.1 in TS38.214. In DCI, the parameters related to a MCS table are set to Spiral or PhaseNoise or PN to indicate whether to use a MCS table containing modulation modes of resisting the phase noise. Alternatively, a higher layer parameter ifSpiral or ifPhaseNoise or ifPN may be added in the downlink transmission to indicate the MCS table identifier $I_{flag}$. When ifSpiral or ifPhaseNoise or ifPN=1, it indicates to use a MCS table containing modulation modes of resisting the phase noise. Similarly, for uplink transmission, it is also possible to indicate whether to use the MCS table containing the modulation modes of resisting the phase noise by increasing the high layer parameter ifSpiral or ifPhaseNoise or ifPN. For example, when ifSpiral or ifPhaseNoise or ifPN=1, the MCS table containing the modulation modes of resisting the phase noise is used.

According to other embodiments of the present disclosure, the transmitting device may also transmit information about a demodulation mode identifier to indicate the modulation mode of the receiving device. For example, the transmitting device may indicate the receiving device to use the same modulation method as the transmitting device for demodulation; Alternatively, the transmitting device may indicate the receiving device to use a modulation method different from that of the transmitting device for demodulation.

Taking the transmitting device 700 in FIG. 7 as an example, the transmitting unit 730 of the transmitting device 700 may be configured to transmit information about the demodulation mode identifier $I_{decode}$ (for example, to the receiving device) to indicate the demodulation mode of the receiving device, for example, whether to adopt a demodulation mode capable of resisting the phase noise. Information about the demodulation mode identifier $I_{decode}$ may be transmitted to other devices through RRC, MAC CE, DCI, etc. Accordingly, in response to the received $I_{decode}$, the receiving device may select a corresponding demodulation method according to the indication of $I_{decode}$.

In some embodiments, the demodulation mode of the receiving device may be indicated according to different values of $I_{decode}$. For example, $I_{decode}=0$ may expresses that the receiving device is indicated to demodulate using the same bit-to-symbol mapping table as that used by the transmitting device for modulation; $I_{decode}=1$ may expresses that the receiving device is indicated to demodulate using a bit-to-symbol mapping table different from that used by the transmitting device for modulation. In other embodiments, the values of $I_{decode}$ may not be limited to 0 and 1, for example, $I_{decode} \in \{0, 1, 2, \ldots\}$ where each value other than 0 corresponds to a corresponding one of a plurality of bit-to-symbol mapping tables different from the bit-to-symbol mapping table used by the transmitting device for modulation.

For example, the transmitting device may modulate a bit sequence to be transmitted by using a M-order second type of modulation mode, and obtain a symbol to be transmitted to the receiving device; The transmitting device may then transmit the symbol to be transmitted to the receiving device together with $I_{decode}$ indicating the receiving device to demodulate using pseudo-N-order first type of modulation. For example, when the transmitting device 700 is a base station, the base station may modulate a group of bit sequences using a 16 spiral-1024QAM modulation mode, and obtain the symbol to be transmitted to the UE. If the base station may transmit the symbol after the 16 spiral-1024QAM modulation to the UE and $I_{decode}$ indicating to use 1024QAM for demodulation, the UE will use the 1024QAM to demodulate the received symbol to obtain the bit sequence corresponding to the 16 spiral-1024QAM. In this case, the transmitting device and the receiving device may modulate and demodulate according to different bit-to-symbol mapping tables respectively, so that even if the receiving device only supports traditional demodulation modes such as the QAM and does not support the pseudo spiral demodulation mode, it can still use a traditional reception and demodulation algorithm to receive pseudo spiral constellation data. Therefore, the requirements for the receiving device are reduced and the compatibility is improved.

In addition, according to another embodiment of the present disclosure, the receiving unit 710 may also receive information about a modulation mode supported by the receiving device. The control unit 720 may also determine a MCS index suitable for the receiving device according to the information about the modulation mode supported by the receiving device. For example, the information about the modulation mode supported by the receiving device may include at least one of the M-order second type of modulation mode and the pseudo-N-order first type of modulation supported by the receiving device.

Hereinafter, a receiving device corresponding to the transmitting device 700 according to another embodiment of the present disclosure will be described with reference to FIG. 11. FIG. 11 is a schematic block diagram illustrating a receiving device 1100 according to an embodiment of the present disclosure. As shown in FIG. 11, the receiving device 1100 according to an embodiment of the present disclosure may include a receiving unit 1110 and a control unit 1120.

As shown in FIG. 11, the receiving unit 1110 of the receiving device 1100 may be configured to receive information about a MCS index, and the control unit 1120 of the receiving device 1100 may determine a corresponding MCS table for demodulation according to the received information about the MCS index.

According to an embodiment of the present disclosure, the control unit 1120 of the receiving device 1100 may determine a MCS table to be used from a plurality of MCS tables stored in advance, according to the received information about the MCS index, and determine the modulation order ($Q_m$) and the target code rate (R) to be used, thereby performing demodulation. In some embodiments, the plurality of MCS tables stored in advance may include MCS tables of modulation modes capable of resisting the phase noise, for example, the MCS tables shown according to FIGS. 8A-8E, 9A-9E and 10A-10C above, which will not be described in detail here. When the MCS table determined according to the received information about the MCS index is a MCS table including a modulation mode capable of resisting the phase noise, for example, the determined MCS table includes a pseudo-N-order first type of modulation mode capable of resisting the phase noise, in some embodiments, the control unit 1120 of the receiving device 1100 may use the pseudo-N-order first type of modulation mode (such as pseudo-N-order spiral modulation) for demodulation. In some embodiments, the determined MCS table may further include a second type of modulation different from the modulation capable of resisting the phase noise, for example, QAM.

According to another embodiment of the present disclosure, the receiving device 1100 may be further configured to receive information about a demodulation mode identifier and perform demodulation according to the information of the demodulation mode identifier, wherein the demodulation method identifier may indicate the receiving device 1100 to perform the demodulation in the same mode as the modulation mode of the transmitting device or may indicate the receiving device 1100 to perform the demodulation in a different mode from the modulation mode of the transmitting device. For example, when the receiving unit 1110 of the receiving device 1100 receives a symbol after the M-order second type of modulation and an identifier $I_{decode}$ indicating to use the pseudo-N-order first type for demodulation from the transmitting device (for example, the transmitting device 700 of FIG. 7), the control unit 1120 of the receiving device 1100 may perform the pseudo-N-order first type of demodulation on the received symbol in response to the $I_{decode}$. For example, the receiving device 1100 may demodulate the received symbol after 16 spiral-1024QAM modulation, according to $I_{decode}$ indicating to use 1024QAM for demodulation, to obtain a bit sequence corresponding to 16 spiral-1024QAM.

In addition, according to another embodiment of the present disclosure, the receiving device 1100 may further include a transmitting unit 1130 (as shown by the dashed box in FIG. 11). The transmitting unit 1130 may transmit information about a modulation mode supported by the receiving device to the transmitting device. Therefore, the transmitting device may determine whether to use the above pseudo-N-order first type of modulation according to the information about the modulation mode supported by the receiving device, and further determine the MCS index suitable for the receiving device. For example, an indication of the information about the modulation mode supported by the receiving device may include at least one of the M-order second type of modulation mode and the pseudo-N-order first type of modulation supported by the receiving device 1100.

An example in which a transmitting device directly transmits information of modulation parameters to a receiving device based on information about phase noise will be described below with reference to FIGS. 12 to 14B. FIG. 12 is a schematic block diagram of a transmitting device 1200 according to another example of the present disclosure.

As shown in FIG. 12, the transmitting device 1200 may include a control unit 1210 and a transmitting unit 1220. In addition to the control unit 1210 and the transmitting unit 1220, the transmitting device 1200 may also include other components, however, since these components are irrelevant to the contents of the embodiment of the present disclosure, their illustrations and descriptions are omitted here. In addition, similar to the transmitting device 300, the transmitting device 1200 may be a base station or a terminal in a communication system.

In the example shown in FIG. 12, the control unit 1210 may determine information about a modulation parameter indicating a spiral factor according to information about the phase noise. The transmitting unit 1220 may then transmit the determined information about the modulation parameter, so that the receiving device may determine a modulation mode according to the information about the modulation parameter so as to demodulate received data.

When it is needed to determine $2^N$ constellation points of pseudo-N-order spiral modulation according to a amplitude weighting parameter $\alpha$ and a phase weighting parameter $\beta$, according to an example of the present disclosure, the modulation parameter may further indicate at least one of the amplitude weighting parameter $\alpha$ and the phase weighting parameter $\beta$. As mentioned above, the values of $\alpha$ and $\beta$ need to satisfy $\alpha+\beta=1$. Therefore, the transmitting device may only transmit information about one of the amplitude weighting parameter $\alpha$ and the phase weighting parameter $\beta$ being indicated by the modulation parameter. The receive device may obtain, according to one of the amplitude weighting parameter $\alpha$ and the phase weighting parameter $\beta$ indicated by the modulation parameter, another of the amplitude weighting parameter $\alpha$ and the phase weighting parameter $\beta$ indicated by the modulation parameter, thus, signaling expenses may be reduced.

According to another example of the present disclosure, the modulation parameter further indicates at least one of M and N. According to an example of the present disclosure, modulation orders of the first type of modulation and the second type of modulation may be static or semi-static, and only the information about at least one of M and N may be transmitted or neither of them may be transmitted as required, thus the signaling expenses may be further reduced.

Furthermore, according to another example of the present disclosure, the information about the modulation parameter may directly include information about the spiral factor. Further, similar to the spiral factor, in the case where the information about the modulation parameter further indicates one or more parameters of the amplitude weighting parameter $\alpha$, the phase weighting parameter $\beta$, order N of the pseudo first type of modulation, order M of the second type of modulation, etc., the information about the modulation parameter may directly include information about the one or more parameters. Therefore, the receiving device may directly determine the demodulation mode according to the received information about the modulation parameter.

For example, each parameter in the information about the modulation parameter can be explicitly notified through RRC signaling, MAC CE, DCI or UCI. Further, each parameter in the information about the modulation parameter may be explicitly notified through newly set RRC signaling, MAC CE, DCI or UCI. Alternatively, a part of parameters in the information about the modulation parameter may be notified by a traditional way, and other parameters in the information about the modulation parameter may be explicitly notified by the newly set RRC signaling, MAC CE, DCI or UCI. For example, the MCS index may be transmitted by methods currently used in various standards (e.g., 3GPP standards) to inform the order N of the pseudo-first type of modulation, and other parameters in information about the modulation parameter may be explicitly notified by the newly set RRC signaling, MAC CE, DCI or UCI.

In addition, a set of candidate values of each parameter in the information about the modulation parameter may be set in advance, and an index in the preset set of the candidate values may be indicated through RRC signaling, MAC CE, DCI or UCI, thereby indicating the value of each parameter. For example, a set $\{f_s1, f_s2, \ldots f_sL\}$ of candidate values of the spiral factor $f_s$ may be set according to common phase noise or variance of the phase noise, where L may be the n power of 2. Thus, a specific value of $f_s$ in the set of the candidate values may be indicated by n bits. Alternatively, the set of the candidate values of the parameter may not be set in advance, but the parameter may be directly quantized and explicitly notified.

Furthermore, according to another example of the present disclosure, the information about the modulation parameter includes information about an index of a modulation parameter table. Therefore, in the case that a plurality of modulation parameters need to be transmitted to the receiving device, the signaling expense may be reduced.

Information about the modulation parameter will be further described below with reference to the receiving device corresponding to the transmitting device 1200 and FIGS. 13 and 14.

In addition, according to another embodiment of the present disclosure, similar to the transmitting device 700, the transmitting device 1200 may further include a receiving unit 1230 (as shown in the dashed box in FIG. 12) to receive information about a modulation mode supported by the receiving device. The control unit 1210 may also determine whether to use the pseudo-N-order first type of modulation according to the information about the modulation mode supported by the receiving device. For example, an indication of the information about the modulation mode supported by the receiving device may include at least one of the M-order second type of modulation mode and the pseudo-N-order first type of modulation supported by the receiving device.

In addition, similar to the transmitting device 700, the transmitting unit 1220 of the transmitting device 1200 may also transmit information about a demodulation mode identifier $I_{decode}$ for indicating the demodulation mode of the receiving device, for example, whether to adopt a demodulation mode capable of resisting the phase noise. Information about the demodulation mode identifier $I_{decode}$ may be transmitted to other devices through RRC, MAC CE, DCI, etc. Accordingly, in response to the received $I_{decode}$, the receiving device may select a corresponding demodulation mode according to the indication of $I_{decode}$.

In some embodiments, the demodulation mode of the receiving device may be indicated according to different values of $I_{decode}$. For example, $I_{decode}=0$ may express that the receiving device is indicated to demodulate using the same bit-to-symbol mapping table as that used by the transmitting device for modulation; $I_{decode}=1$ may express that the receiving device is indicated to demodulate using a bit-to-symbol mapping table different from that used by the transmitting device for modulation, and vice versa.

For example, the transmitting device may modulate a bit sequence to be transmitted by using the M-order second type of modulation mode, and obtain a symbol to be transmitted to the receiving device; The transmitting device may then transmit the symbol to be transmitted to the receiving device together with $I_{decode}$ indicating the receiving device to demodulate using the pseudo-N-order first type of modulation. For example, when the transmitting device 1200 is a base station, the base station may modulate a group of bit sequences using a 16 spiral-1024QAM modulation mode, and obtain the symbol to be transmitted to the UE. Moreover, the base station may transmit the symbol after 16 spiral-1024QAM modulation to the UE and $I_{decode}$ indicating to use 1024QAM for demodulation, then the UE will use 1024QAM to demodulate the received symbol. In this case, the transmitting device and the receiving device may modulate and demodulate according to different modulation modes respectively, thus reducing the requirements for the receiving device and improving the compatibility.

Hereinafter, a receiving device corresponding to the transmitting device 1200 according to another embodiment of the present disclosure will be described with reference to FIG. 13. FIG. 13 is a schematic block diagram of a receiving device 1300 according to another example of the present disclosure.

As shown in FIG. 13, a receiving device 1300 according to another embodiment of the present disclosure may include a receiving unit 1310 and a control unit 1320. In addition to the receiving unit 1310 and the control unit 1320, the receiving device 1300 may further include other components, however, since these components have nothing to do with the contents of the embodiment of the present disclosure, their illustrations and descriptions are omitted here. In addition, the receiving device 1300 may be a base station or a terminal in a communication system.

As shown in FIG. 13, the receiving unit 1310 of the receiving device 1300 receives information about a modulation parameter indicating a spiral factor. The control unit 1320 may determine pseudo-N-order first type of modulation according to the received modulation parameter, wherein $2^N$ first symbols of the pseudo-N-order first type of modulation correspond to a part of $2^M$ second symbols of M-order second type of modulation, where M and N are positive integers.

For example, the control unit 1320 may determine the spiral factor according to the information about the modulation parameter, and determine the N-order spiral constellation points according to the spiral factor based on the method described above in connection with formulas (1)-(3). In an example according to the present disclosure, the control unit 1320 may calculate N-order spiral constellation points every time according to the spiral factor indicated by the received information about the modulation parameter. Alternatively, the receiving device 1300 may further include a storage unit to store corresponding relationship between the spiral factor and the N-order spiral constellation points in advance. Therefore, the control unit 1320 may obtain the N-order spiral constellation points corresponding to the spiral factor indicated by the received information about the modulation parameter according to the corresponding relationship between the spiral factor and the N-order spiral constellation points stored in advance.

Then, the control unit 1320 may use a part of constellation points in a constellation map of an existing M-order second type of modulation to simulate a constellation map of the determined N-order spiral modulation. For example, as described above, the control unit 1320 may determine $2^N$ constellation points of the pseudo-N-order spiral modulation (i.e., N-order spiral modulation-M-order QAM) according to the amplitude weighting parameter $\alpha$ and the phase weighting parameter $\beta$. In an example according to the present disclosure, the control unit 1320 may select pseudo-N-order spiral constellation points from among the constellation points of the M-order second type of modulation every time according to at least one of the amplitude weighting parameter $\alpha$ and the phase weighting parameter $\beta$ indicated by the received information about the modulation parameter. Alternatively, the receiving device 1300 may further include a storage unit to store corresponding relationship between at least one of the amplitude weighting parameter $\alpha$ and the phase weighting parameter $\beta$ and the pseudo-N-order spiral constellation points in advance. Therefore, the control unit 1320 may obtain the pseudo-N-order spiral constellation points corresponding to the received information about the modulation parameter according to the corresponding relationship between at least one of the amplitude weighting parameter $\alpha$ and the phase weighting parameter $\beta$ and the pseudo-N-order spiral constellation points stored in advance.

Alternatively, the control unit 1320 may simulate the constellation map of the determined N-order spiral modulation from a part of the constellation points in the constellation map of the existing M-order second type of modulation according to other conditions such as Euclidean distance and so on.

When it is needed to determine $2^N$ constellation points of the pseudo-N-order spiral modulation according to the amplitude weighting parameter $\alpha$ and the phase weighting parameter $\beta$, according to an example of the present disclosure, the modulation parameter may further indicate at least one of the amplitude weighting parameter $\alpha$ and the phase weighting parameter $\beta$. As mentioned above, the values of $\alpha$ and $\beta$ need to satisfy $\alpha+\beta=1$. Therefore, when the modulation parameter indicates one of the amplitude weighting parameter $\alpha$ and the phase weighting parameter $\beta$, the control unit 1320 may obtain, according to one of the amplitude weighting parameter $\alpha$ and the phase weighting parameter $\beta$ indicated by the modulation parameter, another of the amplitude weighting parameter $\alpha$ and the phase weighting parameter $\beta$ indicated by the modulation parameter.

Furthermore, according to an example of the present disclosure, the order N of the pseudo first type of modulation and/or the order M of the second type of modulation may be predetermined. For example, the order N of the pseudo first type of modulation and/or the order M of the second type of modulation may be static or semi-static. For example, the order M of the second type of modulation may be determined in advance as 1024. For another example, the order N of the second type of modulation may be determined in advance to be 16 or 64.

Alternatively, according to another example of the present disclosure, the modulation parameter further indicates at least one of M and N. The control unit 1320 may determine the pseudo-N-order first type of modulation according to the received information about the modulation parameter.

As described above, according to an example of the present disclosure, the information about the modulation parameter may directly include information about the spiral factor, and the control unit 1320 may determine the pseudo-N-order first type of modulation according to the information about the spiral factor. Further, similar to the spiral factor, in the case where the information about the modulation parameter further indicates one or more parameters of the amplitude weighting parameter $\alpha$, the phase weighting parameter $\beta$, the order N of the pseudo first type of modulation, the order M of the second type of modulation, etc., the information about the modulation parameter may directly include information about the one or more parameters.

In addition, a set of candidate values of each parameter in the information about the modulation parameter may be set in advance, and an index in the set of the candidate values set in advance may be indicated through RRC signaling, MAC CE, DCI or UCI, thereby indicating the value of each parameter. For example, a set $\{f_s1, f_s2, \ldots f_sL\}$ of candidate values of the spiral factor $f_s$ may be set according to common phase noise or variance of the phase noise, where L may be the n power of 2. Thus, a specific value of $f_s$ in the set of candidate values may be indicated by n bits. Alternatively, the set of the candidate values of the parameter may not be set in advance, but the parameter may be directly quantized and explicitly notified.

In addition, according to another example of the present disclosure, information about the modulation parameter includes information about an index of a modulation parameter table, and the control unit 1320 may determine the spiral factor in the modulation parameter table according to the information about the index of the modulation parameter table, and determine the pseudo-N-order first type of modulation according to the determined spiral factor. Thus, in the case that the receiving equipment needs multiple modulation parameters, the signaling expenses may be reduced.

For example, a modulation parameter table corresponding different modulation order N of the second type of modulation may be set in advance. In each entry of the modulation parameter table, the values of one or more parameters corresponding to an index of the entry, such as the spiral factor $f_s$, the amplitude weighting parameter $\alpha$, the phase weighting parameter $\beta$, the order M of the second type of modulation, etc., may be set. Alternatively, different parameter values may be set for different phase noise or variance of the phase noise.

FIGS. 14A and 14B are schematic diagrams showing a preset modulation parameter table according to an example of the present disclosure. As shown in FIG. 14A and 14B, for a specific modulation order of the first type of modulation, the spiral factor $f_s$, the amplitude weighting parameter $\alpha$, the phase weighting parameter $\beta$ and the order M of the second type of modulation may be set for different phase noises or different phase noise levels. The index of the modulation parameter table may be used to indicate the parameter values for a specific phase noise and different phase noise levels under the specific modulation order of the first type of modulation.

For example, in some embodiments of the present disclosure, different indexes of the modulation parameter table may indicate parameter values of the same phase noise level. As shown in FIG. 14A, when the modulation order of the first type of modulation is N2 and the phase noise level is PN22, $f_s24$, $\alpha24$, $\beta24$ and M24 may be indicated by the index value 1 of the modulation parameter table.

In the example shown in FIG. 14A, the information about the modulation parameter received by the receiving unit 1310 may include information about the index of the modulation parameter table. For example, when the modulation order of the first type of modulation is N1 and the phase noise level is PN11, the information about the modulation parameter may include information about the index 1 of the modulation parameter table to indicate that the values of the spiral factor $f_s$, the amplitude weighting parameter $\alpha$, the phase weighting parameter $\beta$ and the order M of the second type of modulation are $f_s11$, $\alpha11$, $\beta11$, M11, respectively. In addition, according to an example of the present disclosure, the modulation order of the first type of modulation may be static or semi-static, or a MCS index may be transmitted by a method currently used in various standards (e.g., 3GPP standards) to inform the order of the pseudo first type of modulation. Furthermore, according to another example of the present disclosure, the receiving device 1300 may detect the phase noise and obtain information about the phase noise. Alternatively, the information about the phase noise may also be determined by the transmitting device and transmitted to the receiving device 1300.

For example, in other embodiments of the present disclosure, different indexes of the modulation parameter table may indicate parameter values of different phase noise levels. For example, as shown in FIG. 14B, the modulation order of the first type of modulation is N2, and the index value of the modulation parameter table may be selected according to the phase noise, for example, the index value being 1 indicates the parameters $f_s22$, $\alpha22$, $\beta22$, M22 corresponding to the phase noise PN22.

In the example shown in FIG. 14B, the information about the modulation parameter received by the receiving unit 1310 may include information about the index of the modulation parameter table. For example, when the modulation order of the first type of modulation is N2 and the index value is 1, the information about the modulation parameter may include information corresponding to the phase noise PN22 to indicate that the values of the spiral factor $f_s$, the amplitude weighting parameter $\alpha$, the phase weighting parameter $\beta$ and the order M of the second type of modulation are $f_s22$, $\alpha22$, $\beta22$, M22, respectively.

Furthermore, according to another embodiment of the present disclosure, similar to the receiving device 1100, the receiving device 1300 may further include a transmitting unit 1330. The transmitting unit 1330 may transmit information about a modulation mode supported by the receiving device to the transmitting device. Therefore, the transmitting device may determine whether to use the above pseudo-N-order first type of modulation according to the information about the modulation mode supported by the receiving device. For example, an indication of the information about the modulation mode supported by the receiving device may include at least one of the M-order second type of modulation mode and the pseudo-N-order first type of modulation supported by the receiving device 1300.

In addition, similar to the receiving device 1100, according to another embodiment of the present disclosure, the receiving unit 1310 may be further configured to receive information about a demodulation mode identifier, and perform demodulation according to the information of the demodulation mode identifier, wherein the demodulation mode identifier may indicate the receiving device 1300 to perform demodulation using the same mode as the modulation mode of the transmitting device or may also indicate the receiving device 1300 to perform demodulation using a different mode from the modulation mode of the transmitting device.

Next, a modulation method corresponding to the transmitting device 300 according to an embodiment of the present disclosure will be described with reference to FIG. 15. FIG. 15 is a flowchart of a modulation method 1500 according to an embodiment of the present disclosure. The modulation method 1500 may be performed by a transmitting device. Since the steps of the modulation method 1500 correspond to the operations of the transmitting device 300 of FIG. 3 above, a detailed description of the same content is omitted here for the sake of simplicity.

As shown in FIG. 15, in step S1501, a bit sequence to be transmitted is obtained. Then, in step S1502, pseudo-N-order first type of modulation is performed on the bit sequence to be transmitted according to information about phase noise.

As shown in step S1501, the bit sequence to be transmitted may be obtained. For example, the bit sequence to be transmitted in units of N first bits may be obtained in step S1501.

After receiving the bit sequence to be transmitted, as shown in step S1502, the pseudo-N-order first type of modulation may performed on the received bit sequence to be transmitted according to the information about the phase noise to obtain a first symbol to be transmitted.

According to some embodiments of the present disclosure, as described above, $2^N$ first symbols of the pseudo-N-order first type of modulation here correspond to a part of $2^M$ second symbols of M-order second type of modulation, where M and N are positive integers and M is greater than N. For example, a symbol that can be obtained using the N-order first type of modulation may be simulated by using a part of $2^M$ second symbols that can be obtained using the M-order second type of modulation.

For example, the symbol that can be obtained by using the N-order first type of modulation may be simulated according to a part of $2^M$ second symbols that can be obtained by using the M-order second type of modulation in the manner shown in the above-mentioned formulas (1)-(3) and FIGS. 4A-4C, which will not be described in detail here.

After receiving the bit sequence to be transmitted, the bit sequence may be modulated according to the information about phase noise to obtain the symbol to be transmitted. As mentioned above, the information about the phase noise may include information about the phase noise itself, information about magnitude of variance of the phase noise, or any other information that can characterize the phase noise. Then the pseudo-N-order first type of modulation may be performed on the bit sequence to be transmitted according to a bit-to-symbol mapping table.

For example, the bit sequence to be transmitted may be modulated according to the bit-to-symbol mapping tables for different phase noises as described above, thereby obtaining the symbol to be transmitted. As in some embodiments, the bit-to-symbol mapping tables for different phase noises may be bit-to-symbol mapping tables of the pseudo-N-order first type of modulation determined based on the bit-to-symbol mapping table of the M-order second type of modulation, for example, the pseudo spiral bit-to-symbol mapping tables shown in FIGS. 5A-1, 5A-2 and 5B-5F. According to the bit-to-symbol mapping tables described above, the modulation may be performed according to the pseudo-N-order first type of modulation, so as to modulate the received bit sequence in units of N first bits into the symbol to be transmitted.

For example, according to an example of the present disclosure, when the received bit sequence to be transmitted is 0001, pseudo-16 spiral modulation may be performed on the bit sequence and the symbol $$\frac{1}{\sqrt{667.5}}(5-9i)$$

to be transmitted may be obtained.

Next, a demodulation method corresponding to the receiving device 600 according to an embodiment of the present disclosure will be described with reference to FIG. 16. FIG. 16 is a flowchart of a demodulation method 1600 according to an embodiment of the present disclosure. The receiving method 1600 may be performed by the receiving device. Since the steps of the demodulation method 1600 correspond to the operations of the receiving device 600 of FIG. 6, a detailed description of the same content is omitted here for the sake of simplicity.

As shown in FIG. 16, in step S1601, a symbol after pseudo-N-order first type of modulation is obtained. Then, in step S1602, the symbol is demodulated according to the information about the phase noise to obtain a truly transmitted bit sequence.

According to some embodiments of the present disclosure, as described above, $2^N$ first symbols of the pseudo-N-order first type of modulation in step S1601 correspond to a part of $2^M$ second symbols of M-order second type of modulation, where M and N are positive integers and M is greater than N. For example, a symbol that can be obtained using the N-order first type of modulation may be simulated by using a part of $2^M$ second symbols that can be obtained using the M-order second type of modulation.

For example, the symbol that can be obtained by using the N-order first type of modulation may be simulated according to a part of $2^M$ second symbols that can be obtained by using the M-order second type of modulation in the manner shown in the above-mentioned formulas (1)-(3) and FIGS. 4A-4C, which will not be described in detail here.

After receiving the symbol after the pseudo-N-order first type of modulation, then in step S1602, the symbol may be demodulated according to the information about the phase noise to obtain a received bit sequence. As mentioned above, the information about the phase noise may include information about the phase noise itself, information about magnitude of variance of the phase noise, or any other information that can characterize the phase noise. In some embodiments, the received symbol may be demodulated according to a bit-to-symbol mapping table.

For example, symbols may be demodulated according to the bit-to-symbol mapping tables for different phase noises as described above, thereby obtaining the received bit sequence. In some embodiments, the bit-to-symbol mapping tables for different phase noises may be bit-to-symbol mapping tables of the pseudo-N-order first type of modulation determined based on the bit-to-symbol mapping table of the M-order second type of modulation, for example, the pseudo spiral bit-to-symbol mapping tables shown in FIGS. 5A-1, 5A-2 and 5B-5F. According to the bit-to-symbol mapping tables described above, demodulation may be performed according to the pseudo-N-order first type of modulation to obtain a bit sequence in units of N first bits, or demodulation may also be performed according to the M-order second type of modulation to obtain a bit sequence in units of M second bits. For example, in some embodiments, if a symbol after pseudo-16 spiral modulation is obtained, the demodulation may be performed according to the pseudo-16 spiral modulation to obtain a bit sequence containing 4 bits.

Based on the above example, when a symbol $$\frac{1}{\sqrt{667.5}}(5 - 9i)$$

is received, it may be demodulated according to the bit-to-symbol mapping table corresponding to the pseudo-16 spiral modulation, and the bit sequence 0001, that is, the actually transmitted bit sequence, may be obtained.

Next, a transmitting method corresponding to the transmitting device 700 according to an embodiment of the present disclosure will be described with reference to FIG. 17. FIG. 17 is a flowchart of a modulation method 1700 according to an embodiment of the present disclosure. The transmitting method 1700 may be performed by a transmitting device. Since the steps of the modulation method 1700 correspond to the operations of the transmitting device 700 of FIG. 7 above, a detailed description of the same content is omitted here for the sake of simplicity.

As shown in FIG. 17, in step S1701, a modulation and coding strategy (MCS) index is determined according to information about phase noise. Then, in step S1702, the information about the MCS index is transmitted.

For example, in step S1701, a MCS table may be determined from a plurality of MCS tables according to the information about the phase noise, and a MCS index may be determined from the determined MCS table.

According to some embodiments of the present disclosure, as described above, the determined MCS table here may include a modulation mode capable of resisting the phase noise. For example, the determined MCS table may include a modulation mode of the pseudo-N-order first type of modulation as described above, such as a pseudo-N-order spiral modulation mode. For example, the determined MCS table may be formed according to methods corresponding to MCS tables shown in FIGS. 8A-8E, 9A-9E and 10A-10C, which will not be described in detail here.

After the MCS table is determined, the MCS index may then be further determined from the determined MCS table according to the information about the phase noise in step S1701. As mentioned above, the information about the phase noise may include information about the phase noise itself, information about magnitude of variance of the phase noise, or any other information that can characterize the phase noise, which will not be described in detail here. For example, in some embodiments, information about phase noise may indicate whether it is low phase noise, medium phase noise or high phase noise.

In other embodiments, alternatively, the transmitting method 1700 may further include receiving information about a MCS table identifier, then the MCS table is determined according to the received information about the MCS table identifier and the MCS index is determined from the determined MCS table in step S1701.

For example, as shown above, the information about the MCS table identifier may be $I_{flag}$ for indicating whether a MCS table containing a modulation mode of resisting the phase noise needs to be used. For example, the transmitting device first receives $I_{flag}$, then determines a MCS table to be used from a plurality of MCS tables according to the received $I_{flag}$, and determines a corresponding MCS index from the determined MCS table. As mentioned above, $I_{flag}$ may be transmitted through signaling such as RRC, MAC CE, UCI, etc., which will not be described in detail here. As mentioned above, the plurality of MCS tables here may include new MCS tables as shown in the above-mentioned FIG. 8A-8E or 9A-9E or 10A-10C and may further include MCS tables in the existing 5G NR standard, and these MCS tables may be stored in at least one of the transmitting device and the receiving device in advance, which will not be described in detail here.

In still other embodiments, in step S1701, the MCS table and the MCS index may be determined by itself according to the information about the phase noise. For example, it may be determined according to the phase noise or variance of the phase noise whether a MCS table including modulation modes of resisting the phase noise is needed. For example, if the phase noise (or the variance of the phase noise) is small, one of the MCS tables of QAM in the existing 5G NR standard may be selected and the MCS index may be determined; If the phase noise (and/or the variance of the phase noise) is large, one of MCS tables containing pseudo spiral modulation modes is selected and the MCS index is determined.

In some embodiments, the MCS index may be determined from the determined MCS table using other channel measurement results in addition to the information about the phase noise. For example, the corresponding MCS index may be determined from the determined MCS table according to, for example, reference signal reception power (RSRP), reference signal reception quality (RSRQ), etc.

After the MCS index is determined, as shown in step S1702, information about the MCS index may then be transmitted. For example, the information about the MCS index determined from the determined MCS table may be transmitted.

According to some embodiments of the present disclosure, the transmitting method 1700 may further include transmitting information about a MCS table identifier. Wherein the MCS table identifier indicates whether the determined MCS table includes modulation capable of resisting the phase noise. For example, in some embodiments, information about the MCS table identifier of the determined MCS table may be transmitted, and the MCS table identifier may indicate whether the MCS table to be used includes modulation capable of resisting the phase noise. As mentioned above, the information about the MCS table identifier may be transmitted through signaling such as RRC, MAC CE, DCI, etc., which will not be described in detail here.

According to another embodiment of the present disclosure, the transmitting method 1700 may further include transmitting information about a demodulation mode identifier to indicate the demodulation method of the receiving device. For example, the receiving device may be indicated to demodulate using the same bit-to-symbol mapping table as that used by the transmitting device for modulation; Alternatively, the receiving device may be indicated to demodulate using a bit-to-symbol mapping table different from that used by the transmitting device for modulation.

For example, as mentioned above, information about the demodulation mode identifier $I_{decode}$ may be transmitted for indicating the demodulation mode of the receiving device, for example, whether to adopt a demodulation mode capable of resisting phase noise, which will not be described in detail here. Information about the demodulation mode identifier $I_{decode}$ may be transmitted to other devices through RRC, MAC CE, DCI, etc. Accordingly, in response to the received $I_{decode}$, the receiving device may select a corresponding demodulation method according to the indication of $I_{decode}$. In some embodiments, the demodulation mode of the receiving device may be indicated according to different values of $I_{decode}$. In this case, the transmitting device and the receiving device may modulate and demodulate according to different modulation modes respectively, thus reducing the requirements for the receiving device and improving the compatibility.

According to another embodiment of the present disclosure, the transmitting method 1700 may further include receiving information about a modulation mode supported by the receiving device. In step S1702, a MCS index suitable for the receiving device may also be determined according to the information about the modulation mode supported by the receiving device. For example, the information indication about the modulation mode supported by the receiving device may include at least one of the M-order second type of modulation mode and the pseudo-N-order first type of modulation supported by the receiving device.

Next, a receiving method corresponding to the receiving device 1100 according to an embodiment of the present disclosure will be described with reference to FIG. 18. FIG. 18 is a flowchart of a receiving method 1800 according to an embodiment of the present disclosure. The receiving method 1800 may be performed by a receiving device. Since the steps of the demodulation method 1800 correspond to the operations of the receiving device 1100 of FIG. 11, a detailed description of the same content is omitted here for the sake of simplicity.

As shown in FIG. 18, in step S1801, information about a MCS index is received. Then, in step S1802, a corresponding MCS table is determined for demodulation according to the received information about the MCS index, wherein the MCS table includes modulation capable of resisting phase noise.

For example, in step S1802, a corresponding MCS table may be determined for demodulation according to the received information about the MCS index, wherein the MCS table includes modulation capable of resisting the phase noise. For example, according to the received information about the MCS index, the MCS table to be used may be determined from a plurality of MCS tables stored in advance, and the modulation order ($Q_m$) and the target code rate (R) to be used may be determined, thereby performing demodulation. In some embodiments, the plurality of MCS tables stored in advance may include MCS tables of modulation modes capable of resisting the phase noise, for example, the MCS tables shown according to FIGS. 8A-8E, 9A-9E and 10A-10C above, which will not be described in detail here. When the MCS table determined according to the received information about the MCS index is a MCS table including a modulation mode capable of resisting the phase noise, for example, the determined MCS table includes a pseudo-N-order first type of modulation mode capable of resisting the phase noise, in some embodiments, the pseudo-N-order first type of modulation mode such as pseudo-N-order spiral modulation may be used for demodulation in step S1802. In some embodiments, in step S1802, the determined MCS table may further include a second type of modulation different from the modulation capable of resisting the phase noise, for example, QAM.

According to another embodiment of the present disclosure, the receiving method 1800 may further include receiving information about a demodulation mode identifier, and performing demodulation according to the information about the demodulation mode identifier. In some embodiments, the demodulation mode identifier indicates whether the receiving device performs demodulation using the same bit-to-symbol mapping table used by the transmitting device for modulation. For example, the demodulation mode identifier may indicate the receiving device to perform demodulation using the same bit-to-symbol mapping table as that used by the transmitting device for modulation; Alternatively, the receiving device may be indicated to perform demodulation using a bit-to-symbol mapping table different from that used by the transmitting device for modulation.

In addition, according to another embodiment of the present disclosure, the receiving method 1800 may further include transmitting information about a modulation mode supported by the receiving device to the transmitting device. Therefore, the transmitting device may determine whether to use the above pseudo-N-order first type of modulation according to the information about the modulation mode supported by the receiving device. For example, an indication of the information about the modulation mode supported by the receiving device may include at least one of the M-order second type of modulation mode and the pseudo-N-order first type of modulation supported by the receiving device.

Next, a transmission method corresponding to the transmitting device 1200 according to another embodiment of the present disclosure will be described with reference to FIG. 19. FIG. 19 is a flowchart of a transmitting method 1900 according to another embodiment of the present disclosure. Since the steps of the transmitting method 1900 correspond to the operations of the transmitting device 1200 of FIG. 12 above, a detailed description of the same content is omitted here for the sake of simplicity.

As shown in FIG. 19, in step S1901, information about a modulation parameter indicating a spiral factor is determined from information about phase noise. Then the determined information about the modulation parameter is transmitted in step S1902. So that the receiving device may determine a modulation mode according to the information about the modulation parameter so as to demodulate the received data.

When it is needed to determine $2^N$ constellation points of pseudo-N-order spiral modulation according to a amplitude weighting parameter $\alpha$ and a phase weighting parameter $\beta$, according to an example of the present disclosure, the modulation parameter may further indicate at least one of the amplitude weighting parameter $\alpha$ and the phase weighting parameter $\beta$. According to another example of the present disclosure, the modulation parameter further indicates at least one of M and N.

Furthermore, according to another example of the present disclosure, the information about the modulation parameter may directly include information about the spiral factor. Further, similar to the spiral factor, in the case where the information about the modulation parameter further indicates one or more parameters of the amplitude weighting parameter $\alpha$, the phase weighting parameter $\beta$, order N of the pseudo first type of modulation, order M of the second type of modulation, etc., the information about the modulation parameter may directly include information about the one or more parameters.

For example, each parameter in the information about the modulation parameter can be explicitly notified through RRC signaling, MAC CE, DCI or UCI. Further, each parameter in the information about the modulation parameter may be explicitly notified through newly set RRC signaling, MAC CE, DCI or UCI. Alternatively, a part of parameters in the information about the modulation parameter may be notified by a traditional way, and other parameters in the information about the modulation parameter may be explicitly notified by the newly set RRC signaling, MAC CE, DCI or UCI.

In addition, a set of candidate values of each parameter in the information about the modulation parameter may be set in advance, and an index in the preset set of the candidate values may be indicated through RRC signaling, MAC CE, DCI or UCI, thereby indicating the value of each parameter. Alternatively, the set of the candidate values of the parameter may not be set in advance, but the parameter may be directly quantized and explicitly notified.

Furthermore, according to another example of the present disclosure, the information about the modulation parameter includes information about an index of a modulation parameter table. Therefore, in the case that a plurality of modulation parameters needs to be transmitted to the receiving device, the signaling expense may be reduced.

In addition, according to another embodiment of the present disclosure, the transmitting method 1900 shown in FIG. 19 may further include receiving information about a modulation method supported by the receiving device. In step S1902, it may also be determined whether to use the pseudo-N-order first type of modulation according to the information about the modulation mode supported by the receiving device. For example, an indication of the information about the modulation mode supported by the receiving device may include at least one of the M-order second type of modulation mode and the pseudo-N-order first type of modulation supported by the receiving device.

In addition, according to another embodiment of the present disclosure, the transmitting method 1900 shown in FIG. 19 may further include transmitting information about a demodulation mode identifier $I_{decode}$ for indicating the demodulation mode of the receiving device, for example, whether to adopt a demodulation mode capable of resisting the phase noise. Information about the demodulation mode identifier $I_{decode}$ may be transmitted to other devices through RRC, MAC CE, DCI, etc. Accordingly, in response to the received $I_{decode}$, the receiving device may select a corresponding demodulation mode according to the indication of $I_{decode}$. In some embodiments, the demodulation mode of the receiving device may be indicated according to different values of $I_{decode}$. In this case, the transmitting device and the receiving device may modulate and demodulate according to different bit-to-symbol mapping tables respectively, thus reducing the requirements for the receiving device and improving the compatibility.

Next, a receiving method corresponding to the receiving device 1300 according to another embodiment of the present disclosure will be described with reference to FIG. 20. FIG. 20 is a flowchart of a receiving method 2000 according to another embodiment of the present disclosure. Since the steps of the receiving method 2000 correspond to the operations of the receiving device 1300 of FIG. 13 above, a detailed description of the same content is omitted here for the sake of simplicity.

As shown in FIG. 20, in step S2001, information about a modulation parameter indicating a spiral factor is received. Then, in step S2002, pseudo-N-order first type of modulation is determined according to the received modulation parameter, wherein $2^N$ first symbols of the pseudo-N-order first type of modulation correspond to a part of $2^M$ second symbols of M-order second type of modulation, where M and N are positive integers.

For example, in step S2002, the spiral factor may be determined according to the information about the modulation parameter, and the N-order spiral constellation points may be determined according to the spiral factor based on the method described above in connection with formulas (1)-(3). In an example according to the present disclosure, in step S2002, N-order spiral constellation points may be calculated every time according to the spiral factor indicated by the received information about the modulation parameter. Alternatively, the receiving method 2000 may further include store corresponding relationship between the spiral factor and the N-order spiral constellation points in advance. Therefore, in step S2002, the N-order spiral constellation points corresponding to the spiral factor indicated by the received information about the modulation parameter may be obtained according to the corresponding relationship between the spiral factor and the N-order spiral constellation points stored in advance.

Then, in step S2002, a part of constellation points in a constellation map of an existing M-order second type of modulation may be used to simulate a constellation map of the determined N-order spiral modulation. For example, as mentioned above, in step S2002, $2^N$ constellation points of the pseudo-N-order spiral modulation (i.e., N-order spiral modulation-M-order QAM) may be determined according to the amplitude weighting parameter $\alpha$ and the phase weighting parameter $\beta$. In an example according to the present disclosure, in step S2002, pseudo-N-order spiral constellation points may be selected from among the constellation points of the M-order second type of modulation every time according to at least one of the amplitude weighting parameter $\alpha$ and the phase weighting parameter $\beta$ indicated by the received information about the modulation parameter. Alternatively, the method 2000 may include store corresponding relationship between at least one of the amplitude weighting parameter $\alpha$ and the phase weighting parameter $\beta$ and the pseudo-N-order spiral constellation points in advance. Therefore, in step S2002, the pseudo-N-order spiral constellation points corresponding to the received information about the modulation parameter may be obtained according to the corresponding relationship between at least one of the amplitude weighting parameter $\alpha$ and the phase weighting parameter $\beta$ and the pseudo-N-order spiral constellation points stored in advance.

Alternatively, in step S2002, the constellation map of the determined N-order spiral modulation may be simulated from a part of the constellation points in the constellation map of the existing M-order second type of modulation according to other conditions such as Euclidean distance and so on.

When it is needed to determine $2^N$ constellation points of the pseudo-N-order spiral modulation according to the amplitude weighting parameter $\alpha$ and the phase weighting parameter $\beta$, according to an example of the present disclosure, the modulation parameter may further indicate at least one of the amplitude weighting parameter $\alpha$ and the phase weighting parameter $\beta$. As mentioned above, the values of $\alpha$ and $\beta$ need to satisfy $\alpha+\beta=1$. Therefore, when the modulation parameter indicates one of the amplitude weighting parameter $\alpha$ and the phase weighting parameter $\beta$, in step S2002, according to one of the amplitude weighting parameter $\alpha$ and the phase weighting parameter $\beta$ indicated by the modulation parameter, another of the amplitude weighting parameter $\alpha$ and the phase weighting parameter $\beta$ indicated by the modulation parameter may be obtained.

Furthermore, according to an example of the present disclosure, the order N of the pseudo first type of modulation and/or the order M of the second type of modulation may be predetermined. For example, the order N of the pseudo first type of modulation and/or the order M of the second type of modulation may be static or semi-static. For example, the order M of the second type of modulation may be determined in advance as 1024. For another example, the order N of the second type of modulation may be determined in advance to be 16 or 64.

Alternatively, according to another example of the present disclosure, the modulation parameter further indicates at least one of M and N. The pseudo-N-order first type of modulation may be determined according to the received information about the modulation parameter in step S2002.

As described above, according to an example of the present disclosure, the information about the modulation parameter may directly include information about the spiral factor, and the pseudo-N-order first type of modulation may be determined according to the information about the spiral factor in step S2002. Further, similar to the spiral factor, in the case where the information about the modulation parameter further indicates one or more parameters of the amplitude weighting parameter $\alpha$, the phase weighting parameter $\beta$, the order N of the pseudo first type of modulation, the order M of the second type of modulation, etc., the information about the modulation parameter may directly include information about the one or more parameters.

In addition, a set of candidate values of each parameter in the information about the modulation parameter may be set in advance, and an index in the set of the candidate values set in advance may be indicated through RRC signaling, MAC CE, DCI or UCI, thereby indicating the value of each parameter. For example, a set $\{f_s1, f_s2, \ldots f_sL\}$ of candidate values of the spiral factor $f_s$ may be set according to common phase noise or variance of the phase noise, where L may be the n power of 2. Thus, a specific value of $f_s$ in the set of the candidate values may be indicated by n bits. Alternatively, the set of the candidate values of the parameter may not be set in advance, but the parameter may be directly quantized and explicitly notified.

Furthermore, according to another example of the present disclosure, information about the modulation parameter includes information about an index of a modulation parameter table, and the spiral factor may be determined in the modulation parameter table according to the information about the index of the modulation parameter table, and determine the pseudo-N-order first type of modulation according to the determined spiral factor in step S2002. Thus, in the case that the receiving device needs multiple modulation parameters, the signaling expenses may be reduced.

For example, a modulation parameter table corresponding different modulation order N of the second type of modulation may be set in advance. In each entry of the modulation parameter table, the values of one or more parameters corresponding to an index of the entry, such as the spiral factor $f_s$, the amplitude weighting parameter $\alpha$, the phase weighting parameter $\beta$, the order M of the second type of modulation, etc., may be set. Alternatively, different parameter values may be set for different phase noise or variance of the phase noise. This has been described in detail with reference to FIG. 14A and FIG. 14B above, so it is not repeated here.

In addition, according to another embodiment of the present disclosure, the receiving method 2000 may further include transmitting information about a modulation mode supported by the receiving device to the transmitting device. Therefore, the transmitting device may determine whether to use the above pseudo-N-order first type of modulation according to the information about the modulation mode supported by the receiving device. For example, an indication of the information about the modulation mode supported by the receiving device may include at least one of the M-order second type of modulation mode and the pseudo-N-order first type of modulation supported by the receiving device.

In addition, according to another embodiment of the present disclosure, the receiving method 2000 may further include receive information about a demodulation mode identifier, and perform demodulation according to the information about the demodulation mode identifier, wherein the demodulation mode identifier may indicate the receiving device to perform demodulation using the same bit-to-symbol mapping table as that of the transmitting device for modulation or may also indicate the receiving device to perform demodulation using a bit-to-symbol mapping table different from that of the transmitting device for modulation.
<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. wired and/or wirelessly), and the respective functional blocks may be implemented by these apparatuses.

For example, an electronic device of an embodiment of the present disclosure may function as a computer that executes the processes of the information transmitting method of the present disclosure. FIG. 21 is a schematic diagram of a hardware structure of a device 2100 (for example, the above-mentioned transmitting device and receiving device) involved in an embodiment of the present disclosure. The above device 2100 (first network element) may be constituted as a computer apparatus that physically comprises a processor 2110, a memory 2120, a storage 2130, a communication apparatus 2140, an input apparatus 2150, an output apparatus 2160, a bus 2170 and the like.

In addition, in the following description, terms such as "apparatus" may be replaced with circuits, devices, units, and the like. The hardware structure of the electronic device may include one or more of the respective apparatuses shown in the figure, or may not include a part of the apparatuses.

For example, only one processor 2110 is illustrated, but there may be multiple processors. Furthermore, processes may be performed by one processor, or processes may be performed by more than one processor simultaneously, sequentially, or with other methods. In addition, the processor 2110 may be installed by more than one chip.

Respective functions of any of the device 2100 may be implemented, for example, by reading specified software (program) on hardware such as the processor 2110 and the memory 2120, so that the processor 2110 performs computations, controls communication performed by the communication apparatus 2140, and controls reading and/or writing of data in the memory 2120 and the storage 2130.

The processor 2110, for example, operates an operating system to control the entire computer. The processor 2110 may be constituted by a Central Processing Unit (CPU), which includes interfaces with peripheral apparatuses, a control apparatus, a computing apparatus, a register and the like. For example, the control unit and so on described above may be implemented by the processor 2110.

In addition, the processor 2110 reads programs (program codes), software modules and data and the like from the storage 2130 and/or the communication apparatus 2140 to the memory 2120, and executes various processes according to them. As for the program, a program causing computers to execute at least a part of the operations described in the above embodiments may be employed. For example, the processing unit of the first network element may be implemented by a control program stored in the memory 2120 and operated by the processor 2110, and other functional blocks may also be implemented similarly.

The memory 2120 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 2120 may also be referred to as a register, a cache, a main memory (a main storage apparatus) and the like. The memory 2120 may store executable programs (program codes), software modules and the like for implementing a method involved in an embodiment of the present disclosure.

The storage 2130 is a computer-readable recording medium, and may be constituted, for example, by at least one of a flexible disk, a Floppy® disk, a magneto-optical disk (e.g., a Compact Disc ROM (CD-ROM) and the like, a digital versatile disk, a Blu-ray® disk), a removable disk, a hard driver, a smart card, a flash memory device (e.g., a card, a stick and a key driver), a magnetic stripe, a database, a server, and other appropriate storage media. The storage 2130 may also be referred to as an auxiliary storage apparatus.

The communication apparatus 2140 is a hardware (transceiver device) performing communication between computers via a wired and/or wireless network, and is also referred to as a network device, a network controller, a network card, a communication module and the like, for example. The communication apparatus 2140 may include a high-frequency switch, a duplexer, a filter, a frequency synthesizer and the like to implement, for example, Frequency Division Duplex (FDD) and/or Time Division Duplex (TDD). For example, the transmitting unit, the transmitting unit, the receiving unit and the like described above may be implemented by the communication apparatus 2140.

The input apparatus 2150 is an input device (e.g., a keyboard, a mouse, a microphone, a switch, a button, a sensor and the like) that receives input from the outside. The output apparatus 2160 is an output device (e.g., a display, a speaker, a Light Emitting Diode (LED) light and the like) that performs outputting to the outside. In addition, the input apparatus 2150 and the output apparatus 2160 may also be an integrated structure (e.g., a touch screen).

Furthermore, the respective apparatuses such as the processor 2110 and the memory 2120 are connected by the bus 2170 that communicates information. The bus 2170 may be constituted by a single bus or by different buses between the apparatuses.

Furthermore, the electronic device may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 2110 may be installed by at least one of these hardware.

Variations

In addition, terms illustrated in the present specification and/or terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a pilot, a pilot signal and so on, depending on the standard applied. Furthermore, a component carrier (CC) may also be referred to as a cell, a frequency carrier, a carrier frequency, and the like.

Furthermore, information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

Names used for parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

Information, signals and the like described in this specification may be represented by using any of a variety of different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a management table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, Downlink Control Information (DCI), Uplink Control Information (UCI)), higher layer signaling (for example, Radio Resource Control (RRC) signaling, broadcast information (Master Information Blocks (MIBs), System Information Blocks (SIBs), etc.), Medium Access Control (MAC) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as RRC messages, for example, RRC connection setup messages, RRC connection reconfiguration messages, and so on. Furthermore, MAC signaling may be reported by using, for example, MAC Control Elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. A base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, the base station in this specification may also be replaced with a user terminal. For example, for a structure in which communication between a wireless base station and a user terminal is replaced with communication between a plurality of user terminals (Device-to-Device, D2D), the respective manners/embodiments of the present disclosure may also be applied. In this case, functions provided by the electronic device described above may be regarded as functions provided by a user terminal. Furthermore, the words "uplink" and "downlink" may also be replaced with "side". For example, an uplink channel may be replaced with a side channel.

Also, the user terminal in this specification may be replaced with the wireless base station. In this case, functions provided by the above user terminal may be regarded as functions provided by a first communication device or a second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched to use during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize Long Term Evolution (LTE), Advanced Long Term Evolution (LTE-A, LTE-Advanced), Beyond Long Term Evolution (LTE-B, LTE-Beyond), the super 3rd generation mobile communication system (SUPER 3G), Advanced International Mobile Telecommunications (IMT-Advanced), the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM®), Code Division Multiple Access 3000 (CDMA 3000), Ultra Mobile Broadband (UMB), IEEE 920.11 (Wi-Fi®), IEEE 920.16 (WiMAX®), IEEE 920.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described above in detail, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

The invention claimed is:

1. A transmitting device comprising:
a receiver configured to obtain a bit sequence to be transmitted;
a controller configured to perform pseudo-N-order first type of modulation on the bit sequence to be transmitted, according to information about phase noise,
wherein $2^N$ first symbols of the pseudo-N-order first type of modulation correspond to a part of $2^M$ second symbols of M-order second type of modulation, where M and N are positive integers;
wherein according to the pseudo-N-order first type of modulation, bit-to-symbol mapping is performed in units of N first bits;
according to the M-order second type of modulation, the bit-to-symbol mapping is performed in units of M second bits,
wherein M is greater than N.

2. The transmitting device according to claim 1, wherein the controller performs the pseudo-N-order first type of modulation on the bit sequence to be transmitted according to a bit-to-symbol mapping table.

3. The transmitting device according to claim 1, wherein the pseudo-N-order first type of modulation is pseudo-N-order spiral modulation.

4. The transmitting device according to claim 3, wherein the $2^N$ first symbols of the pseudo-N-order first type of modulation are determined based on the $2^M$ second symbols, according to at least one of an amplitude weighting parameter and a phase weighting parameter.

5. The transmitting device according to claim 3, wherein
symbols in N-order first type of modulation corresponding to the pseudo-N-order first type of modulation are determined according to a spiral factor, and
the spiral factor is determined according to symbol number of an outermost layer of a spiral.

6. A receiving device comprising:
a receiver configured to obtain a symbol after pseudo-N-order first type of modulation; and
a controller configured to demodulate the symbol according to information about phase noise to obtain a received bit sequence,
wherein $2^N$ first symbols of the pseudo-N-order first type of modulation correspond to a part of $2^M$ second symbols of M-order second type of modulation, where M and N are positive integers;
wherein when performing the pseudo-N-order first type of modulation, bit-to-symbol mapping is performed in units of N first bits;
when performing the M-order second type of modulation, the bit-to-symbol mapping is performed in units of M second bits,
wherein M is greater than N.

7. The receiving device according to claim 6, wherein the controller demodulates the symbol according to a bit-to-symbol mapping table.

8. A modulation method comprising:
obtaining a bit sequence to be transmitted;
performing pseudo-N-order first type of modulation on the bit sequence to be transmitted, according to information about phase noise,
wherein $2^N$ first symbols of the pseudo-N-order first type of modulation correspond to a part of $2^M$ second symbols of M-order second type of modulation, where M and N are positive integers;
wherein according to the pseudo-N-order first type of modulation, bit-to-symbol mapping is performed in units of N first bits;
according to the M-order second type of modulation, the bit-to-symbol mapping is performed in units of M second bits,
wherein M is greater than N.

9. The modulation method according to claim 8, wherein the performing of the pseudo-N-order first type of modulation on the bit sequence to be transmitted is based on a bit-to-symbol mapping table.

* * * * *